United States Patent
Hu et al.

(10) Patent No.: US 11,512,207 B2
(45) Date of Patent: Nov. 29, 2022

(54) ANTI-SMUDGE AND ANTI-GRAFFITI COMPOSITIONS

(71) Applicant: Queen's University at Kingston, Kingston (CA)

(72) Inventors: Heng Hu, Kingston (CA); Guojun Liu, Kingston (CA); Muhammad Rabnawaz, Urbana, IL (US)

(73) Assignee: Queen's University at Kingston, Kingston (CA)

( * ) Notice: Subject to any disclaimer, the term of this patent is extended or adjusted under 35 U.S.C. 154(b) by 236 days.

(21) Appl. No.: 17/105,581

(22) Filed: Nov. 26, 2020

(65) Prior Publication Data

US 2021/0189152 A1 Jun. 24, 2021

Related U.S. Application Data

(63) Continuation of application No. 16/017,337, filed on Jun. 25, 2018, now Pat. No. 10,899,936, which is a
(Continued)

(51) Int. Cl.
*C09D 5/16* (2006.01)
*C08L 63/00* (2006.01)
(Continued)

(52) U.S. Cl.
CPC ............ *C09D 5/16* (2013.01); *C08F 293/005* (2013.01); *C08G 18/61* (2013.01);
(Continued)

(58) Field of Classification Search
CPC combination set(s) only.
See application file for complete search history.

(56) References Cited

U.S. PATENT DOCUMENTS 3,246,048 A * 4/1966 Haluska ................. C08G 18/61
528/29
4,902,767 A * 2/1990 Roitman ................. C08G 18/10
528/30
(Continued)

FOREIGN PATENT DOCUMENTS

CA 1310441 11/1982
CA 2369990 7/2000
(Continued)

OTHER PUBLICATIONS

Nagel, C. et al., "New Silicone Structures", European Coatings Journal, pp. 32-39, (2010).
(Continued)

*Primary Examiner* — Peter A Salamon
(74) *Attorney, Agent, or Firm* — Angela Lyon

(57) ABSTRACT

Polyurethane-based and epoxy-based coating compositions are described that provide coatings and adhesives that are clear, amphiphobic and durable. Both water and hexadecane readily slide off these surfaces without leaving a residue. Coatings with thicknesses ranging from about 10 nm to about 10 μm exhibited excellent transmittance properties. Such films exhibited durability against abrasion, ink-resistance, anti-graffiti, anti-fingerprint, and strong adhesion to glass surfaces. The coatings are applicable to electronic devices, fabrics, glass, etc. to prepare optically clear, stain-resistant, and smudge-resistant surfaces.

19 Claims, 15 Drawing Sheets

Related U.S. Application Data continuation of application No. 14/885,414, filed on Oct. 16, 2015, now Pat. No. 10,023,751.

(60) Provisional application No. 62/193,878, filed on Jul. 17, 2015, provisional application No. 62/137,550, filed on Mar. 24, 2015, provisional application No. 62/081,278, filed on Nov. 18, 2014, provisional application No. 62/064,773, filed on Oct. 16, 2014.

(51) Int. Cl.

| | | |
|---|---|---|
| *C08F 293/00* | (2006.01) | |
| *C09D 163/00* | (2006.01) | |
| *C09D 175/04* | (2006.01) | |
| *C09D 183/10* | (2006.01) | |
| *C08G 18/61* | (2006.01) | |
| *C08G 18/62* | (2006.01) | |
| *C08G 18/79* | (2006.01) | |
| *C08G 18/80* | (2006.01) | |
| *C08G 77/442* | (2006.01) | |
| *C08G 77/458* | (2006.01) | |

(52) U.S. Cl.
CPC ..... *C08G 18/6229* (2013.01); *C08G 18/6295* (2013.01); *C08G 18/792* (2013.01); *C08G 18/798* (2013.01); *C08G 18/8074* (2013.01); *C08L 63/00* (2013.01); *C09D 163/00* (2013.01); *C09D 175/04* (2013.01); *C09D 183/10* (2013.01); *C08F 2438/01* (2013.01); *C08G 77/442* (2013.01); *C08G 77/458* (2013.01)

(56) References Cited

U.S. PATENT DOCUMENTS

| | | | |
|---|---|---|---|
| 6,225,434 B1* | 5/2001 | Sadvary | C09D 5/448 427/407.1 |
| 6,531,228 B1 | 3/2003 | Bartelink et al. | |
| 7,585,393 B2* | 9/2009 | Sekiya | D21F 1/32 162/263 |
| 2004/0192835 A1* | 9/2004 | Steidl | C08G 18/6659 524/591 |
| 2006/0162888 A1* | 7/2006 | Sekiya | D21F 5/00 162/199 |
| 2007/0243394 A1* | 10/2007 | Yamaya | C09D 183/14 524/588 |
| 2012/0264884 A1* | 10/2012 | Liu | C09D 153/00 525/276 |
| 2013/0224496 A1* | 8/2013 | Palmateer | C09D 163/00 523/435 |

FOREIGN PATENT DOCUMENTS

| | | |
|---|---|---|
| CA | 2483878 | 11/2003 |
| CA | 2833046 | 10/2012 |
| EP | 0242227 | 10/1987 |
| EP | 277816 | 8/1988 |
| WO | WO1999/16800 | 4/1999 |

OTHER PUBLICATIONS

International Search Report and Written Opinion for corresponding International Application No. PCT/CA2015/051043 filed Oct. 16, 2015.

\* cited by examiner

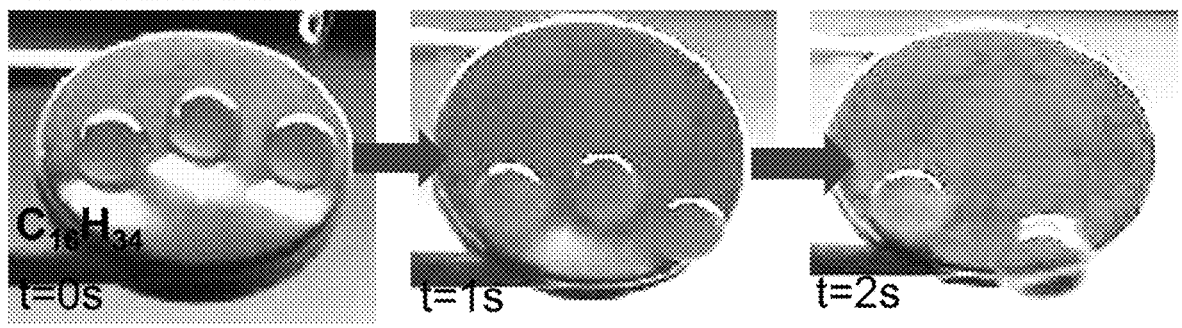
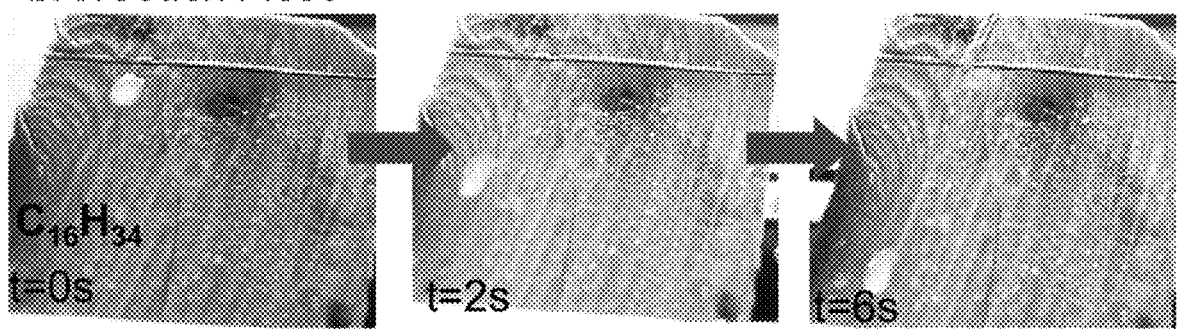
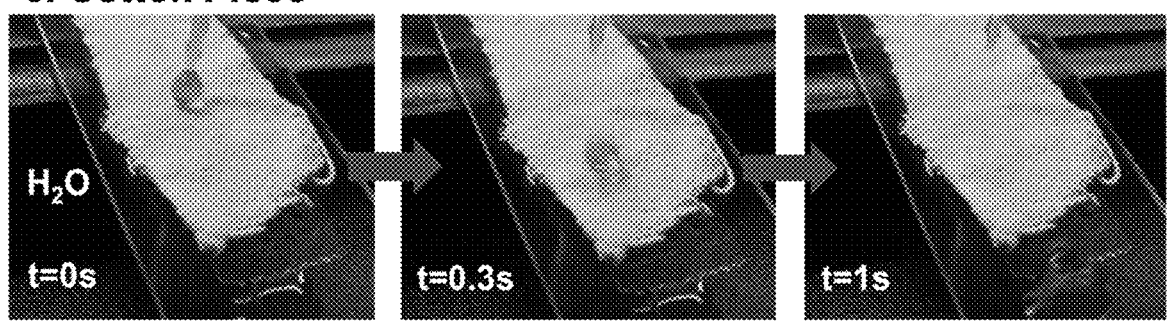
Fig. 9

P20-1, P20-2

P20-3

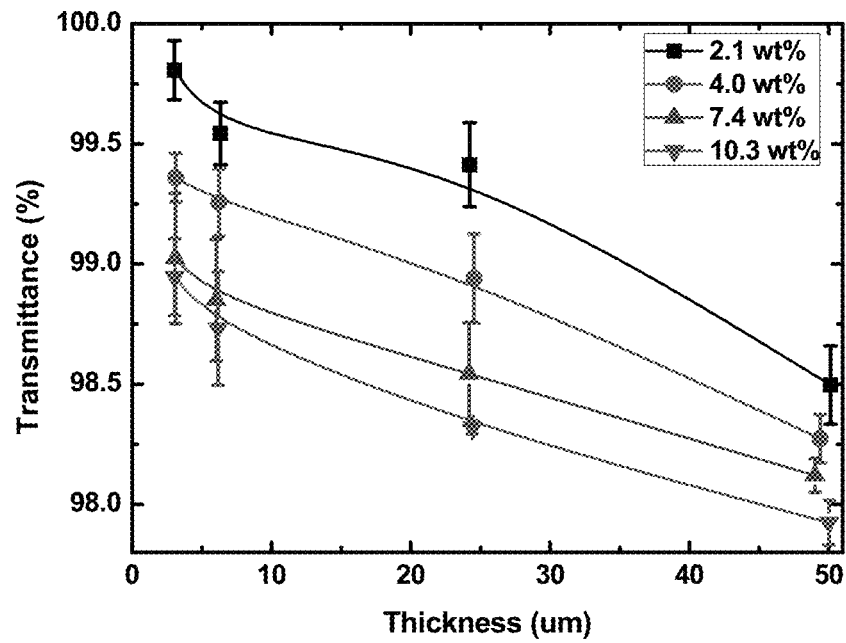
Fig. 23
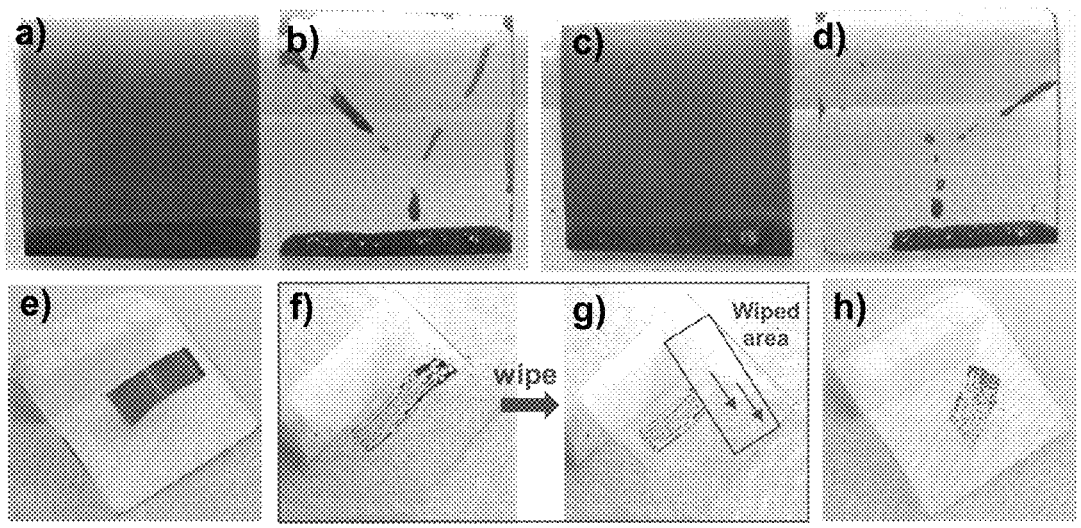
Fig. 24A-H

ANTI-SMUDGE AND ANTI-GRAFFITI COMPOSITIONS

FIELD OF THE INVENTION

The field of the invention is coatings and adhesives. More specifically, the field is coatings that are thick enough to endure wear, applicable to many different substrates, and repel water and oil.

BACKGROUND OF THE INVENTION

Screens and surfaces of cell phones, tablets, and other hand-held electronic devices are susceptible to fingerprints and smudge deposition. The windows of high-rise buildings can develop stains due to dust deposition from rain or ice droplets. Automobile bodies and windshields become dirty from mud and dust. Such deposits affect the aesthetic appeal of objects and decrease our enjoyment. When these deposits accumulate on the screens of hand-held electronic devices or windows and windshields, they deteriorate display quality and diminish one's ability to use the device or to operate the vehicle. All these issues can be alleviated with anti-smudge coatings that are also optically clear and durable.

Currently, there are no durable amphiphobic (oil- and water-repellent) and optically-clear coatings on the market for hand-held electronic devices, windshields, or the windows of high-rises. Perfluoropolyether-silane-based liquids are sold as coatings for hand-held electronic devices. These coatings are of limited use because they are not wear resistant.

A typical polyurethane or epoxy coating is fairly water repellent, but does not have oil repellent properties. Accordingly, neither polyurethane nor epoxy is an amphiphobic coating. Polyurethanes are produced by reacting an isocyanate containing two or more isocyanate groups per molecule (R—(N=C=O)n with n≥2) with a polyol containing on average two or more hydroxy groups per molecule (R'—(OH)n with n≥2), optionally in the presence of a catalyst, see Scheme 1. The properties of polyurethane are greatly influenced by the types of isocyanates and polyols from which it was made. Epoxy coatings are produced by reacting a resin with a hardener (also called an activator), see FIG. 10.

Scheme 1. Synthesis of a traditional linear polyurethane (PU)

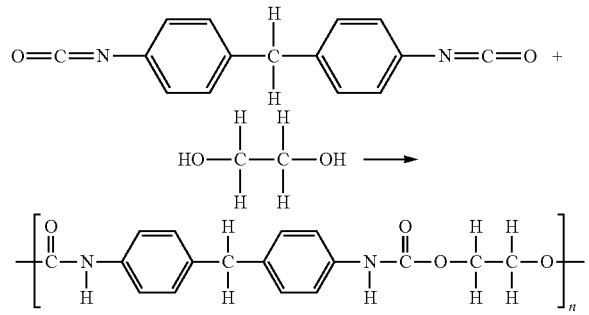

Two-component polyurethane coatings have two mutually reactive components that are stored separately. One component bears hydroxyl groups. The other component bears isocyanate groups. The two different components are typically stored in pre-polymer or oligiomeric form to reduce vapour pressures for safety and toxicity reasons. A pre-polymer is a medium molecular weight species, between a molecule and a polymer. Pre-polymers have a lower vapour pressure than its corresponding low molecular weight molecular reactive components (Gite, V. et al. Prog. Org. Coat. 2010, 68, 307). When the two different components are mixed together, the hydroxyl groups react with the isocyanate groups to produce a crosslinked PU film or coating, as shown below in a representative example of polyurethane synthesis. For convenience, a diisocyanate and a diol are shown below. When crosslinked polyurethane is desired then diisocyanate is used with a polyol crosslinking agent, which has three or more functionalities per molecule to enable formation of fully branched/crosslinked networks. PU can be applied to a wide range of substrates. However, traditional PU coatings do not possess anti-smudge properties.

Epoxy coatings typically have two mutually reactive components that are stored separately. One component bears epoxide moieties. The other component bears hardeners that comprise hydroxyl, amino, amine, imine, anhydride, or carboxyl groups. When the two different components are mixed together, they produce a crosslinked film or coating. Epoxy coatings/adhesives can be applied to a wide range of substrates. However, traditional epoxy coatings do not possess anti-smudge properties.

There is a need for amphiphobic (e.g., anti-smudge) coatings that are optically clear and durable.

SUMMARY OF THE INVENTION

An aspect of the invention provides a composition including: a major component that is a polymer that is capable of crosslinking at multiple sites to form a solid material, or a major component that is an engineering plastic; and a minor component that is a polymer having a first end that is capable of binding to the major component and having a second end that remains unbound; wherein the composition is adapted to be applied to a substrate and dried and/or cured to form a coating on the substrate, such that: the second end of at least a portion of the minor component is located at a surface of the coating; and the coating is amphiphobic.

In an embodiment of this aspect, the minor component polymer has a glass transition temperature (Tg) in the range of about −160° C. to 25° C. In another embodiment of this aspect, the major component comprises polyurethane, epoxy resin, Nylon 6, Nylon 6-6, poly(acrylate), polyamide, poly(butylene terephthalate), polycarbonate, poly(etherketone), poly(etheretherketone), polyethylene, poly(ethylene terephthalate), polyimide, poly(methacrylate), poly(oxymethylene), poly(phenylene sulfide), poly(phenylene oxide), polypropylene (isotactic), polysulphone, polystyrene, or a combination thereof. In an embodiment of this aspect, the coating is substantially transparent. In an embodiment of this aspect, the major component comprises polyurethane or epoxy resin. In an embodiment of this aspect, the minor component comprises about 0.1 wt % to about 40 wt % of the composition. In an embodiment of this aspect, the minor component polymer has a Tg of about 25° C. or less and is selected from perfluoropolyether (PFPE), polysiloxane, poly(ethylene glycol) methyl ether (PEO), polyisobutylene (PIB), polybutadiene (PB), or a polymeric form of: ethylene (atactic), 1-butene, ethylene, cis-isoprene, trans-isoprene, 1-octene, propylene, vinyl propionate, vinylidene chloride, vinylidene fluoride, cis-chlorobutadiene, trans-chlorobutadiene, benzyl acrylate, butyl acrylate, sec-butyl acrylate, 2-cyanoethyl acrylate, cyclohexyl acrylate, dodecyl acrylate, ethyl acrylate, 2-ethylhexyl acrylate, isobutyl acrylate, 2,2,2-trifluoroethyl acrylate, 2-ethoxyethyl acrylate, isopropyl acrylate (isotactic), benzyl methacrylate, diethylaminoethyl methacrylate, dodecyl methacrylate, 2-ethylhexyl methacrylate, hexadecyl methacrylate, hexyl methacrylate, octadecyl methacrylate, octyl methacrylate, propyl vinyl ether, methyl vinyl ether, methyl glycidyl ether, isobutyl vinyl ether, ethyl vinyl ether, 2-ethylhexyl vinyl ether, dodecyl vinyl ether, butyl vinyl ether, butyl glydicyl ether, allyl glycidyl ether, ethylene oxide, propylene oxide, tetrahydrofuran, 1,2-epoxybutane, 1,2-epoxydecane, 1,2-epoxyoctane, epibromohydrin, epichlorohydrin, trimethylene oxide, epibromohydrin, epichlorohydrin, tetramethylene terephthalate, tetramethylene adipate, ethylene malonate, ethylene adipate, ε-caprolactone, dimethylsiloxane, methylphenylsiloxane, formaldehyde, ethylene-trans-1,4-cyclohexyldicarboxylate, acetaldehyde, or poly(l-glycidyl-3-butylimidazolium bis(trifluoromethanesulfonyl)imide) ("polyGBIMTFSI"); or a phosphazene polymer

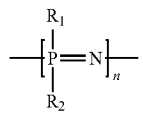

where $R_1$ and $R_2$ are $CH_3$, $C_6H_5$, $OCH_3$, $OC_6H_5$, $NR_2$, Cl, Br, F, $OCH_2CF_3$, or $OCH_2C_6H_5$;

or any combination thereof.

In further embodiments of this aspect, compositions further comprising biocide, embedded particles selected from silica, titanium dioxide, diatomaceous earth, alumina, $TiO_2$, and/or a pigment.

In some embodiments of this aspect, the minor component is a graft copolymer of formula (1) or a block copolymer of formula (2):

where FS is a moiety comprising PFPE, polysiloxane, PEO, PIB, PB, a polymer whose Tg is 25° C. or less as described above, or any combination thereof; R is a moiety that comprises a hydroxyl, amine ($NH_2$), imine (NH), carboxyl, glycidyl, isocyanato, or an anhydride functional group that is protected or unprotected; Mi is a monomer selected from styrene, acrylate, methacrylate, vinyl esters, acrylic acids, methacrylic acids, amine-bearing monomers, anhydride-bearing monomers, polyimine/polyamine, or polycarboxylic acid/polyanhydride; x is percentage of FS moieties and is from about 0.1% to about 40%; y is percentage of R moieties and is from about 1% to about 90%; n is number of repeat units.

In certain embodiments of this aspect, FS further comprises at least one moiety that links FS to R or Mi of the copolymer. In some embodiments of this aspect, the PFPE moiety is Demnum, Fluorolink Diol, Fomblin Z, Krytox®, or Aflunox. In certain embodiments of this aspect, the minor component comprises: PFPE-b-P(HEMA-S-MMA); PDMS-b-[HEMA-S-MMA]; PDMS-b-PGMA; Polyol-g-PIB; Polyol-g-PB; P(S-MMA-MAA-BMA-IBMA-VP-EGEMA-HEMA)-g-PFPE; P(TFEMA-co-HEMA)-g-PFPE; P(S-MMA-MAA-BMA-IBMA-VE-EGEMA-HEMA)-g-PDMS; P(S-alt-MA)-g-$PEO_{750}$; P(S-alt-MA)-g-$PEO_{2000}$; P(S-alt-MA)-g-$PEO_{5000}$; PFPE-b-P(HEMA-S-MMA); PDMS-b-[HEMA-S-MMA]; PDMS-b-PGMA; Polyol-g-PIB; Polyol-g-PB; or any combination thereof. In some embodiments of this aspect, FS comprises polydimethylsiloxane. In certain embodiments of this aspect, FS comprises: $CH_2$=CH—$CO_2$-polysiloxane; $CH_2$=CH—$CO_2$-PDMS; $CH_2$=C($CH_3$)—$CO_2$-polysiloxane; $CH_2$=C($CH_3$)—$CO_2$-PDMS; $CH_2$=CH—$CO_2$-PFPE; $CH_2$=CH—$CO_2$-Krytox; $CH_2$=C($CH_3$)—$CO_2$-PFPE; $CH_2$=C($CH_3$)—$CO_2$-Krytox; or $CH_2$=C($CH_3$)$COOCH_2CH_2OOCCF(CF_3)[CF_2$—CF$(CF_3)O]_xCF_3$. In other embodiments of this aspect, FS comprises a PFPE moiety that comprises a $C_{10}$ to $C_{2000}$ perfluoro polyether moiety. In certain embodiments of this aspect, the minor component comprises polysiloxane, PFPE, PEO, or PIB, or any combination thereof; wherein the polysiloxane, PFPE, PEO, PIB, or any combination thereof is grafted to a polymer, wherein the polymer is selected from polyacrylate, polymethacrylate, polyacrylic acid, polymethacrylic acid, polystyrene, polyvinyl ester, polyimine/polyamine, polycarboxylic acid/polyanhydride, or any combination thereof. In certain embodiments of this aspect, the FS moiety comprises: polyacrylate-g-polysiloxane; polymethacrylate-g-polysiloxane; poly(acrylic acid)-g-polysiloxane; poly(methacrylic acid)-g-polysiloxane; polystyrene-g-polysiloxane; poly(vinyl ester)-g-polysiloxane; polyacrylate-g-PFPE; polymethacrylate-g-PFPE; poly(acrylic acid)-g-PFPE; poly(methacrylic acid)-g-PFPE; polystyrene-g-PFPE; polyvinyl ester-g-PFPE; PEI-g-PDMS; P(S-alt-MA)-g-PDMS; polyacrylate-b-polysiloxane; polymethacrylate-b-polysiloxane; polyacrylic acid-b-polysiloxane; polymethacrylic acid-b-polysiloxane; polystyrene-b-polysiloxane; polyvinyl ester-b-polysiloxane; polyacrylate-b-PFPE; polymethacrylate-b-PFPE; poly(acrylic acid)-b-PFPE; poly(methacrylic acid)-b-PFPE; polystyrene-b-PFPE; poly(vinyl ester)-b-PFPE; or PDMS-b-PGMA.

Another aspect of the invention provides a polyurethane-based coating composition prepared by combining: a copolymer that is a polyol, polyamine, polyimine, poly(carboxylic acid), or polyanhydride that comprises a polysiloxane, PFPE, PEO, PIB, or PB moiety; di-, tri-, or poly-isocyanate; and, optionally a polyol, polyamine, polyimine, poly(carboxylic acid), and/or polyanhydride that does not comprise a polysiloxane, PFPE, PEO, PIB, nor PB moiety; wherein the coating composition comprises about 0.1 wt % to about 40 wt % siloxane, fluorine, PEO, PIB, or PB. In some embodiments of this aspect, the polyol that comprises a polysiloxane, PFPE, PEO, PIB, or PB moiety is Polyol-g-PIB. In certain embodiments of this aspect, the polyanhydride that comprises a polysiloxane, PFPE, PEO, PIB, or PB moiety is P(S-alt-MA)-g-PEO.

Another aspect of the invention provides an epoxy-based coating composition prepared by combining a polymer comprising at least one functional moiety and at least one of a polysiloxane, PFPE, PEO, PIB, and PB moiety; an epoxy resin; and optionally a hardener; and optionally a solvent.

In certain embodiments of this aspect, the epoxy resin comprises polyglycidyl bisphenol A diglycidyl ether, bisphenol F, bisphenol S, novolac epoxy resin, aliphatic epoxy resin, glycidylamine epoxy resin, or any combination thereof. In certain embodiments of this aspect, the polymer comprises:

P20-1, P20-2
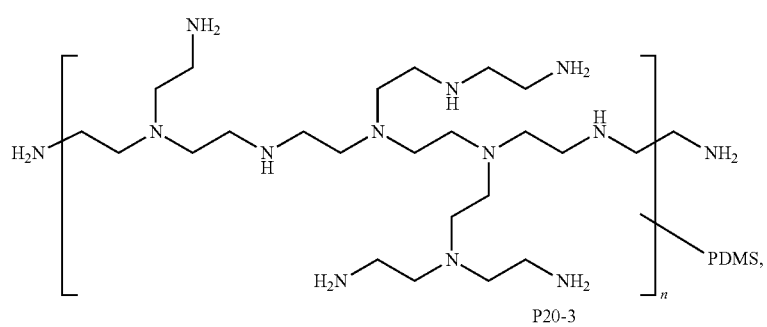
P20-3
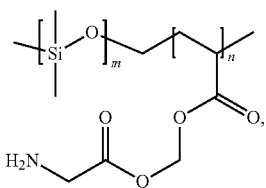
P20-4
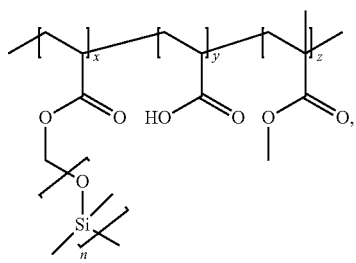
P20-5
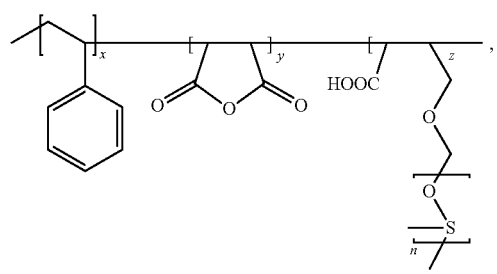
P20-6
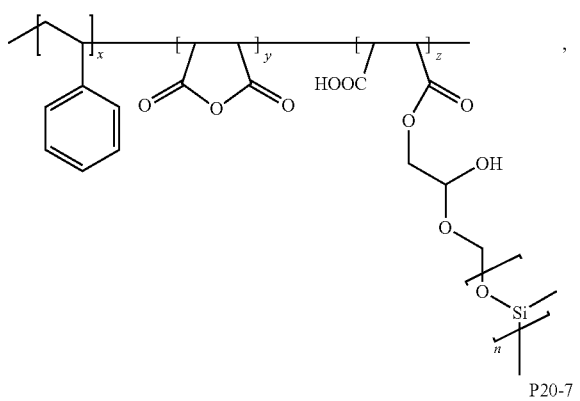
P20-7
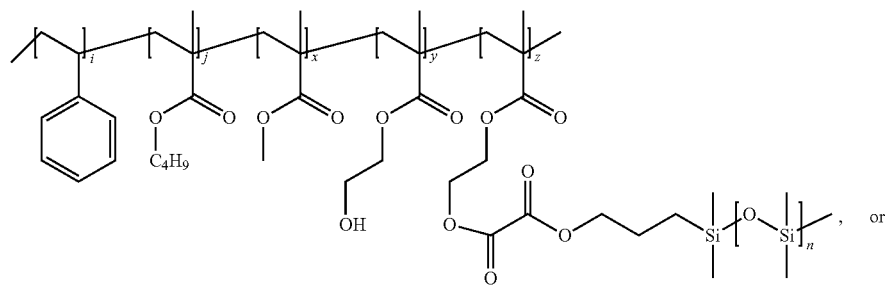
or
P20-8
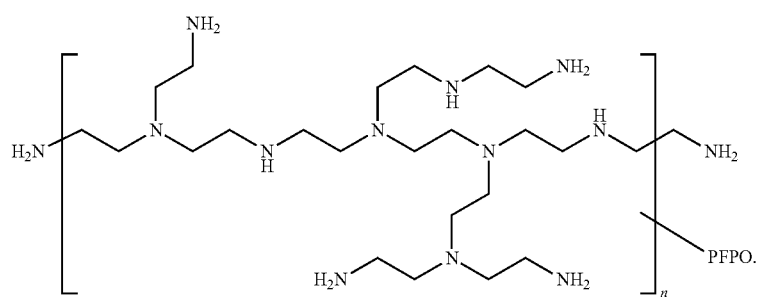
Another aspect of the invention provides a polyurethane-based coating composition prepared by combining: a copolymer that is a polyol, polyamine, polyimine, poly(carboxylic acid), or polyanhydride that comprises a polysiloxane, PFPE, PEO, PIB, or PB moiety, or a polymer having a Tg of 25° C. or less as described above.

In yet another aspect, the invention provides a composition that comprises a major component that is a polymer having a Tg of 120° C. or higher or is an engineering plastic; and a minor component that is a polymer having a Tg of 25° C. or less as described above and having a first end that is capable of binding to the major component and having a second end that remains unbound; wherein the composition is adapted to be applied to a substrate and dried and/or cured to form a coating on the substrate, such that the second end of at least a portion of the minor component is located at a surface of the coating; and the coating is amphiphobic.

In another aspect the invention provides a method comprising applying the composition of any of the above aspects to a substrate; wherein the composition forms a coating on the substrate; wherein the coating is amphiphobic. Embodiment of this aspect, further include drying and/or curing the composition to form the coating.

In an aspect, the invention provides a polyurethane-based coating composition that comprises perfluoropolyether (PFPE) or polysiloxane, wherein coatings prepared from the coating composition are amphiphobic, clear, and wear-resistant. In certain embodiments of this aspect, coatings of the polyurethane-based coating composition repel water and hydrophobic liquid (e.g., hexadecane). In certain embodiments, when droplets of water or hydrophobic liquid are placed on a substrate coated with a crosslinked coating prepared from the coating composition, and the substrate is tilted, the droplets slide off. Embodiments of this aspect are coating compositions that are from 0.1 to 40 wt % siloxane and/or from 0.1 to 40 wt % fluorine. Embodiments of this aspect, further comprise embedded particles and/or a biocide. Such embedded particles are silica, titanium dioxide, diatomaceous earth, alumina, $TiO_2$, and/or pigments.

In another aspect of this invention, a polyurethane-based coating composition is prepared by combining: a copolymer that is a polyol that comprises a polysiloxane moiety and/or a polyamine that comprises a siloxane moiety, di-, tri- or poly-isocyanate, and, optionally, a polyol and/or a polyamine that does not comprise a siloxane moiety, or a copolymer that is a polyol that comprises a PFPE moiety and/or a polyamine that comprises a PFPE moiety, di-, tri- or poly-isocyanate, and, optionally, a polyol and/or a polyamine that does not comprise a PFPE moiety, wherein the polyurethane-based coating composition has from 0.1 to 40 wt % siloxane and/or from 0.1 to 40 wt % fluorine. In certain embodiments of this aspect, the copolymer is a graft copolymer of formula (1):

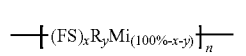 (1)

where FS is a moiety comprising PFPE, polysiloxane, or both PFPE and polysiloxane; R is independently a moiety that comprises a hydroxyl, amino, carboxyl, glycidyl, isocyanato, or anhydride functional group that is protected or unprotected; Mi are independently monomers selected from styrene, acrylate, methacrylate, vinyl esters, acrylic acids, methacrylic acids; x is percentage of FS moieties and is a number from 0.1% to 40%; y is percentage of R moieties and is a number from 1% to 90%; n is number of repeat units. In some embodiments of this aspect, FS further comprises at least one moiety that links FS to the copolymer. For example FS may be linked to R or Mi of the copolymer. In some embodiments, the moiety that links FS is a methylene. In certain embodiments, FS is a monomer that has PFPE or polysiloxance as a pendant group. In certain embodiments of the graft copolymer, FS comprises Demnum, Fluorolink Diol, Krytox®, Fomblin Z, or Aflunox. In certain embodiments, the coating composition comprises P(S-MMA-MAA-BMA-IBMA-VE-EGEMA-HEMA)-g-PFPE. In some embodiments, the composition has 13.6%, 16.5%, 23%, 27%, or 35% fluoro density. In certain embodiments, the coating composition comprises P(TFEMA-co-HEMA)-g-PFPE. In some embodiments of this aspect, the composition has 10%, 16%, 24%, or 32% fluoro density. In certain embodiments, the coating composition comprises P(S-MMA-MAA-BMA-IBMA-VE-EGEMA-HEMA)-g-PDMS.

In certain embodiments of the polyurethane-based coating composition of the above aspects, the copolymer is a block copolymer of formula (2):

 (2)

where FS is a moiety comprising PFPE, polysiloxane, or both PFPE and polysiloxane; R is independently a moiety that comprises a hydroxyl, amino, carboxyl, glycidyl, isocyanato, or anhydride functional group that is protected or unprotected; Mi are independently monomers selected from styrene, acrylate, methacrylate, vinyl esters, acrylic acids, or methacrylic acids; y is percentage of R moieties and is a number from 1% to 90%; n is number of repeat units.

In some embodiments of this aspect, the polyurethane-based coating composition, the FS moiety is polysiloxane-b-polyacrylate, polysiloxane-b-polymethacrylate, polysiloxane-b-polyacrylic acid, polysiloxane-b-polymethacrylic acid, polysiloxane-b-polystyrene, polysiloxane-b-polyvinyl ester, PFPE-b-polyacrylate, PFPE-b-polymethacrylate, PFPE-b-polyacrylic acid, PFPE-b-polymethacrylic acid, PFPE-b-polystyrene, or PFPE-b-poly(vinyl ester).

In certain embodiments of the block copolymer, the PFPE moiety is Demnum, Fluorolink®, Krytox®, or Aflunox. In some embodiments, the coating composition comprises PFPE-b-P(HEMA-S-MMA), or PDMS-b-[HEMA-S-MMA]. In certain embodiments, the copolymer's polysiloxane moiety is a PDMS. In certain embodiments, the polysiloxane has a glass transition temperature in the range of –60° C. to –160° C. In certain embodiments, the polysiloxane has a glass transition temperature in the range of –40° C. to –160° C. In some embodiments, the polysiloxane has a glass transition temperature in the range from –100° C. to –130° C. In certain embodiments, the PFPE moiety is a perfluoro polyether that has a glass transition temperature in the range from –150° C. to –10° C. In certain embodiments, the PFPE moiety is a perfluoro polyether that has a glass transition temperature in the range from –160° C. to –10° C. In certain embodiments, the glass transition temperature is in the range from –130° C. to –50° C. In some embodiments, the coating composition has a wt % siloxane from 0.1% to 40%. In certain embodiments, the coating composition has a wt % fluorine from 0.1% to 40%. In certain embodiments, the PFPE moiety is a $C_{10}$ to $C_{2000}$ perfluoro polyether moiety. In some embodiments, monomers of FS include $CH_2=C(CH_3)COOCH_2CH_2OOCCF(CF_3)[CF_2-CF(CF_3)O]_iCF_3$. In some embodiments, monomers of FS comprise $CH_2=CH-CO_2-PFPE$, $CH_2=CH-CO_2-Krytox$, $CH_2=C(CH_3)-CO_2-PFPE$, $CH_2=C(CH_3)-CO_2-Krytox$, or $CH_2=C(CH_3)COOCH_2CH_2OOCCF(CF_3)[CF_2-CF(CF_3)O]_iCF_3$. In certain embodiments, the FS moiety is polysiloxane-g-polyacrylate, polysiloxane-g-polymethacrylate, polysiloxane-g-polyacrylic acid, polysiloxane-g-polymethacrylic acid, polysiloxane-g-polystyrene, polysiloxane-g-polyvinyl ester, PFPE-g-polyacrylate, PFPE-g-polymethacrylate, PFPE-g-polyacrylic acid, PFPE-g-polymethacrylic acid, PFPE-g-polystyrene, or PFPE-g-polyvinyl ester. In certain embodiments, the FS moiety is polysiloxane grafted to a polymer, wherein the polymer is selected from polyacrylate, polymethacrylate, polyacrylic acid, polymethacrylic acid, polystyrene, polyvinyl ester, or a random copolymer that comprises acrylates, methacrylates, styrenes, and vinyl esters. Another aspect of the invention provides poly(acrylate-styrene-methacrylate-vinyl ether)-g-polysiloxane. Yet another aspect of the invention provides poly(acrylate-styrene-methacrylate-vinyl ether)-g-PFPE.

In some embodiments of the above aspects regarding compounds of formula (1) and (2), protected R groups can be deprotected by heating, exposing to moisture, or exposing to irradiation.

In another aspect, the invention provides a method of making a polyurethane-based coating composition comprising combining a copolymer that is a polyol that comprises a siloxane moiety and/or a polyamine that comprises a siloxane moiety, di-, tri- or poly-isocyanate, and, optionally, after allowing reaction to proceed, a polyol and/or a polyamine that do not comprise a siloxane moiety. In some embodiments of this aspect, the copolymer is a compound of formula (1).

In yet another aspect, the invention provides a method of making a polyurethane-based coating composition comprising combining a copolymer that is a polyol that comprises a fluorinated moiety and/or a polyamine that comprises a PFPE moiety, di-, tri- or poly-isocyanate, and, optionally, a polyol and/or a polyamine that do not comprise a PFPE moiety. In an embodiment of this aspect, the copolymer is a compound of formula (2). In certain embodiments, the polyurethane-based coating composition has from 1 to 40 wt % siloxane. In some embodiments, the polyurethane-based coating composition has from 1 to 40 wt % fluorine.

In an aspect, the invention provides a method of using a clear, amphiphobic coating comprising the coating composition of the above aspects.

In another aspect, the invention provides a method of making a clear, amphiphobic coating on a substrate, comprising combining the following to form a mixture (i) a copolymer that is a polyol that comprises a polysiloxane moiety, (ii) di-, tri- or poly-isocyanate, and, (iii) a first solvent that solvates the mixture; heating, optionally, adding (iv) a polyol that does not comprise a polysiloxane moiety, and continuing to apply heat, cooling, adding a second solvent that selectively solvates a portion of the mixture, the solvated portion being that which is not the polysiloxane moiety, removing the first solvent under reduced pressure, adding additional second solvent to form a coating solution, dispensing the coating solution onto a surface of a substrate, drying the coated substrate, curing the coating. In some embodiments of the above aspect, the first solvent is acetone and/or the second solvent is acetonitrile. In some embodiments of this aspect, curing is heating, adding a curing catalyst (e.g., a tertiary amine, Dibutyltin dilaurate), or both heating and adding a curing catalyst.

In an aspect, the invention provides a method of forming a clear amphiphobic coating on a substrate, comprising combining the following to form a mixture (i) a copolymer that is a polyol that comprises a PFPE moiety, (ii) di-, tri- or poly-isocyanate, and, optionally, adding (iii) a polyol that does not comprise a PFPE moiety, and adding a solvent that solvates a portion of the mixture, the solvated portion being that which is not the PFPE moiety to form a coating solution, applying the coating solution onto a surface of a substrate, drying the coated substrate, and curing the coating. In some embodiments of this aspect, the solvent is tetrahydrofuran. In some embodiments of this aspect, the coating solution is disposed on an applicator. In certain embodiments, the coating solution is applied in a volume of solution sufficient to form a film thickness of 0.1 to 100 microns. In some embodiments of this aspect, the dispensing the coating solution is pipetting a volume of solution sufficient to form a film thickness of 2 to 15 microns. In some embodiments of this aspect, the dispensing the coating solution is pipetting a volume of solution sufficient to form a film thickness of 5 to 10 microns. In some embodiments, the applying the coating solution comprises brushing, rolling, dip-coating, solution casting, aero-spraying, and dispensing the coating solution. In an embodiment of this aspect, a substrate is metal, metal oxide, ceramic, concrete, glass, masonry, stone, wood, wood composite, wood laminate, cardboard, paper, printing paper, semiconductor, plastic, rubber, leather, suede, fabric, fiber or textile. A fabric, fiber or textile may comprise, e.g., cotton, wool, polyester, linen, ramie, acetate, rayon, nylon, silk, jute, velvet, army fabric or vinyl. In an embodiment, a fabric, fiber or textile comprises natural fibers, synthetic fibers, or a mixture thereof.

In another aspect, the invention provides a polyol comprising perfluoropolyether (PFPE).

In yet another aspect, the invention provides a polyol comprising polysiloxane.

In embodiments of these polyol aspects, the polyol is a graft copolymer of formula (1) or a block copolymer of formula (2) as described above. In certain embodiments, FS further comprise at least one moiety that links FS to R or Mi of the copolymer. In some embodiments, the moiety that links FS is a methylene. In some embodiments, FS is a monomer that has PFPE or polysiloxane as a pendant group. In some embodiments, the polyol has 13.6%, 16.5%, 23%, 27%, or 35% fluoro density. In some embodiments, monomers of FS include $CH_2=CH-CO_2$-polysiloxane, $CH_2=CH-CO_2$-PDMS, $CH_2=C(CH_3)-CO_2$-polysiloxane, or $CH_2=C(CH_3)-CO_2$-PDMS. In certain embodiments, the PFPE moiety is Demnum, Fluorolink Diol, Fomblin Z, Krytox®, or Aflunox. In some embodiments, the polyol's polysiloxane moiety is a PDMS. In some embodiments, the polyol's polysiloxane moiety has a glass transition temperature in the range of $-160°$ C. to $-60°$ C. or the range of $-130°$ C. to $-100°$ C. In some embodiments, the polyol's PFPE moiety is a perfluoro polyether that has a glass transition temperature in the range from $-160°$ C. to $-10°$ C. or in the range from $-130°$ C. to $-50°$ C.

In further embodiments of these polyol aspects, monomers of FS include $CH_2=CH-CO_2$-PFPE, $CH_2=CH-CO_2$-Krytox, $CH_2=C(CH_3)-CO_2$-PFPE, $CH_2=C(CH_3)-CO_2$-Krytox, or $CH_2=C(CH_3)COOCH_2CH_2OOCCF(CF_3)[CF_2-CF(CF_3)O]_iCF_3$. In some embodiments, the FS moiety is polysiloxane grafted to a polymer, wherein the polymer is selected from polyacrylate, polymethacrylate, polyacrylic acid, polymethacrylic acid, polystyrene, polyvinyl ester, or a random copolymer that comprises acrylates, methacrylates, styrenes, and vinyl esters. In some embodiments, the FS moiety is PFPE grafted to a polymer, wherein the polymer is selected from polyacrylate, polymethacrylate, polyacrylic acid, polymethacrylic acid, polystyrene, polyvinyl ester, or a random copolymer that comprises acrylates, methacrylates, styrenes, and/or vinyl esters. In some embodiments, the polyol is polysiloxane-g-poly(acrylate-styrene-methacrylate-vinyl ester), polysiloxane-g-poly(styrene-methacrylate-vinyl ester), polysiloxane-g-poly(acrylate-methacrylate-vinyl ester), polysiloxane-g-poly(acrylate-styrene-vinyl ester), polysiloxane-g-poly(acrylate-styrene-methacrylate), PFPE-g-poly(acrylate-styrene-methacrylate-vinyl ester), PFPE-g-poly(styrene-methacrylate-vinyl ester), PFPE-g-poly(acrylate-methacrylate-vinyl ester), PFPE-g-poly(acrylate-styrene-vinyl ester), PFPE-g-poly(acrylate-styrene-methacrylate), PFPE-g-P(HEMA-S-MMA), or PDMS-g-[HEMA-S-MMA].

In some polyol embodiments, FS further comprises at least one moiety that links FS to R or Mi. In some embodiments, the moiety that links FS is a methylene. In some embodiments, FS is a monomer that has PFPE or polysiloxane as a pendant group. In certain embodiments, the FS moiety is Demnum, Fluorolink Diol, Fomblin Z, Krytox®, or Aflunox. In some embodiments, the copolymer's polysiloxane moiety is a PDMS. In some embodiments, the polyol is PFPE-b-poly(acrylate-hydroxy (meth)acrylate, PFPE-b-poly(methacrylate-hydroxy (meth)acrylate), PFPE-b-poly(styrene-hydroxy (meth)acrylate), or PFPE-b-poly(vinyl ester-hydroxy (meth)acrylate). In some embodiments, the polyol is polysiloxane-b-poly(methacrylate-hydroxy(meth)acrylate), polysiloxane-b-poly(acrylic acid-hydroxy(meth)acrylate), polysiloxane-b-poly(styrene-hydroxy(meth)acrylate), polysiloxane-b-poly(vinyl ester-hydroxy(meth)acrylate), PFPE-b-poly(acrylate-hydroxy(meth)acrylate, PFPE-b-poly(methacrylate-hydroxy(meth)acrylate), PFPE-b-poly(styrene-hydroxy(meth)acrylate), or PFPE-b-poly(vinyl ester-hydroxy (meth)acrylate). In further embodiments, the polyol comprises hydroxy styrenes or vinyl alcohols.

In yet another aspect, the invention provides a method of making a clear amphiphobic coating on a substrate, which includes combining the following solutions to form a mixture: a solution of a copolymer that is a polyol that comprises a polysiloxane moiety, in a minimum amount of a first solvent; a solution of di-, tri- or poly-isocyanate bearing protecting groups on its isocyanate moieties, in a minimum amount of a first solvent, and, optionally, a solution of a polyol that does not comprise a polysiloxane moiety, in a minimum amount of a first solvent, wherein the first solvent is not water but is substantially water-miscible, adding water to the mixture; reducing the volume so that the first solvent is substantially removed thereby forming an aqueous coating solution; dispensing the aqueous coating solution onto a surface of a substrate; drying the coated substrate; and curing the coating. In some embodiments of this aspect, the first solvent is a ketone (e.g., acetone, ethylmethylketone), THF, ester (e.g., ethyl acetate), or 1,2-dimethoxyethane.

In another aspect, the invention provides a method of making a clear amphiphobic coating on a substrate, comprising combining the following to form a mixture: (i) a copolymer that is a polyol that comprises a polysiloxane moiety; (ii) di-, tri- or poly-isocyanate; and (iii) a solvent that solvates the mixture, heating, optionally, adding (iv) a polyol that does not comprise a polysiloxane moiety, and continuing to apply heat, cooling, dispensing the coating solution onto a surface of a substrate, drying the coated substrate, and curing the coating. In some embodiments of this aspect, the solvent is ketone (e.g., acetone, ethylmethylketone), ester (e.g., ethyl acetate), or 1,2-dimethoxyethane.

In another aspect, the invention provides a method of making a clear amphiphobic coating on a substrate, comprising combining the following to form a mixture: (i) a copolymer that is a polyol that comprises a polysiloxane moiety; (ii) di-, tri- or poly-isocyanate; and, (iii) a first solvent that solvates the mixture, optionally, adding (iv) a polyol that does not comprise a polysiloxane moiety, adding a second solvent that selectively solvates a portion of the mixture, the solvated portion being that which is not the polysiloxane moiety, removing the first solvent under reduced pressure, adding additional second solvent to form a coating solution, dispensing the coating solution onto a surface of a substrate, drying the coated substrate, and curing the coating. In some embodiments of this aspect, the first solvent is ketone (e.g., acetone, ethylmethylketone), THF, esters (e.g., ethyl acetate), or 1,2-dimethoxyethane. In certain embodiments of this aspect, the second solvent is the second solvent is acetonitrile or dimethyl carbonate.

In one aspect, the invention provides an epoxy-based coating composition that comprises polysiloxane and/or fluorinated moieties, wherein crosslinked coatings prepared from the coating composition are amphiphobic, anti-smudge, clear and wear-resistant.

In embodiments of the above aspect, when droplets of water or hydrophobic liquid are placed on a substrate coated with a crosslinked coating prepared from the coating composition, and the substrate is tilted, the droplets slide off. In embodiments of the above aspect, the epoxy-based coating composition is from 0.1 to 40% wt % siloxane and/or from 0.1 to 40% wt % fluorine. In embodiments of the above aspect, the coating composition further includes embedded particles and/or a biocide. In embodiments of the above aspect, the embedded particles are silica, titania, diatomaceous earth, alumina, $TiO_2$, and/or pigments.

In another aspect, the invention provides a coating composition prepared by combining a polymer comprising functional moieties, and polysiloxane moieties or fluorinated moieties, an epoxy resin, a hardener, and optionally a solvent. In embodiments of the above aspect, the hardener comprises a polyamine, a polyol, a polyimine, a poly(anhydride), a poly(carboxylic acid), a polyphenol, a polythiol, or any combination thereof, wherein poly is 2 or more than 2. In embodiments of the above aspect, the polyanhydride is an oligomer of styrene and maleic anhydride.

In embodiments of the above aspect, the hardener comprises poly(oxypropylene) diamine, nonylphenol, triethanolamine and piperazine. In embodiments of the above aspect, the polyol is triethanolamine, an oligomer containing hydroxyl-bearing monomer units such as 2-hydroxylethyl methacrylate or 2-hydroxyethyl acrylate, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, phenyldiethanolamine, glycerol, trimethylolpropane, 1,2,6-hexanetriol, triethanolamine, pentaerythritol, or N,N,N',N'-tetrakis(2-hydroxypropyl)ethylenediamine.

In other embodiments of the above aspect, the polyamine is poly(oxypropylene) diamine, poly(ethylene imine), ethylenediamine (EDA), diethylenetriamine (DETA), dipropylene triamine (DPTA), rriethylenetetramine (TETA), tetraethylene pentamine (TEPA), diethylamino propylamine (DEAPA), 3-dimethylaminopropylamine (DMAPA), trimethylhexamethylenediamine (TMDA), isophoronediamine (IPDA), N-aminoethyl piperazine, 3,3'-dimethyl-4,4-diaminodi-cyclohexylmethane, 4,4'-diaminodiphenylmethane (DDM), m-Phenylene diamine (MPDA), p,p'-diaminodiphenylsulphone (DDs), 2,4,6-tris-dimethylaminomethylphenol (tris-DMP), or 1,3-xylylene diamine. In certain embodiments of the above aspect, the poly(anhydride) is an oligomer of styrene and maleic anhydride, phthalic anhydride (PA), maleic anhydride (MA), methylhexahydrophthalic anhydride (MHHPA), methyltetrahydrophthalic anhydride (MTWPA), hexahydrophthalic anhydride (HHPA), trimellitic anhydride (TMA), or dodecenyl-succinic anhydride (DSA).

In embodiments of the above aspect, the epoxy resin comprises polyglycidyl bisphenol A diglycidyl ether, bisphenol F, bisphenol S, novolac epoxy resin, aliphatic epoxy resin, glycidylamine epoxy resin, and/or a combination thereof. In embodiments of the above aspect, the polysiloxane moieties comprise PDMS. In embodiments of the above aspect, fluorinated moieties comprise perfluorinated polyether or PFPE (e.g., PFPO, Demnum, Fluorolink).

In embodiments of the above aspect, the coating has a weight percentage of PDMS in a range of 0.1 wt % to 40 wt %. In embodiments of the above aspect, the coating has a weight percentage of PDMS in a range of 1.0 and 10 wt %. In embodiments of the above aspect, the coating has a weight percentage of PDMS of 1.0%, 5.0%, 8.0% or 12%. In embodiments of the above aspect, the coating has a weight percentage of PFPE in a range of 0.1 wt % to 40 wt %. In embodiments of the above aspect, the coating has a weight percentage of PFPE (e.g., PFPO) of 1.0%, 5.0%, 8.0% and 12%.

In an aspect, the invention provides use of a clear amphiphobic coating comprising the coating of any one of the aspects described above or embodiments thereof.

In yet another aspect, the invention provides a method of making a coating composition comprising combining a polymer, which comprises functional moieties and siloxane moieties or fluorinated moieties, with an epoxy resin, optionally a solvent, and a hardener.

In embodiments of the above aspect, the optional solvent is acetonitrile, dimethylformamide, tetrahydrofuran, ketone (e.g., acetone, ethylmethylketone), esters (e.g., ethyl acetate), 1,2-dimethoxyethane, acetonitrile, chloroform, or pyridine.

In an aspect, the invention provides use of an amphiphobic epoxy-based composition comprising the composition of any one of the above aspects and embodiments thereof.

In another aspect, the invention provides a method of forming a clear amphiphobic coating on a substrate, comprising combining the following to form a mixture: a polymer comprising functional moieties, and polysiloxane moieties or fluorinated moieties, and an epoxy resin, optionally a solvent, and a hardener; applying the coating solution onto a surface of a substrate; drying the coated substrate; and curing the coating.

In embodiments of the above aspect, the applying the coating solution is applying a volume of solution sufficient to form a film thickness of about 1 μm to about 1 mm.

In embodiments of the above aspect, the applying the coating solution comprises brushing, rolling, dip-coating, solution casting, aero-spraying, and dispensing the coating solution. In embodiments of the above aspect, the functional moieties comprise amine, imine, hydroxyl, carboxyl, and/or anhydride.

BRIEF DESCRIPTION OF THE DRAWINGS

For a better understanding of the invention and to show more clearly how it may be carried into effect, reference will now be made by way of example to the accompanying drawings, which illustrate aspects and features according to embodiments of the present invention, and in which:

FIG. 9 shows time-sequence pictures of hexadecane on FPU-coated steel and wooden surfaces. In addition, images of a water droplet test performed on a FPU-coated cotton sample are also shown.

As shown at the right hand side, the amount of unreacted PDMS diminishes as the reaction progresses.

Figure 22A:
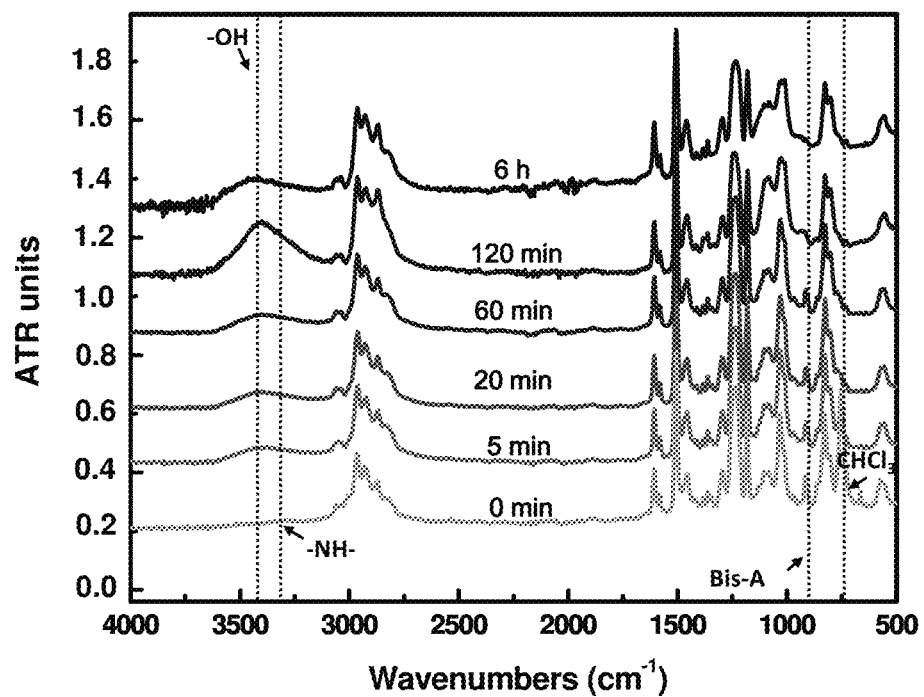

FIG. 22A displays ATR-IR (attenuated total reflectance infrared (ALPHA instrument available through Bruker) spectra recorded during the thermal curing of a PDMS modified epoxy resin film (specifically Bis-A) at 150° C. under the conditions of Example 39A where PEI-g-PDMS was the only hardener present.

Figure 22B:
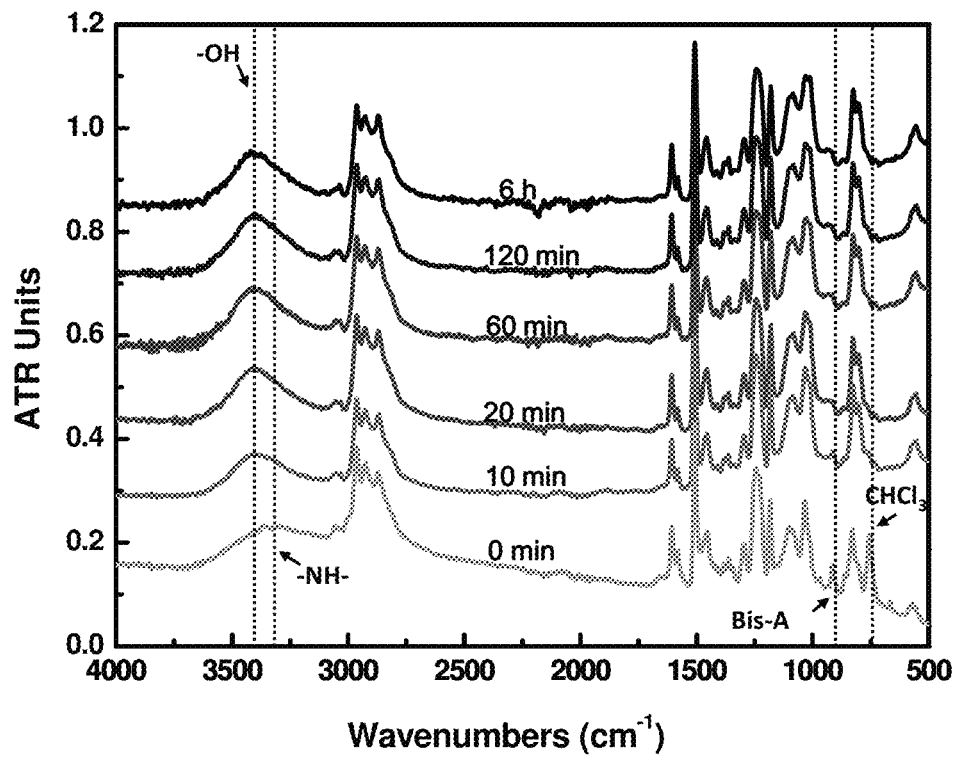

FIG. 22B displays ATR-IR (attenuated total reflectance infrared (ALPHA instrument available through Bruker) spectra recorded during the thermal curing of a PDMS modified epoxy resin film (specifically EDGBA or Bis-A) at 120° C. under the conditions of Example 40 where PEI-g-PDMS is mixed with a mixture of other hardeners including polyoxypropylenediamine, nonylphenol, triethanolamine and piperazine.

FIG. 23 is a plot of Transmittance versus film thickness at 500 nm for PEI-g-PDMS modified epoxy coatings as a functions of film thickness at PDMS wt % of 2.1%, 4.0%, 7.4%, and 10.3%, for films made with no other hardeners than the PEI-g-PDMS.

FIG. 24A-H shows anti-graffiti properties of PEI-g-PDMS modified epoxy coatings having 4.0 wt % PDMS as well as unmodified "regular" epoxy coatings. FIG. 24A shows the unmodified coating on a vertically-positioned glass slide after oil based spray Paint A has been sprayed on it. FIG. 24B shows modified coating on a vertically-positioned glass slide after Paint A has been sprayed on it; notice how the paint has slid off to the bottom. FIG. 24C shows the unmodified coating on a vertically-positioned glass slide after oil based spray Paint B had been sprayed on it. FIG. 24D shows modified coating on a vertically-positioned glass slide after Paint B had been sprayed on it; notice how the paint has slid off to the bottom. FIG. 24E shows a glass slide bearing unmodified coating after a permanent black marker has been used to draw a black mark on it. FIG. 24F shows a glass slide bearing modified coating after a permanent black marker has been used to draw a black mark on it, note that the ink does not stick and has formed little balls of ink on the surface. FIG. 24G shows the same slide as 24F when a portion of the marker mark has been wiped with a dry tissue. FIG. 24H shows a glass slide bearing modified coating after a rubbing test was conducted for 18 hours, following the rubbing, a black marker has been used to draw a black mark on it, note that the coating has exhibit good durability and the ink does not stick.

Figure 25:
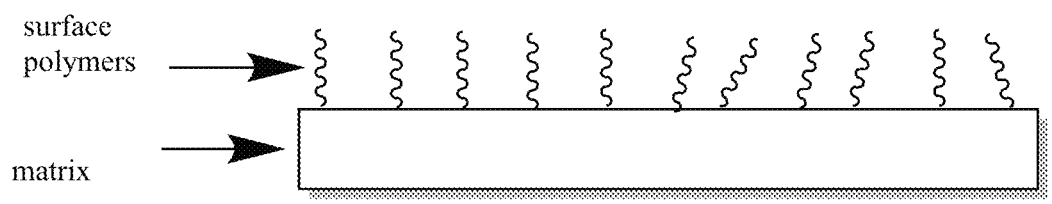

FIG. 25 shows a schematic that illustrates a matrix and surface polymers.

DETAILED DESCRIPTION OF THE INVENTION

Definitions

As used herein, the term "unsubstituted" refers to any open valence of an atom being occupied by hydrogen. Also, if an occupant of an open valence position on an atom is not specified then it is hydrogen.

As used herein, a "functional group" is a specific atom or group of atoms within a molecule that are responsible for characteristic chemical reactions. Thus functional groups are moieties within a molecule that are likely to participate in chemical reactions.

As used herein, "aliphatic" refers to hydrocarbon moieties that are straight chain, branched or cyclic, may be alkyl, alkenyl or alkynyl, and may be substituted or unsubstituted. "Short chain aliphatic" or "lower aliphatic" refers to $C_1$ to $C_4$ aliphatic. "Long chain aliphatic" or "higher aliphatic" refers to $C_5$ to $C_{25}$ aliphatic.

As used herein, an "amphiphobic" material or surface is one that is both hydrophobic and oleophobic or lipophobic.

In an embodiment, a material or surface is considered to be amphiphobic when drops of oil (i.e., hydrophobic liquid) and drops of water roll readily off the material or surface when the material or surface is tilted from the horizontal position at an angle of 90 degrees or less. It should be understood that the term "amphiphobic" is not limited to repelling only water and oil. In certain embodiments, an amphiphobic material or surface will repel not only water and oil but also other substances, such as fingerprints, salt, acid, base, bacteria, etc.

As used herein, "heteroatom" refers to non-hydrogen and non-carbon atoms, such as, for example, O, S, P, and N.

As used herein, "polymer" refers to a large molecule, or macromolecule, composed of many repeated units.

As used herein, the term "copolymer" refers to a polymer having more than one type of monomer units. As used herein, the term "co" refers to copolymer.

As used herein, the term "grafted copolymer" refers to a copolymer with a linear backbone of one polymer and randomly distributed side chains of another polymer.

As used herein, the term "b" refers to block.

As used herein the term "block copolymer" refers to a type of copolymer that is made up of blocks of different polymerized monomers. Block copolymers may be prepared by first polymerizing a first polymer from a first monomer, and then subsequently polymerizing a second monomer from the reactive end of the first polymer. The resultant polymer is a "diblock copolymer" because it contains two different chemical blocks. Triblocks, tetrablocks, multiblocks, etc. can also be made.

As used herein, the term "engineering plastic" refers to plastic materials that have better mechanical and/or thermal properties than the more widely used commodity plastics.

As used herein, the term "PU", or "polyurethane" refers to a polymer composed of a chain or a network of subunits joined by carbamate (urethane) links. Polyurethane polymers are most commonly formed by reacting an isocyanate with a polyol.

As used herein, the term "FPU" refers to a modified polyurethane that includes perfluoropolyether moieties.

As used herein, the term "PDMSPU" refers to a polyurethane that is modified and includes polydimethylsiloxane moieties.

As used herein, the term "HDID" refers to hexamethylene diisocyanate dimer.

As used herein, the term "PS" refers to polystyrene.

As used herein, the term "PDMS" refers to polydimethylsiloxane.

As used herein, the term "PDMS-epoxy" refers to an epoxy that includes polydimethylsiloxane moieties.

As used herein, the term "PFPO" refers to poly(perfluoroisopropylene oxide).

As used herein, the term "PFPO-epoxy" refers to an epoxy that includes poly(perfluoroisopropylene oxide) moieties.

As used herein, the term "PFPE" refers to perfluoropolyether, examples of PFPEs include PFPO, Demnum (available from Daikin), or Fluorolink (available from Solvay.

As used herein, the term "P1" refers to a solid powder that is P (S-MMA-MAA-BMA-iPMA-VP-HEGEMA-HEMA) having the full name as Poly(styrene-methyl methacrylate-methacrylic acid-butyl methacrylate-isopentyl methacrylate-vinyl propanoate-(2-hydroxy-ethylene glycol)ethyl methacrylate-2-hydroxyethyl methacrylate). P1 is a powdered solid that is obtained by adding P1-0 to a hexane and ether mixture.

As used herein, the term "P1-0" refers to a commercially-available solution of unmodified polyol P1.

As used herein, the terms "P10" "P20" and "P30" refer to polymers whose structural formulae are shown in FIGS. 10-17.

As used herein, the term "PB" refers to polybutadiene.

As used herein, the term "PIB" refers to polyisobutylene.

As used herein, the term "PEI" refers to polyethylenimine.

As used herein, the term "PEO" refers to poly (ethylene glycol) methyl ether.

As used herein, the term "S" refers to styrene.

As used herein, the term "DMF" refers to N,N-dimethylformamide.

As used herein, the term "GPO" refers to gel permeation chromatography.

As used herein, the term "MA" refers to maleic anhydride.

As used herein, the term "MMA" refers to methyl methacrylate.

As used herein, the term "HDID" refers to dimeric hexamethylene diisocyanate.

As used herein, the term "HEMA" refers to 2-hydroxy ethyl methacrylate.

As used herein, the term "MAA" refers to methacrylic acid.

As used herein, the term "BMA" refers to butyl methacrylate.

As used herein, the term "iPMA" refers to isopentyl methacrylate.

As used herein, the term "VP" refers to vinyl propanoate.

As used herein, the term "HEGEMA" refers to 2-(hydroxyl ethylene glycol)ethyl methacrylate.

As used herein, the term "HEMA" refers to 2-hydroxyethyl methacrylate.

As used herein, the term "ATRP" refers to atom transfer radical polymerization.

As used herein, the term "PFPE-COOH" refers to perfluoropolyether carboxylic acid.

As used herein, the term "FEGEMA" refers to PFPE grafted EGEMA.

As used herein, the term "FEMA" refers to PFPE grafted HEMA.

As used herein, the term "P[(S-MMA-MAA-BMA-IBMA-VP-EGEMA-HEMA)-g-PFPE]" refers to perfluoropolyether grafted P(S-MMA-MAA-BMA-IBMA-VE-EGEMA-HEMA).

As used herein, the term "P[(S-MMA-MAA-BMA-IBMA-VP-EGEMA-HEMA)-g-PDMS]" refers to poly(dimethyl siloxane) grafted P(S-MMA-MAA-BMA-IBMA-VE-EGEMA-HEMA).

As used herein, the term "EBrIB" refers to ethyl α-bromoisobutyrate.

As used herein, the term "P(TFEMA-co-HEMA)" refers to copolymer poly(trifluoroethyl methacrylate-co-2-hydroxyethyl methacrylate).

As used herein, the term "P(HEMA-S-MMA)" refers to a copolymer poly((2-hydroxyethyl methacrylate)-styrene-methyl methacrylate).

As used herein, the term "PEI-g-PDMS" refers to polyethylenimine-g-PDMS.

As used herein, the term "P(S-alt-MA)-g-PDMS" refers to Poly(styrene-alt-maleic anhydride)-g-PDMS.

As used herein, the term "TFEMA" refers to trifluoroethyl methacrylate.

As used herein, the term "PGMA" refers to poly(glycidyl methacrylate).

As used herein, the term "% T" refers to percent transmittance.

As used herein, the term "fluoro density" refers to the percentage of hydroxyl side chains that have been replaced by fluorinated moieties such as PFPE. For example, 13.6% fluoro density refers to a polymer wherein 86.4% of the hydroxyl groups remain, and 13.6% of the positions that were formally hydroxyl are now occupied by PFPEs.

As used herein, the term "siloxane density" refers to the percentage of hydroxyl side chains that have been replaced by siloxane such as PDMS. For example, 11.3% siloxane density refers to a polymer wherein 88.7% of the hydroxyl groups remain, and 11.3% of the positions that were formally hydroxyl are now occupied by PDMS chains.

EMBODIMENTS

Embodiments of the invention provide coating compositions that are capable of forming a coating that has oil- and water-repellent properties. The major component of the coating is in contact with a coated substrate and forms a solid matrix that is formed, for example, by crosslinks that are formed in the curing process. Although the minor component may be found dispersed throughout the coating, at least some species of the minor component are located at the surface. This surface location of at least a portion of the minor component provides the cured coating with special properties.

This surface layer has polymers that are only attached at one end while the other end is unbound (see FIG. 25 for an illustration). This minor component is thus bound to the matrix at one end, but its other end is unbound. The second component includes a polymer that has a glass transition temperature below 25° C. Due to the dynamic nature of these polymers with a relatively low Tg, these polymers are liquid-like in their nature. (In some embodiments, these polymers are inherently waxy but may become liquid-like when plasticised by moisture adsorbed from air or taken up from its environment.) Due to its fluid nature, these polymers are capable of migrating to the surface during the drying and curing processes.

These singly-bound polymers located at the surface are constantly in motion and are referred to herein as dynamic. The constant motion of these surface polymers provides amphiphobic, anti-smudge and anti-graffiti properties to the coatings. The dynamic component behaves like a liquid, but this does not mean that the coating's surface is wet. Instead, it means that the surface polymers act in a liquid-like manner. As mentioned above, although the species of the dynamic component that are conferring special properties are the ones at the surface, there are others dispersed throughout the matrix. Because of their presence throughout, when the coating is worn down, some of the dynamic components that were formerly embedded in the matrix become newly exposed to the surface. In this way, the amphiphobic anti-smudge properties of the coating endure even when the coating experiences wear.

Major Component

The major component that provides a solid matrix can be any engineering plastic that has a high glass transition temperature or any polymer that has a high glass transition temperature and that crosslinks to form a solid polymeric coating. In certain embodiments, the solid coating is transparent (i.e., clear). Polyurethane and epoxy are used herein as non-limiting representative examples for this major component. The inventors suggest that other polymers with a glass transition temperature that is higher than about 120° C. would also be suitable. Suitable major components include: engineering plastics with a glass transition temperature (Tg) or with a melting temperature (Tm) of greater than about 100° C. Such polymers and engineering plastics include: Polystyrene (PS), Polyvinyl chloride (PVC), Polypropylene (PP), Polyethylene (PE), Poly (acrylonitrile butadiene styrene) (ABS), Nylon 6, Nylon 6-6, Polyamides (PA), Poly (butylene terephthalate) (PBT), Polycarbonates (PC), Poly (etheretherketone) (PEEK), Poly(etherketone) (PEK), Poly (ethylene terephthalate) (PET), Polyimides, Poly (oxymethylene) plastic (POM/Acetal), Poly(phenylene sulfide) (PPS), Poly(phenylene oxide) (PPO), Polysulfone (PSU), Poly(tetrafluoroethylene) (PTFE/Teflon), Ultra-high-molecular-weight polyethylene (UHMWPE/UHMW). They also include Semi-crystalline or Crystalline Plastics with a Tm greater than about 50° C., such as: Nylon (PA66 and PA6), Poly(oxymethylene) (POM), Poly(ethylene terephthalate) (PET), Poly(butylene terephthalate) (PBT), Polytetrafluoroethylene (PTFE), isotactic polypropylene, atactic polypropylene, High-density polyethylene, or Low-density polyethylene. They also include polymers that are crosslinkable such as Polyurethane, Epoxy resin, Poly acrylate, Polymethacrylate, Polystyrene, Polyimide, Polyamine, Polysulfone, Polyester, or Polycarbonate.

Dynamic Component

A variety of polymers have been used in the examples provided herein as the minor component, which is dynamic (i.e., in motion). Without wishing to be bound by theory, the inventors suggest that suitable polymers for the dynamic minor component have a Tg that is about 25° C. or that is less than 25° C. This Tg is significantly lower than the Tg of the matrix's major or core component. The dynamic quality of the minor component's species that are located at the surface confer special properties on the coating that are desirable. Such special properties include anti-smudge, anti-wetting and amphiphobicity. Examples of components that have been shown to provide anti-smudge, anti-wetting, and amphiphobic properties include, for example, polysiloxane, perfluorinated polyether, polyisobutylene, and polybutadiene, poly(ethylene oxide) polymers, and polypropylene oxide. Non-limiting examples include P(S-alt-MA)-g-PEO$_{750}$, P(S-aft-MA)-g-PEO$_{2000}$, P(S-aft-MA)-g-PEO$_{5000}$, and Polyol-g-PIB.

Representative example coatings are described herein for combinations of certain dynamic minor components with polyurethane as well as epoxy core major components. Accordingly, embodiments of the invention provide polyurethane-based coatings and adhesives and epoxy-based coatings and adhesives. Such coatings and adhesives are optically-clear, amphiphobic, and, importantly, are thick enough and durable enough to endure wear. Such coatings are suitable for a variety of surfaces and are repellent against both water- and oil-borne contaminants. On surfaces coated with this durable and optically-clear amphiphobic coating, fingerprints and smudges do not readily deposit. If they are deposited, they are readily removable due to repulsion of the coating against the contaminants.

Coatings that include components or moieties that exhibit dynamic chain mobility at room temperature are described herein. In embodiments of the invention, dynamic component that are located at or near the surface have one end covalently linked to a crosslinked matrix while the other end is not linked and may move around. This chain mobility allows these chains to migrate to the surface. Although not wishing to be bound by theory, the inventors suggest that such free movement of chains (i.e., dynamic chain mobility at room temperature) prevents formation of permanent contacts between a foreign substance (e.g., rain, ink, paint, or greasy fingerprints) and the coating. Where the coating is on a surface that is flat and is lacking solid protrusions, a liquid foreign substance readily slides off the coated surface. Such water and oil repellency properties of these amphiphobic polyurethane-based and epoxy-based formulations are quantified in the working examples provided herein.

The compositions described herein are useful as coatings, paints, adhesives and many other uses that traditional polyurethane- or epoxy-based compositions are used for. For simplicity, they are referred to simply as coatings herein.

Polysiloxane, perfluorinated polyethers, poly(ethylene oxide), polybutadiene, and polyisobutylene are used herein as representative examples for the dynamic minor component of such coatings. However, these examples should not be limiting. The inventors suggest that other polymers that have a glass transition temperature that is about 25° C. or less than 25° C. would also be suitable. Such polymers include: poly(alkene) and Poly(halogenated alkene) polymers such as, polyethylene (atactic) Tg=–20° C., polybutene Tg=–24° C., polyethylene (HDPE) Tg=–125° C., poly(cis-isoprene) Tg=–63° C., poly(trans-isoprene) Tg=–66° C., poly(1-octane) Tg=–63° C., atactic polypropylene, Tg=–13° C., isotactic polypropylene, Tg=–8° C., syndiotactic polypropylene, Tg=–8° C., poly(vinyl propionate) Tg=10° C., poly(vinylidene chloride) Tg=–18° C., poly(vinylidene fluoride) Tg=–40° C., poly(cis-chlorobutadiene) Tg=–20° C., poly(trans-chlorobutadiene) Tg=–40° C. They also include polyacrylates such as, for example, poly(benzyl acrylate) Tg=6° C., poly(butyl acrylate), Tg=–54° C., poly(sec-butyl acrylate) Tg=–26° C., poly(2-cyanoethyl acrylate) Tg=4° C., poly(cyclohexyl acrylate) Tg=19° C., poly(dodecyl acrylate) Tg=–3° C., poly(ethyl acrylate) Tg=–24° C., poly(2-ethylhexyl acrylate) Tg=–50° C., poly(isobutyl acrylate) Tg=–24° C., poly(2,2,2-trifluoroethyl acrylate) Tg=–10° C., poly(2-ethoxyethyl acrylate) Tg=–50° C., isotactic poly (isopropyl acrylate), Tg=–11° C. They also include polymethacrylates such as, poly(benzyl acrylate) Tg=6° C., poly(diethylaminoethyl methacrylate) Tg=20° C., poly(dodecyl methacrylate) Tg=–65° C., poly(2-ethylhexyl methacrylate) Tg=–10° C., poly(hexadecyl methacrylate) Tg=15° C., poly(hexyl methacrylate) Tg=–5° C., poly(octadecyl methacrylate) Tg=–100° C., poly(octyl methacrylate) Tg=–20° C. They further include poly ethers and poly epoxides such as, for example, poly(propyl vinyl ether) Tg=–49° C., poly(methyl vinyl ether) Tg=–31° C., poly(methyl glycidyl ether) Tg=–62° C., poly(isobutyl vinyl ether) Tg=–19° C., poly(ethyl vinyl ether) Tg=–43° C., poly(2-ethylhexyl vinyl ether) Tg=–66° C., poly(dodecyl vinyl ether) Tg=–62° C., poly(butyl vinyl ether) Tg=–55° C., poly(butyl glydicyl ether) Tg=–79° C., poly(allyl glycidyl ether) Tg=–78° C., poly(ethylene oxide) Tg=–66° C., poly(propylene oxide) Tg=–75° C., poly(tetrahydrofuran) Tg=–84° C., poly(1,2-epoxybutane) Tg=–70° C., poly(1,2-epoxydecane) Tg=–70° C., poly(1,2-epoxyoctane) Tg=–67° C., poly(epibromohydrin) Tg=–14° C., poly(epichlorohydrin) Tg=–22° C., poly (trimethylene oxide) Tg=–78° C., poly(epibromohydrin) Tg=–14° C., poly(epichlorohydrin) Tg=–22° C. They also include poly esters such as, poly(tetramethylene terephthalate) Tg=17° C., poly(tetramethylene adipate) Tg=–118° C., poly(ethylene malonate) Tg=–29° C., poly(ethylene adipate) Tg=–46° C., or poly(ε-caprolactone) Tg=–60° C. They further include poly siloxanes such as, for example, poly (dimethylsiloxane) Tg=–127° C., or poly(methylphenylsiloxane) Tg=–86° C. They also include fluoropolymers, perfluoro polymers and phosphazene polymers such as, for example,

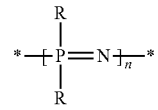

where R is $CH_3$, $C_6H_5$, $OCH_3$, $OC_6H_5$, $NR_2$, Cl, Br, F, $OCH_2CF_3$, or $OCH_2C_6H_5$. They also include poly ionic liquids such as, for example, Poly(1-glycidyl-3-butylimidazolium bis(trifluoromethanesulfonyl)imide). Other examples of such dynamic species include poly(formaldehyde) Tg=–82° C., poly(ethylene-trans-1,4-cyclohexyldicarboxylate) Tg=18° C., or poly(acetaldehyde) Tg=–32° C.

Polyurethane- and epoxy-based coatings have been investigated as representative examples of the major component of such coatings. Many studies regarding methods of making and characterization of the cured coating have been conducted and are described herein. In regard to the method of making the coatings, several techniques have been investigated regarding methods of making the clear amphiphobic coatings. Detailed steps are provided herein. Briefly, techniques were developed to attach the dynamic component to a reactant of polyurethane or to a reactant of epoxy. Importantly, it was also possible to merely add the dynamic component to the mixture of polyurethane reactants and not perform initial reactions to attach the dynamic component to one of the reactants. This technique allows the dynamic component to be sold separately as an additive (prior to drying/curing) that provides amphiphobic properties to an engineering plastic or any polymer that has a high glass transition temperature and that is capable of forming a solid polymeric coating. Details are provided in the Working Examples.

Polyurethane-Based Coatings

An optically-clear, amphiphobic, and durable polyurethane-based coating composition has been prepared and its properties have been quantified. This composition is prepared by including a new component to the traditional PU formulation of isocyanate and polyol. The new component is a polyol that bears PFPE, polysiloxane, or both PFPE and polysiloxane. This component may be an additive to the traditional formulation or it is may be used as a replacement in the absence of "regular" or "unmodified" polyol (that is, a polyol that does not comprise PFPE or polysiloxane). Specifically, this new coating composition is prepared by combining (i) isocyanate, and (ii) a copolymer that is a polyol that comprises PFPE, polysiloxane, or both PFPE and polysiloxane, and, optionally, further adding (iii) unmodified polyol.

Usually polyurethane is prepared using polyol as one of the crosslinking agents; however, it is known that polyurethane can be made using polyamine instead of polyol. That is, it can be prepared by combining diisocyanate and polyamine. The inventors envision that an amphiphobic coating composition may be prepared by combining (i) diisocyanate, and (ii) a copolymer that is a polyamine that comprises PFPE, polysiloxane, or both PFPE and polysiloxane, and, optionally, further adding (iii) polyamine. For simplicity, the discussion herein focusses on a modified polyol that bears PFPE, polysiloxane, or both. However, it is possible to prepare a corresponding composition using a modified polyamine that bears PFPE, polysiloxane, or both. The inventors also envision using a combination of polyol and polyamine with the copolymer "(ii)".

In embodiments of this invention, a method of preparing component (ii) is described. This copolymer component comprises a moiety (e.g., PFPE, polysiloxane) that confers amphiphobic properties on the product coating composition. In certain embodiments of the invention, such moieties are characterized by having a glass transition temperature in a particular range. Specifically, a PDMS-bearing copolymer has a glass transition temperature in the range of −60° C. to −150° C. A PFPE-bearing copolymer has a glass transition temperature in the range from −160° C. to −10° C. In certain embodiments, polyurethane-based coating composition prepared by these described methods have 1 to 40 wt % fluorine and/or 1 to 40 wt siloxane.

Two different approaches have been developed for incorporating PFPE and/or siloxane into such polyurethane (PU)-based amphiphobic coating compositions. The two approaches have been labelled Approach "A" for preparing component (ii) as a randomly grafted copolymer, and Approach "B" for preparing component (ii) as a block copolymer with a random block. The location of the PFPE or polysiloxane moieties is the key difference between these Approaches. Specifically, for the block copolymers, the PFPE or polysiloxane is added at one end of the copolymer's backbone. For the grafted copolymer, the PFPE or polysiloxane is located randomly at side chain positions along the copolymer. These approaches are discussed further below. Details regarding making clear coatings are provided in the Working Examples. Importantly, coatings have been made from solutions that include a variety of solvents. In some embodiments the coating is obtained from a solution of both a hydrophobic solvent and a water-miscible solvent. In some embodiments the hydrophobic solvent is used to solubilize the mixture, and then a water-miscible or aqueous solvent is added, and the hydrophobic solvent is removed. Examples of hydrophobic solvents include ketone such as acetone or ethylmethylketone, THF, ester such as ethyl acetate, or 1,2-dimethoxyethane. Examples of water-miscible solvents include acetonitrile or dimethyl carbonate.

When such PFPE or polysiloxane-bearing copolymers are added to isocyanate, and, optionally, unmodified polyol is also added, the resultant polyurethane-based coating is optically clear (i.e., transparent), durable, and resistant to both oil and water. Proof of such oil- and water-resistance is described herein. For example, droplets of water and droplets of oil that are in contact with such coatings simply slide off when the coated surface is at a sufficiently high tilting angle (such as 40° for hexadecane and 80° for water). After sliding off, there is no trace left behind. Another example is that when a coated surface is written upon using a permanent marker, the ink traces shrink and hardly leave a mark. Any ink traces that are left can be easily wiped off of these coatings with a dry cloth or the like. In contrast, uncoated glass shows clear traces of permanent marker that is difficult to remove and cannot merely be wiped off with a dry cloth. In addition, fingerprints are not readily deposited onto these coatings. If they do become imprinted, the prints are readily removed from these surfaces. Additionally, the coatings are sufficiently thick to endure wear.

Water-based polyurethane was also investigated and it was possible to add the dynamic component and make the resultant films amphiphobic. Notably, protecting groups were used on the polyisocyanate moieties to protect them from reacting with water. See Example 18 for details.

Embodiments of the current invention are moieties that are incorporated into a polyurethane matrix. Such moieties exhibit dynamic chain mobility at room temperature. In embodiments of the invention, one end of such polymer chains is covalently linked to the PU matrix while the other end is not linked and may move around. This chain mobility allows these chains to migrate to the surface. Although not wishing to be bound by theory, the inventors suggest that such free movement of chains (i.e., dynamic chain mobility at room temperature) prevents formation of permanent contacts between a foreign substance (e.g., rain, ink, paint, or greasy fingerprints) and the coating. Where the coating is on a surface that is flat and is lacking solid protrusions, a liquid foreign substance readily slides off the coated surface. Such water and oil repellency properties of these amphiphobic PU formulations are quantified in the working examples provided herein.

Such copolymers were investigated, one family included a fluorinated moiety and another family of copolymers included a polysiloxane moiety. Studies were conducted with mixtures of these moieties, with the result that samples having both fluorine and siloxane moieties behaved similarly to the fluorine-containing coatings with regard to sliding angle and contact angle. The copolymer that included fluorine was a perfluoropolyethers (PFPE). Examples of PFPEs that can be used include Krytox, which has a $T_g$ of ∼−71° C. (see Yarbrough, J. C. et al., *Macromolecules* 2006, 39, 2521), Demnum, which has a $T_g$ of ∼−115° C., and Fluoro-Link, which has a $T_g$ of approximately −72° C. (Organofluorine Chemistry: Principles and Commercial Applications, edited by Ronald Eric Banks, B. E. Smart, J. C. Tatlow, p. 466). A polysiloxane that can be used is PDMS, which has a $T_g$ of −125° C. (Clarson, S. J. et al., *Siloxane*

*polymers*; Prentice Hall Englewood Cliffs, N J, 1993). The chemical structures of some exemplary perfluoropolyethers and polysiloxanes are shown below.

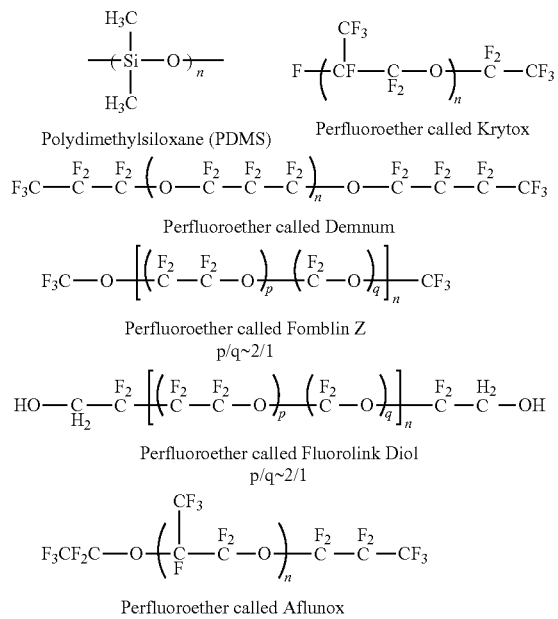

As introduced above, to provide water and oil repellency to PU formulations, two different approaches were used. Approach A used a PFPE-bearing or a PDMS-bearing graft copolymer. Approach B involved a block copolymer that included a PFPE or a PDMS block. General formulas are shown below for these approaches.

Approach A provides a graft copolymer has the following general formula:

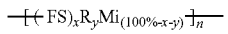

where

FS is a moiety that includes PFPE, polysiloxane, PEO, PIB, PB, or any combination thereof, such as, for example, Krytox, Demnum, Fluorolink D, and aflunox;

R is a moiety that includes a functional group (e.g., hydroxyl, amine, imine, carboxyl, glycidyl, isocyanate, or anhydride moieties) that is suitable for reaction with PU's main components (e.g., isocyanate);

Mi is one or more than one monomer (e.g., acrylates, methacrylates, styrenes, and vinyl esters or a combination thereof);

x is a number that represents the percentage of FS moieties;

y is a number that represents the percentage of R moieties; and n is number of repeat units.

Polysiloxane side chains that can be a part of a FS unit includes polydialkylsiloxane, where alkyl is $C_1$ to $C_{20}$, such as, for example, polydimethylsiloxane, polydiarylsiloxane, and polyalkylarylsiloxane.

Embodiments wherein the FS moiety has both PFPE and polysiloxane can exist in the form of two types of grafts incorporated into a copolymer in a statistical fashion. Alternatively, PFPE and polysiloxane moieties can co-exist in a single type of graft that is incorporated onto the copolymer. The PFPE moieties provide oil- and water-repellency to the resultant product. Similarly, polysiloxane repels oil and water because of its dynamic non-wetting properties.

Mi denotes one or more than one monomer that improves compatibility of this graft copolymer with other components of the final formulation for which it is being prepared. Such final formulations may be, for example, glue or paint formulations. Mi may be chosen to improve the mechanical, optical, and other properties of the final coating.

In certain embodiment, R, which is characterized by its functional group (e.g., hydroxyl, amino, carboxyl, glycidyl, isocyanate, or anhydride moieties) may have its functional group present in a protected form. That is, the functional groups may include protecting or blocking groups. They can include protected amino, protected isocyanate, protected carboxyl, and protected hydroxyl moieties. The functional groups are released (i.e., unprotected) upon exposure to heat, moisture or irradiation. By using blocking groups, it is possible to control the temperature or readiness of the glue curing chemistry.

Approach B provides a block copolymer with a random copolymer block that has the following general formula:

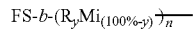

where the first block is FS, which is a polymer block that comprises PFPE, polysiloxane, PEO, PIB, PB, or any combination thereof. As an example of such a combination, in certain embodiments it is feasible to have FS comprise a first polymer block that comprises PFPE moieties, and a second polymer block that comprises polysiloxane moieties.

The term "b" represents the term block, as defined above.

The second block is a random copolymer having at least two and typically three components. R is a monomer that comprises a reactive moiety. That is, R bears at least one functional group that is suitable to react with an isocyanate moiety. Such functional groups may include, for example, OH, $NH_2$, epoxy, or glycidyl. The functional groups can also be protected versions of the afore-mentioned functional groups. Such protecting groups are released upon heating or upon exposure to moisture or upon exposure to irradiation. Such release exposes an unprotected functional group, which leads to reaction. By using these "blocking" groups, one can control the temperature at which the polymer mixture cures.

y is a number that represents the percentage of R moieties;

Mi denotes one or more than one monomer that is incorporated to improve compatibility of this random copolymer with other components of the final formulation for which it is being prepared. Such final formulations may be, for example, glue or paint formulations. Furthermore, Mi are chosen to improve the mechanical, optical, and other properties of the final coating. Examples of Mi include acrylates, methacrylates, styrenes, and vinyl esters.

n is number of repeat units.

While we have so far emphasized the modification of the polyol component using PFPEs and polysiloxanes, the inventors have also shown that one can also modify the polyisocyanate component of a PU formulation and leave the diol or polyol component alone (see Example 43). If one chooses to modify the polyisocyanate component, the isocyanate component should have more than two isocyanate groups per molecule so that one or more PFPE or polysiloxane chains can attach to a polyisocyanate molecule without reducing its isocyanate group number below 2.

Methods of how to make clear coatings that are amphiphobic and anti-smudge are described more fully in the Working Examples. Briefly, the methods include the following techniques.

Combine the following to form a mixture: (i) a copolymer that is a polyol that comprises a polysiloxane moiety, (ii) di-, tri- or poly-isocyanate, and, (iii) a first solvent (e.g., acetone) that solvates the mixture; heating, optionally, adding (iv) a polyol that does not comprise a polysiloxane moiety, and continuing to apply heat, cooling; adding a second solvent (e.g., acetonitrile, DMF, or dimethylcarbonate) that selectively solvates a portion of the mixture, the solvated portion being that which is not the polysiloxane moiety; removing the first solvent under reduced pressure; adding additional second solvent to form a coating solution; dispensing the coating solution onto a surface of a substrate; drying the coated substrate; and curing the coating. Curing may involve heating, adding a curing catalyst (e.g., a tertiary amine, Dibutyltin dilaurate) or both heating and adding a curing catalyst.

Combine the following to form a mixture: (i) a copolymer that is a polyol that comprises a PFPE moiety, (ii) di-, tri- or poly-isocyanate, and, optionally, adding (iii) a polyol that does not comprise a PFPE moiety, and adding a solvent (e.g., tetrahydrofuran) that solvates a portion of the mixture, the solvated portion being that which is not the PFPE moiety, to form a coating solution; applying the coating solution onto a surface of a substrate; drying the coated substrate; curing the coating.

Combine in any order (i) a polyol and/or a polyamine, (ii) di-, tri- or poly-isocyanate; and (iii) an additive that is a copolymer that comprises a siloxane moiety.

Combine (i) a polyol, and (ii) an additive that is a copolymer that comprises a siloxane moiety to form a mixture, and add (iii) di-, tri- or poly-isocyanate to the mixture.

Combine (i) a polyamine, and (ii) an additive that is a copolymer that comprises a siloxane moiety to form a mixture, and add (iii) di-, tri- or poly-isocyanate to the mixture.

Combine (i) a polyol and/or a polyamine, and (ii) poly-isocyanate that comprises a siloxane moiety. Item (ii) can be a product of reaction of di-, tri- or poly-isocyanate and an additive that is a copolymer that comprises a siloxane moiety (an example additive is polysiloxane-b-poly(glycidyl methacrylate))

Figure 1:
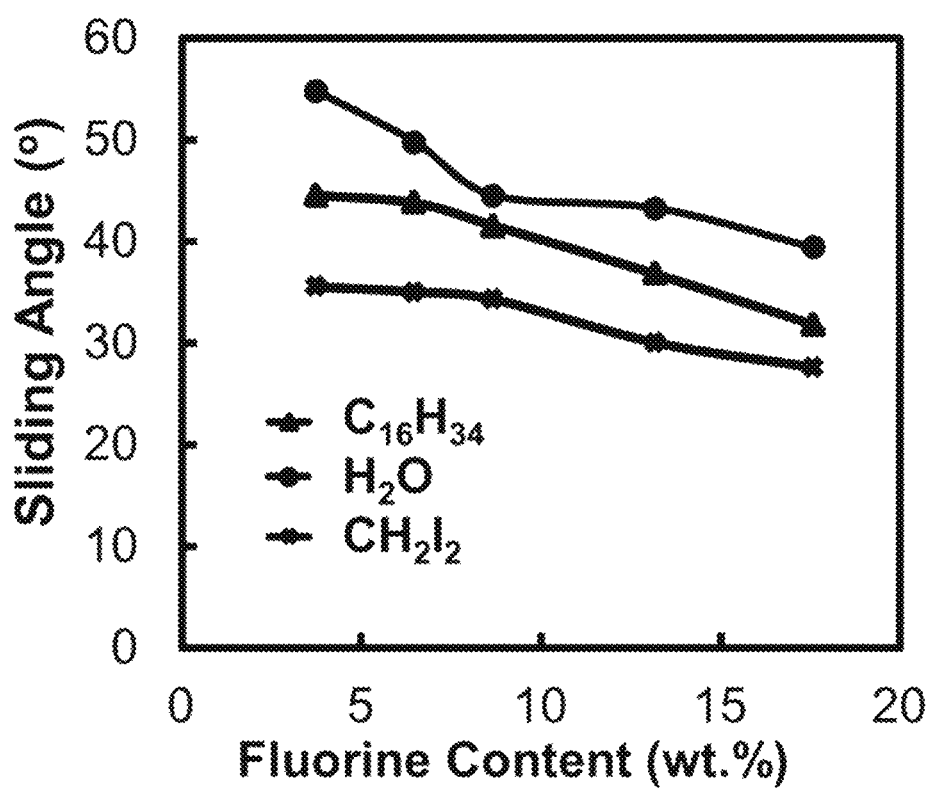
FIG. 1 shows a graph of sliding angle vs. F wt % fluorine content for films prepared from polymer of Example 1A(i).
Figure 2:
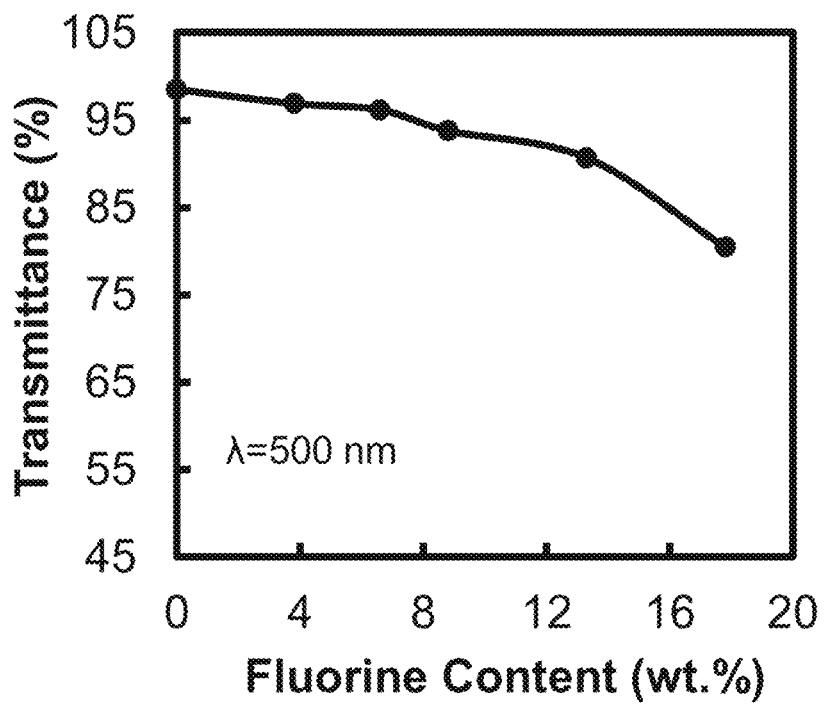
FIG. 2 shows a graph of % T vs. fluorine content for films prepared from Example 1A(i) where the % T values were recorded at a wavelength of 500 nm.
Figure 3:
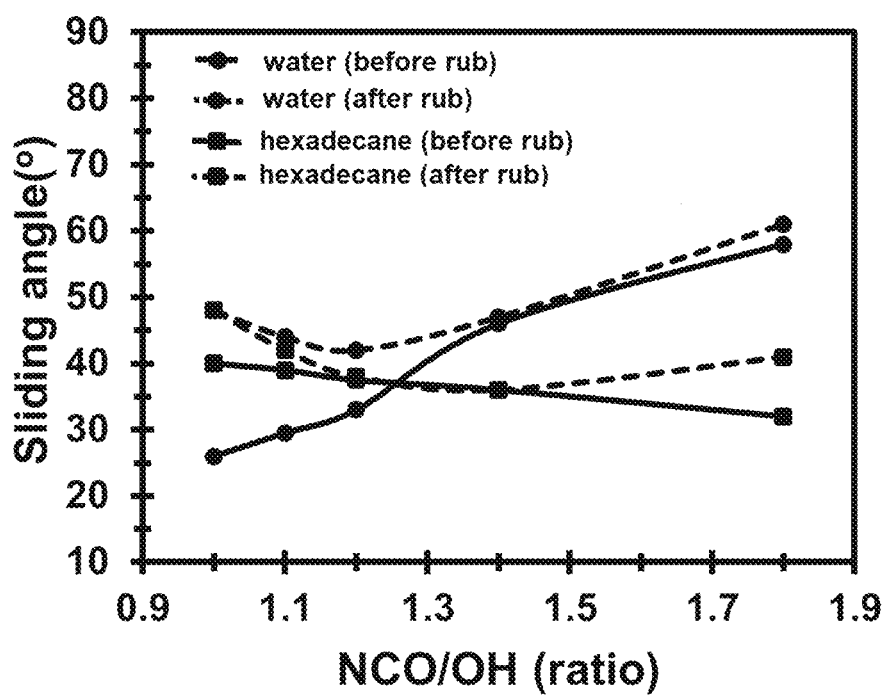
FIG. 3 graphically shows variation in the sliding angles vs. NCO/OH ratio for Example 1A(i) based FPU films. Solid lines show sliding angles measured before a rubbing test, while dotted lines denote sliding angles measured after a rubbing test. Rubbing tests were performed using a 400 g weight for 40 min at 40 rpm. The sliding angle tests were performed using 20 μL water droplets and 5 μL hexadecane droplets.
Figure 4:
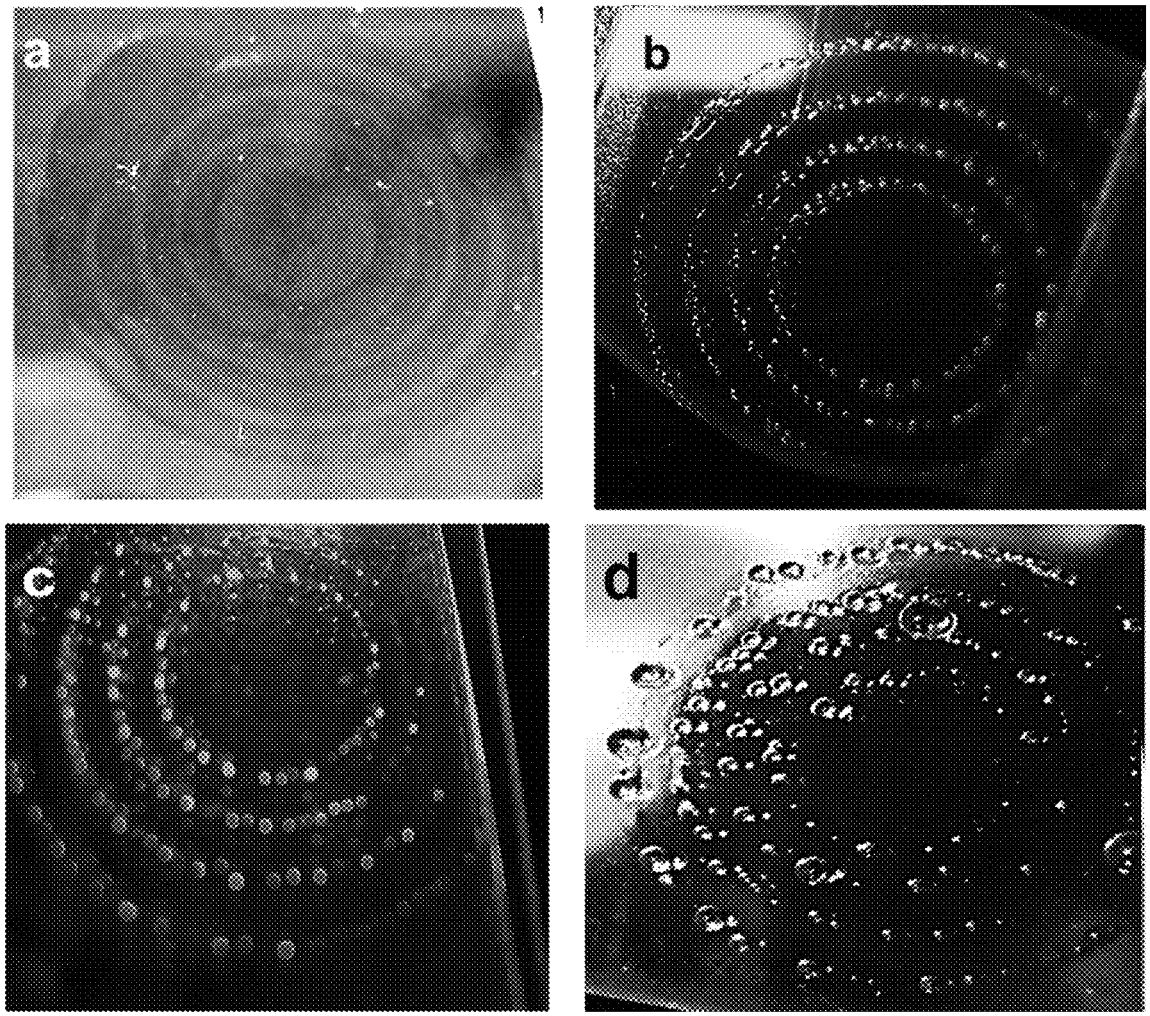
FIG. 4 shows photographs of artificial fingerprint impressions that were applied onto (a) ordinary glass; (b) glass coated with coating of Example 1A(i); (c) glass coated with coating of Example 1A(ii); and (d) glass coated with coating of Example 1C(ii).
Figure 5:
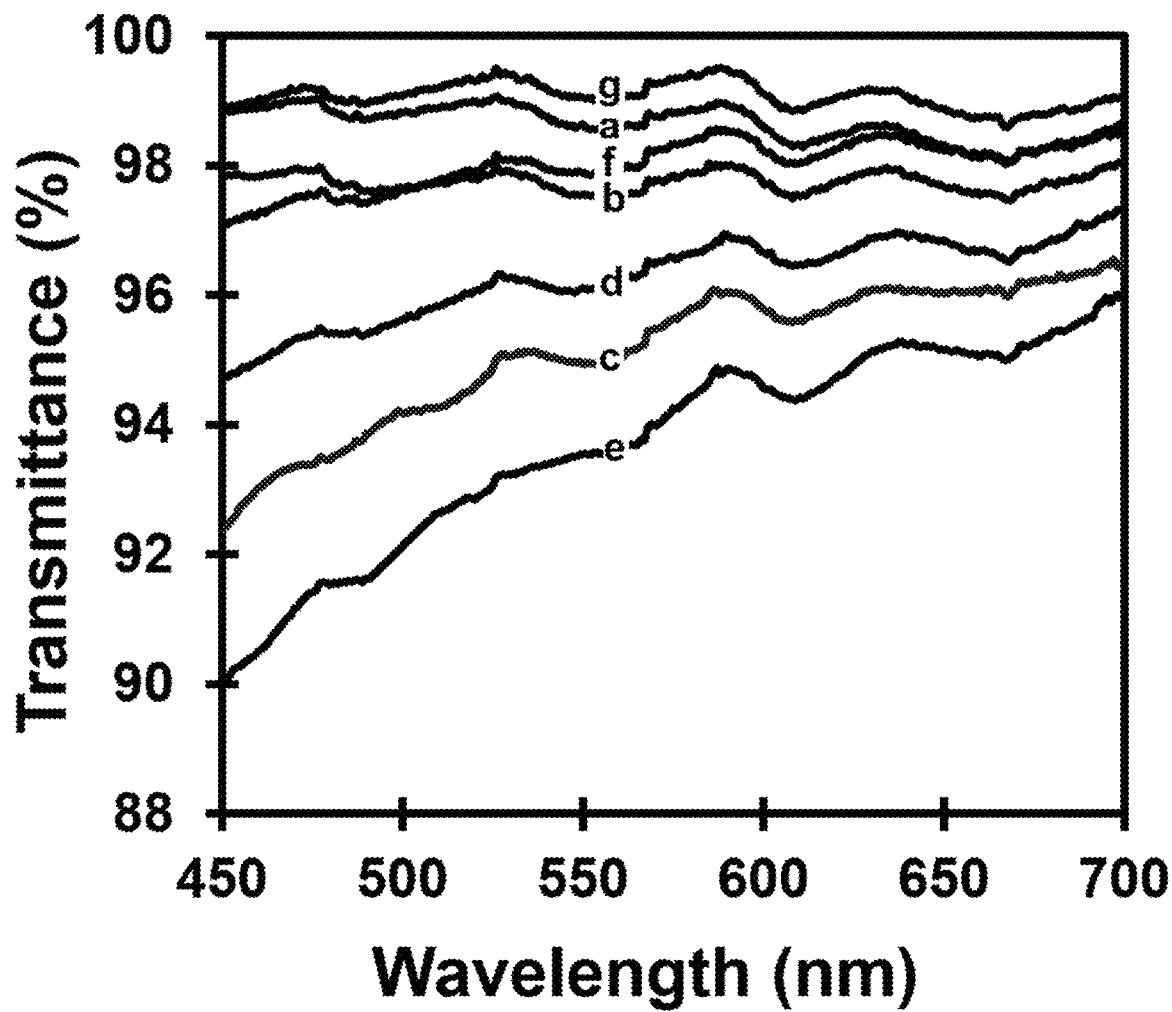
FIG. 5 shows % Transmittance spectra over a range of 450-750 nm observed for (a) uncoated glass; (b) unmodified drop cast polyurethane films; (c) PFPE PU films prepared from Example 1B(i); (d) PFPE PU films prepared from Example 1A(i); (e) PFPE PU films prepared from Example 1A(ii); (f) spin coated PFPE PU film just a few nm in thickness prepared from Example 1A(i); and (g) spin coated PFPE PU film just a few nm in thickness prepared from Example 1A(ii). All spin coated samples exhibited high % T values.

Specifically, FIG. 1 graphically demonstrates the relationship between sliding angle and weight percentage of fluorine for PU films prepared from Example 1B(i). FIG. 2 graphically demonstrates the relationship between percentage transmittance versus fluorine content for PU films prepared from Example 1A(i). FIG. 3 graphically shows variation in the sliding angles vs. NCO/OH ratio. Solid lines show sliding angles measured before a rubbing test, while dotted lines denote sliding angles measured after a rubbing test. Rubbing tests were performed using a 400 g weight for 40 min at 40 rpm. The sliding angle tests were performed using 20 μL water droplets and 5 μL hexadecane droplets. FIGS. 4a-d show photographs of artificial fingerprint impressions that were applied onto (a) ordinary glass; (b) glass coated with coating of Example 1A(i); (c) glass coated with coating of Example 1A(ii); and (d) glass coated with coating of Example 1C(ii). FIG. 4a shows a deep pattern on uncoated glass, indicating the easy acceptance of the smudge by uncoated glass. FIGS. 4b and 4c show dim patterns where the liquid has beaded-off into balls indicating anti-smudge properties. FIG. 4d shows a pattern that is between uncoated glass (FIG. 4a) and FPU coated glass (FIGS. 4b and 4c), indicating the antismudge properties that are better than ordinary glass. FIG. 5 demonstrates the clarity of films described herein by showing percentage transmittance versus wavelength observed for (a) uncoated glass; (b) unmodified drop cast polyurethane films; (c) PFPE PU films prepared from Example 1B(i); (d) PFPE PU films prepared from Example 1A(i); (e) PFPE PU films prepared from Example 1A(ii); (f) spin coated PFPE PU film just a few nm in thickness prepared from Example 1B(i); (g) spin coated PFPE PU film just a few nm in thickness prepared from Example 1A(i); and (h) spin coated PFPE PU film just a few nm in thickness prepared from Example 1A(ii). All spin coated samples exhibited high % T values showing clear films that are transparent.

Figure 6:
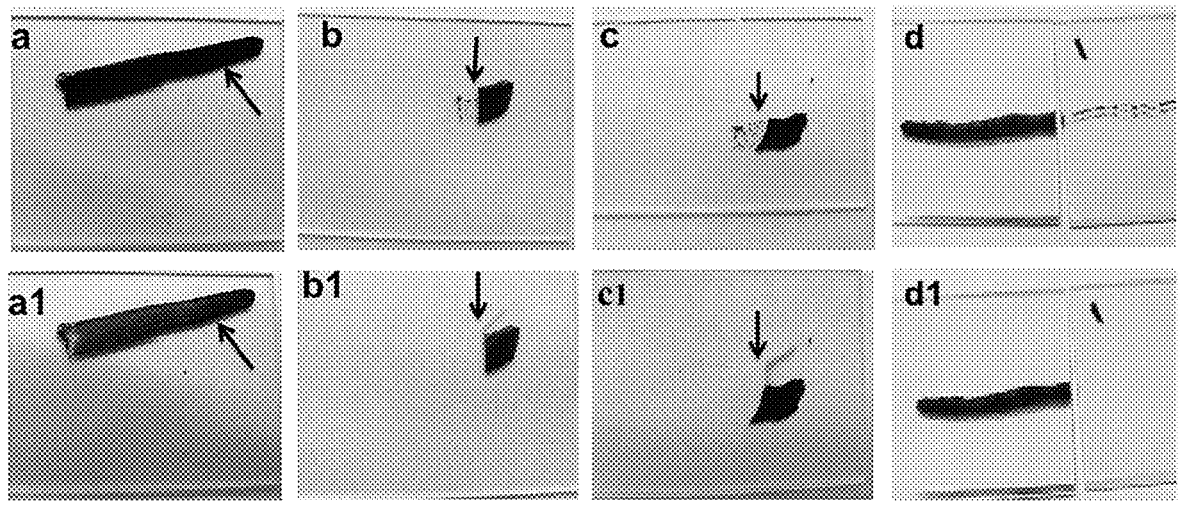
FIG. 6 shows an anti-ink test performed at the junction of uncoated glass and coated glass. Various coated samples that had been marked with a permanent marker (top row) and were subsequently cleaned via wiping (bottom row). Coatings were as follows:
a) unmodified PU bearing marker line;
b) PFPE PU films prepared from Example 1A(i) bearing marker line on coated glass to the left of the arrow, and bearing marker line on uncoated glass to the right of the arrow (notably, on the coated glass the marker ink is unable to form a line but instead appears as small round balls of ink);
c) PFPE PU films prepared from Example 1B(ii) bearing marker line on coated glass to the left of the arrow, and bearing marker line on uncoated glass to the right of the arrow (notably, on the coated glass the marker ink is unable to form a line but instead appears as small round balls of ink);
d) PDMS PU film from Example 1C(i) bearing marker line on coated glass to the right and uncoated glass to the left ((notably, on the coated glass the marker ink is unable to form a line but instead appears as small round balls of ink).
a1) unmodified PU after wiping;
b1) Example 1A(i) PFPE PU after wiping which shows that the ink that was on the coated glass (left of arrow) has wiped away completely, while the ink on the uncoated glass (right of arrow) remains;
c1) Example 1B(i) PFPE PU after wiping which shows that the ink that was on the coated glass (left of arrow) has wiped away completely, while the ink on the uncoated glass (right of arrow) remains.
d1) PDMS PU film from Example 1C(i) after wiping which shows that the ink that was on the coated glass (right) has wiped away completely, while the ink on the uncoated glass (left) remains.
Figure 7:
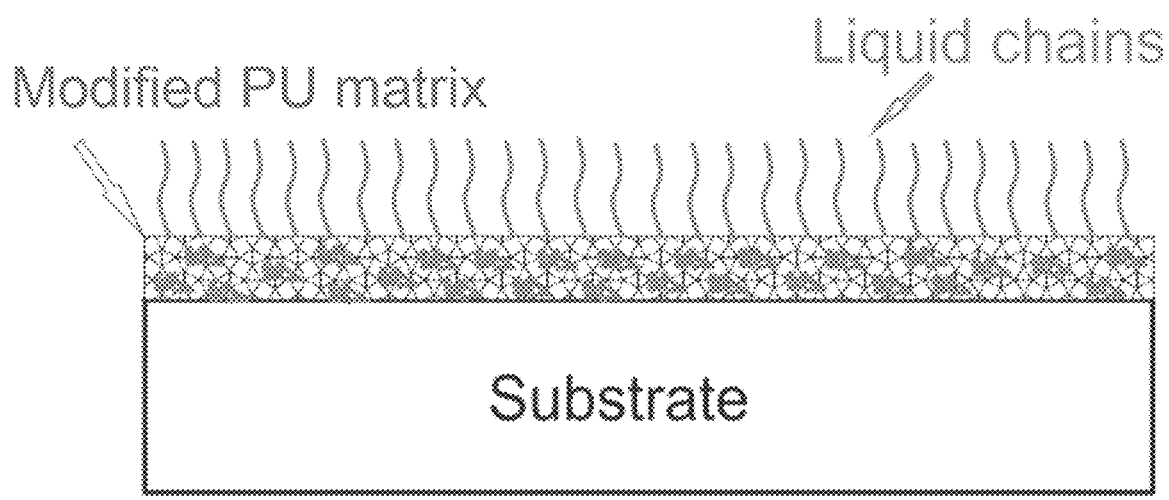
FIG. 7 shows a schematic representing PFPE or PDMS modified PU films.

FIG. 6 shows an anti-ink test performed at the junction of uncoated glass and coated glass. Various coated samples that had been marked with a permanent marker (top row) and were subsequently cleaned via wiping (bottom row). Coating were as follows: a) unmodified PU bearing marker line; b) PFPE PU films prepared from Example 1A(i) bearing marker line on coated glass to the left of the arrow, and bearing marker line on uncoated glass to the right of the arrow (notably, on the coated glass the marker ink is unable to form a line but instead appears as small round balls of ink); c) PFPE PU films prepared from Example 1B(ii) bearing marker line on coated glass to the left of the arrow, and bearing marker line on uncoated glass to the right of the arrow (notably, on the coated glass the marker ink is unable to form a line but instead appears as small round balls of ink); a1) unmodified PU after wiping; b1) Example 1A(i) PFPE PU after wiping which shows that the ink that was on the coated glass (left of arrow) has wiped away completely, while the ink on the uncoated glass (right of arrow) remains; c1) Example 1B(i) PFPE PU after wiping which shows that the ink that was on the coated glass (left of arrow) has wiped away completely, while the ink on the uncoated glass (right of arrow) remains. FIG. 7 shows a schematic representing formation of PFPE PU films.

Epoxy-Based Coatings

Transparent anti-smudge coatings were achieved by incorporating epoxy resin with polymers having a low Tg such as, for example, polysiloxane and fluorinated moieties. Advantages of incorporation of such moieties into epoxy coatings include good performance regarding repulsion of oil and water, and retention of good optical clarity. Due to complications such as macro phase separation, it is not possible to simply blend polysiloxane polymers or polyfluorinated polymers into epoxy resins to prepare such coatings. Methods have been developed to overcome such challenges and are described in the Working Examples.

Figure 10:
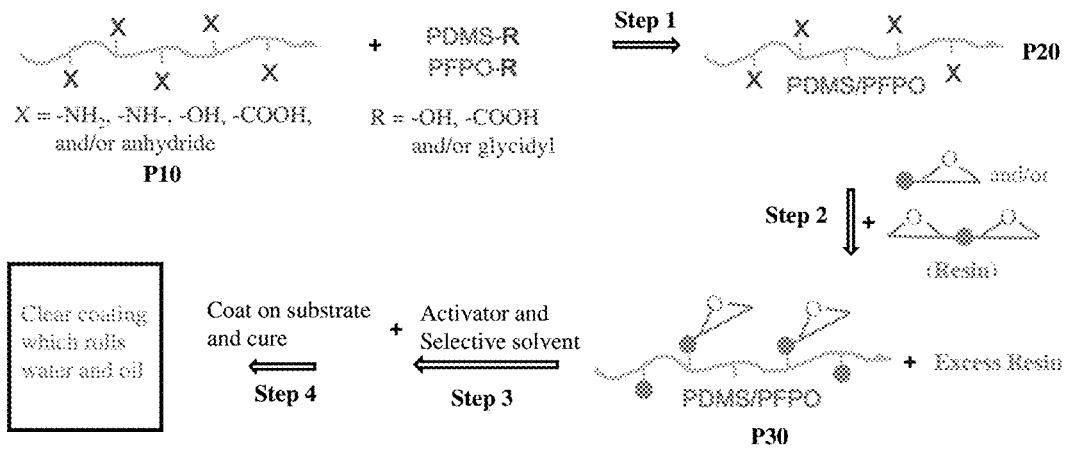
FIG. 10 shows a schematic overview of the preparation of epoxy-based amphiphobic clear coatings.
Figure 11:
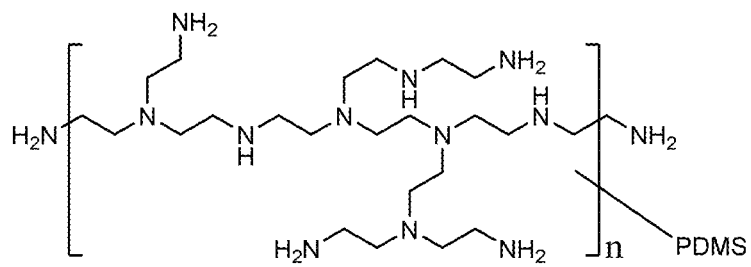
FIG. 11 shows structural formulae for P20-1 and P20-2, which differ in regard to n.
Figure 12:
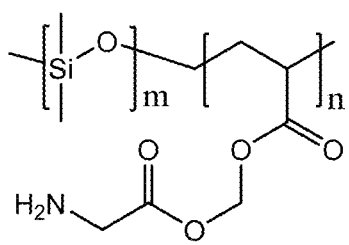
FIG. 12 shows structural formulae for P20-3.
Figure 13:
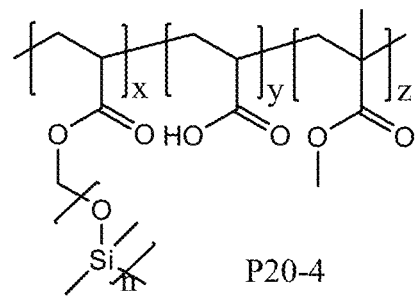
FIG. 13 shows structural formulae for P20-4.
Figure 14:
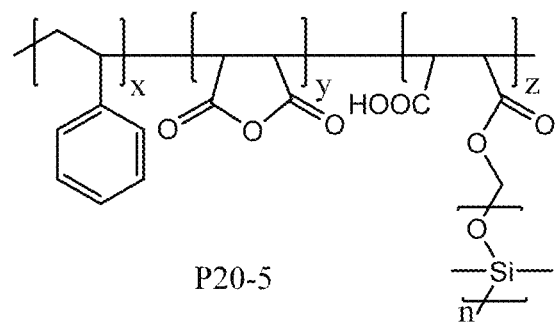
FIG. 14 shows structural formulae for P20-5.
Figure 15:
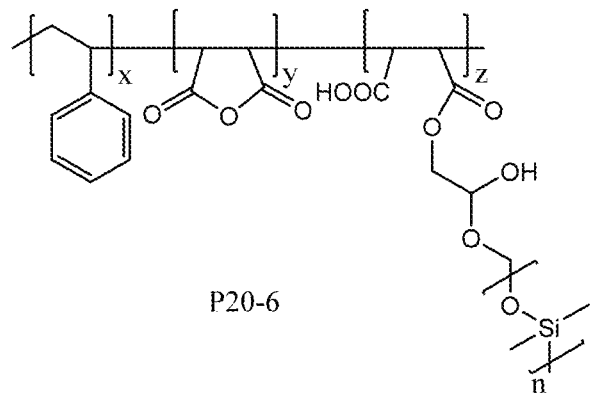
FIG. 15 shows structural formulae for P20-6.
Figure 16:
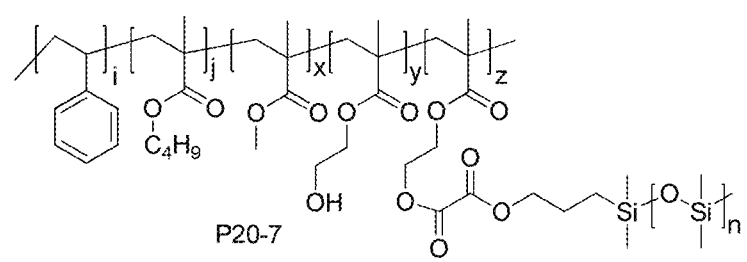
FIG. 16 shows structural formulae for P20-7.
Figure 17:
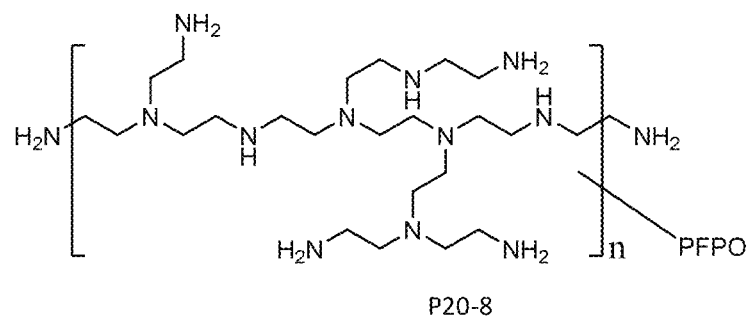
FIG. 17 shows structural formulae for P20-8.

An optically-clear, amphiphobic, and durable epoxy coating composition has been prepared and its properties have been quantified. This composition is prepared by adding a new component to the traditional epoxy formulation of epoxy resin and hardener. The new component is a dynamic polymer that is bound at one end and is free at the other end. In some embodiments, such dynamic polymers include polydimethylsiloxane ("PDMS") and/or PFPE. FIG. 10 shows a schematic overview of this incorporation.

In step 1 of FIG. 10, a polymer ("P10"), bearing functional moieties is reacted with a PDMS- or PFPE-bearing reactant. P10 bears functional groups that are any groups that are involved in epoxy resin curing, examples of such functional moieties include amine, imine, hydroxyl, carboxyl, anhydride, etc. In this first reaction, PDMS or PFPE moieties are added to P10 to form a second polymer ("P20"). Structural formulae of representative examples of P20 polymers are shown in the Figures, and in the Working Examples.

In step 2 of FIG. 10, P20 was mixed and reacted with an excess of epoxide resin which typically bears one or more glycidyl groups to form a third polymer ("P30"), which bears epoxide moieties and either PDMS or PFPE.

In step 3, P30 was then mixed with a hardener (also known as an activator) and optionally solvent (or mixture of solvents).

The resultant mixture that included P30, hardener, and optionally a solvent was then coated on a substrate (e.g., a glass plate) and the coated film was cured after the solvent was fully evaporated. The resulting coating was clear, durable and repelled both oil and water. Effectively, it was smudge-proof and liquid-proof. Any residue that was deposited could be readily removed, for example by wiping lightly with a dry cloth.

Weight percentage (wt %) of PDMS/PFPE can be controlled by blending different amount of P20 into epoxy resin. Samples with PDMS/PFPO wt % of 1.0%, 5.0%, 8.0% and 12% all were shown to repel both oil and water. Coating of different thickness were tested ranging from about 1 μm to about 1 mm. It was determined that thickness did not affect the repellency.

The amphiphobic epoxy coatings described herein can be prepared using a variety of types of epoxy resins. An example of a suitable epoxy resin is bisphenol A diglycidyl ether epoxy resin (Bis-A).

A hardener (also called activator) that is suitable for reaction with an epoxy resin, or a mixture of resins, comprises poly(oxypropylene)diamine, nonylphenol, triethanolamine and piperazine. The compositions containing piperazine are fast curing when heated to about 120° C., with a fully cured time that is usually less than three days at room temperature. Hardener content can be about 1 to 1 parts by volume of bisphenol A diglycidyl ether epoxy resins.

Several PDMS- and PFPO-modified functional polymers (P20) were prepared as described in the working examples. Methods of making and using such compositions are also described herein.

Figure 18:
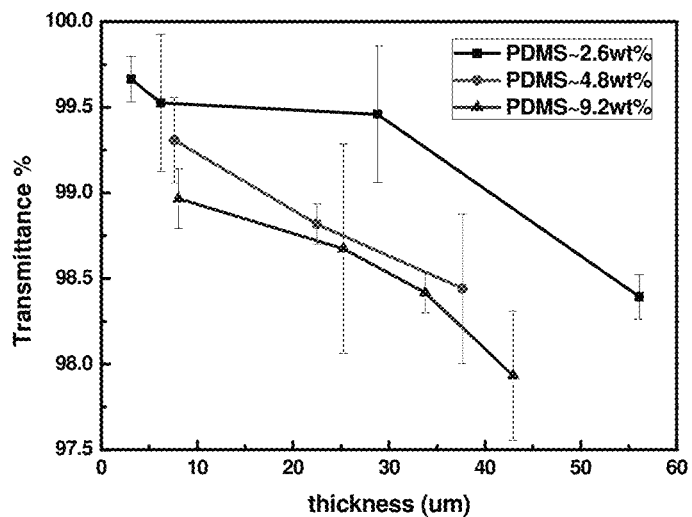
FIG. 18 graphically shows the relationship between transmittance and coating thickness for PEI-g-PDMS epoxy films, which were made with a mixture of other hardeners including polyoxypropylenediamine, nonylphenol, triethanolamine and piperazine.

The amphiphobic coatings described herein exhibited good optical clarity. Transmittance tests of coatings of different thickness and PDMS wt % indicated that increasing PDMS wt % in the film reduced transmittance. Without wishing to be bound by theory, the inventors suggest that the decrease in transmittance is due to the increase in segregated PDMS nanodomains in the epoxy resin matrix. A 25.3 μm thick film with a PDMS wt % of about 9.2% gave 98.7% transmittance. FIG. 18 shows a repellency test, wherein PDMS wt % is as low as about 2.6% was enough to provide good anti-smudge properties; at this PDMS wt %, a 28.8 μm thick film exhibited 99.5% transmittance.

Figure 19:
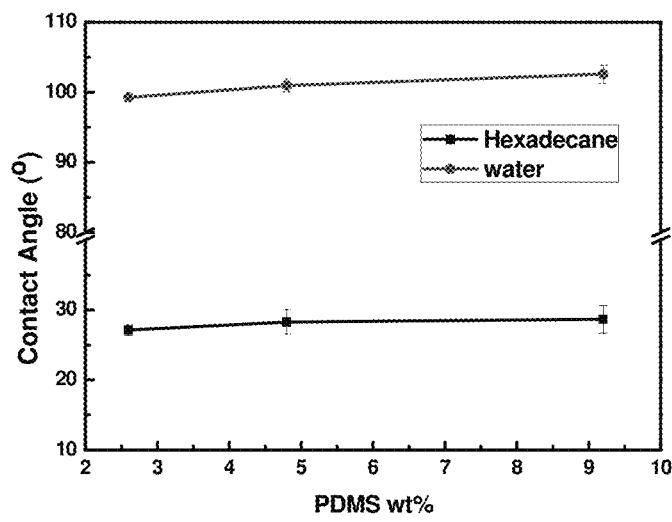
FIG. 19 graphically shows the relationship between contact angle and PDMS wt %.

When such epoxy coatings that include PFPO or polysiloxane-bearing moieties were prepared, the resultant coating were optically clear (i.e., transparent), durable, and resistant to both oil and water. Proof of such oil- and water-resistance is described herein. FIG. 19 graphically shows data regarding the contact angles versus wt % of PDMS. Contact angles (CTA) for water and for oil (e.g., hexadecane) on an amphiphobic epoxy film of about 101° and about 28°, respectively. Values of CTA changed only slightly with PDMS wt %. This means even a low PDMS addition would change surface properties.

Figure 20:
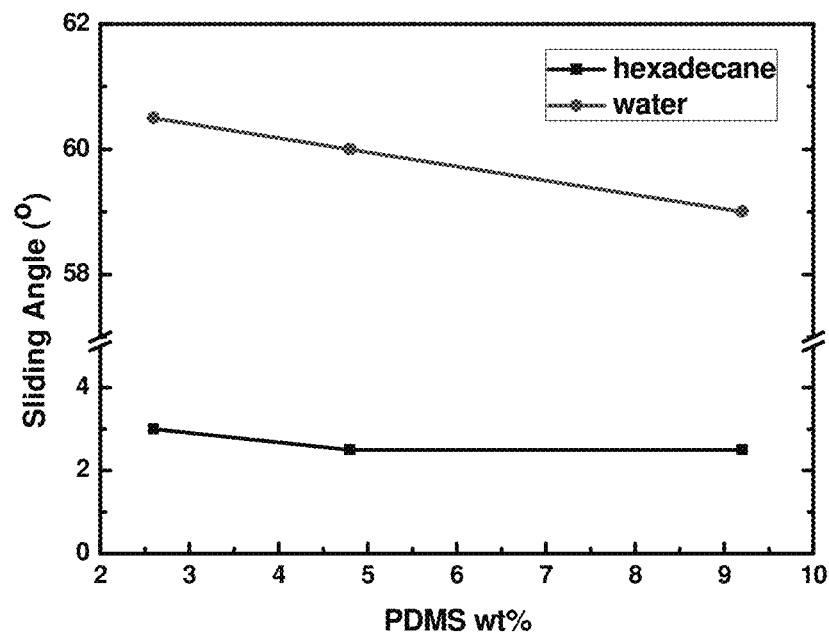
FIG. 20 graphically shows the relationship between sliding angle and PDMS wt %.
Figure 21A:
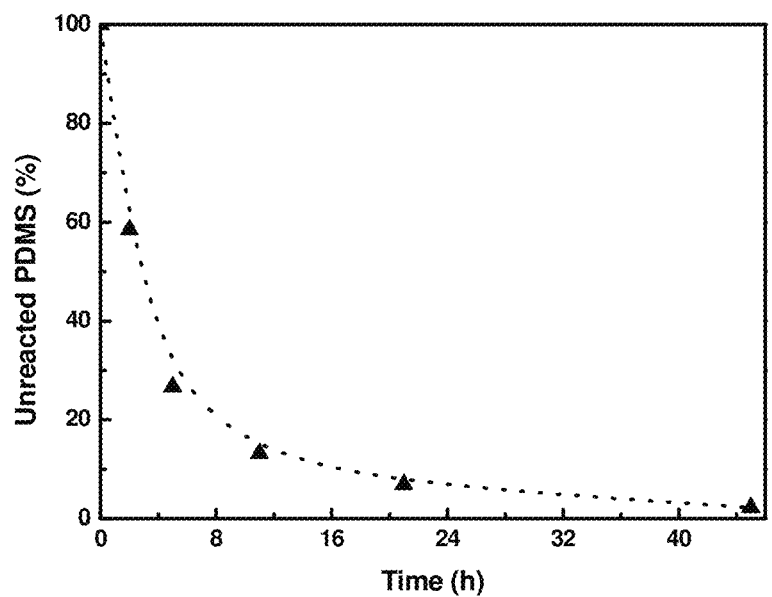
FIG. 21A unreacted PDMS (%) as determined by integration of the PDMS peak from FIG. 21B was plotted versus reaction time.
Figure 21B:
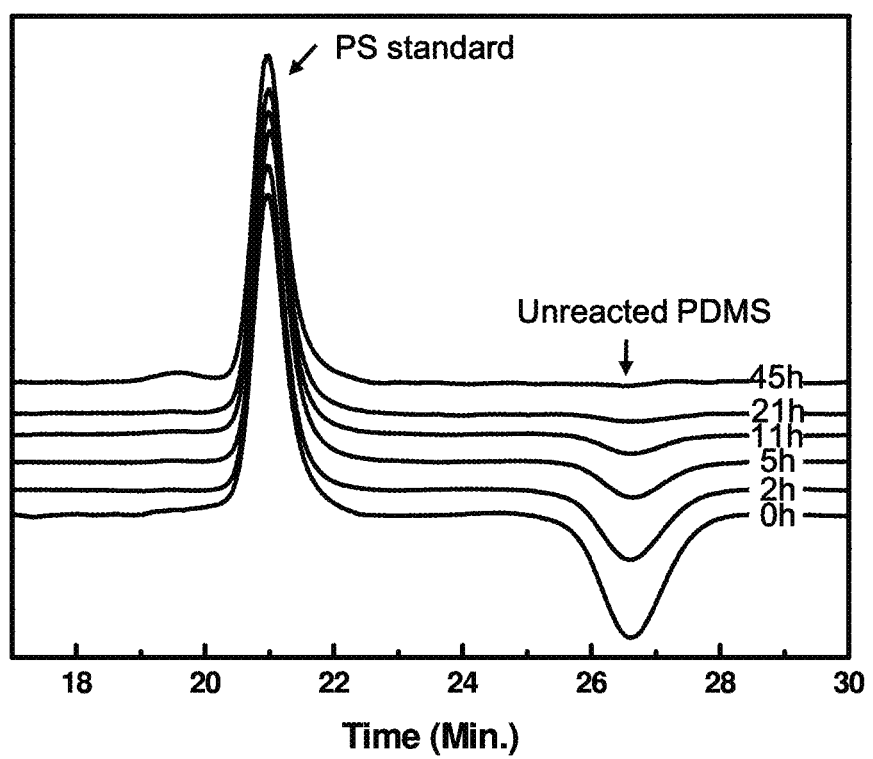
FIG. 21B graphically shows GPC traces at different time points, with PS (polystyrene) as a standard reference peak.

Even though CTA measurement shows the films are hydrophobic and lipophilic, sliding angle studies show that 5-μL oil (i.e., hexadecane) in a droplet slides off at a tilt angle of about 3°. This is so even when the PDMS wt % is as low as 2.6%. See FIG. 20 for data regarding sliding angle. A 15-μL water droplet slides off with no trace left, when the tilt angle is about 60.5° when PDMS wt % is 2.6%.

Although amphiphobic epoxy-based coating and/or adhesive compositions that are two-pack epoxy formulations are described and exemplified herein, it is possible to have single-pack formulations. That is, the inventors envision that functional groups of the hardener could be in a protected form. Examples of such protected functional groups may include protected amino, protected hydroxyl, protected carboxyl, or protected thiol groups. In protected form, the hardener and epoxy components can be mixed and stored in one pack. Upon the application of an external stimulus such as heating or irradiation, the functional groups become deprotected and are released. Subsequently, the epoxide-ring-opening reactions occur. Such single-pack formulations are stable at room temperature. Curing occurs when the components are heated or irradiated.

The inventors also envision preparation of a water-dispersible formulation for epoxy coatings. In this case, the epoxy part and the hardeners are dispersed in water. Ring-opening reactions take place after water has been evaporated and a pre-curing film has been formed. In the case of a single-pack water-based formulation, an external stimulus (e.g., heat or irradiation) are applied only after the pre-curing film has formed.

These coatings have applications for the protection of hand-held electronic devices to reduce the accumulation of fingerprints and smudges. They are also useful when applied to automobile windshields or windows of high-rise buildings to reduce the need for cleaning. They can even be used as a protective overcoat or to protect internal structures in automobiles. When used as the top coat of architectural or industrial coatings in sensitive areas, they provide graffiti resistance. Such graffiti resistance can be useful for sensitive or often-targeted areas such as shipping containers, railcars, building materials (e.g., concrete, aluminum siding, glass, wood, metal, flooring, marble, stone, tile). They can also be used as the coatings for moulds (such as, for example, those used in plastic industry) to facilitate release of molded objects. They can be used to coat surfaces to reduce ice deposition, such as, for example, surfaces of wind turbines, airplane parts, etc. Such oil- and water-repellent coatings can be used to facilitate cleanup or simplify production of food products. They may be used to coat the interior of oil pipelines to reduce deposition and friction.

These clear compositions would be useful in a paint or any other type of coating. The amphiphobic properties mean that surfaces coated with such coatings would display anti-smudge, and anti-graffiti properties. Greasy fingerprints would not adhere to a coated surface. If they did, the smear could be wiped away easily with a dry cloth or the like. Such clear anti-smudge coatings would be an asset to eyeglasses, electronic devices, windows, screens, cell phones, tablets, electronic devices, equipment that is exposed to dirt and grime, hand-held electronic devices, windows of high-rise buildings, automobile bodies, windshields.

Amphiphobic polyurethane-based and epoxy-based films have been prepared using PFPE and PDMS. Such films, with a thickness ranging from a few nm to about 10 μm, have been prepared and showed water and oil repellent properties. Both water and hexadecane readily slide off these surfaces without leaving any traces. These films are optically clear with >90 T %. FPU or PDMSPU films ranging in thickness from about 500 nm to about 2 μm exhibited better transmittance properties than thicker films. Similarly, fluorinated epoxy films and PDMS-epoxy films exhibited excellent transmittance. See, for example, in FIG. 18 a transmittance of approximately 99% for a film thickness of 25 μm for 4.8 wt % of PDMS, and in FIG. 23 a transmittance of 99% for a film thickness of 24 μm for 4.0 wt % of PDMS. Therefore, these films are suitable for applications where optically clear coatings are required.

The amphiphobic films are durable against abrasion. These films were subjected to rubbing tests against forces of 1-5 N from 800 to 4800 cycles, which did not cause any significant changes in the properties of these films. The films remained in as good shape as before the rubbing test.

Another feature of these films is their ink-resistance. Permanent marker leaves only a faint line, which immediately shrinks into tiny droplets. Though the permanent marker ink undergoes shrinkage after drying, it is easily wiped away with a dry cloth.

The amphiphobic films were resistant against fingerprints and smudges as verified by a stamp-test using liquid that simulates finger prints. The coatings helped to minimize the probability of contamination of surfaces.

The amphiphobic films exhibited strong adhesion to glass surfaces. Consequently, these films can be readily applied onto these substrates and other substrates to yield durable films.

PU coatings prepared by Approach A and using PFPE have shown excellent performance particularly at low (12% PFPE) grafting densities. This effectiveness at low grafting densities can help minimize the need for fluorinated materials.

Interestingly, particles can be embedded into the polyurethane-based coating composition. As an example of such embedding, silica particles have been successfully embedded in an example coating as described in Example 15. Other particles that could be embedded include silica, titanium dioxide, diatomaceous earth, alumina, $TiO_2$, and/or pigments.

Other compounds that can be added to the polyurethane-based amphiphobic coating compositions include biocides. By including biocides, coatings may prevent accumulation of organisms (e.g., bacteria, algae, fungi, mollusks, arthropods). In various embodiments an organism may comprise a microorganism. The microorganism may be a Gram-negative bacteria or Gram-positive bacteria.

The coatings are applicable to fabrics and other solids other than glass to prepare optically clear, stain-resistant, and smudge-free surfaces. Also, the coating can be used for irregular geometrical solids as well as rough surfaces.

The coatings described herein can be applied by all traditional coating methods including solution casting, brushing, aero-spraying, painting, printing, stamping, rolling, dipping, wiping, sponging, spin-coating, spraying, electrostatic spraying and/or dip-coating.

Amphiphobic coatings may also be permanent or temporary, depending on methods used for application onto a substrate. In general, curing or annealing a coating onto a substrate (e.g., by heating or exposing to UV) will provide a permanent coating which is durable, as defined herein. Alternatively, certain coatings applied without curing or annealing may be temporary, removable and/or short-lived, since chains that are not crosslinked or covalently attached to a substrate may be lost due to surface scratching or may be rinsed away by solvents or water.

A variety of substrates can be coated using amphiphobic copolymers described herein, including but not limited to plastics, metal oxides, semi-conductor oxides, metals, metalloids, metal oxides, concretes, clay particles, sand particles, cement particles, saw dust, semiconductors, particles, glasses, ceramics, papers and textile fibers. In some embodiments surfaces to be coated are in the form of metal plates, metal sheets or metal ribbons. In some embodiments, substrates are particles. For example, amphiphobic copolymers of the invention may be coated onto particles, and the coated particles may then be used for coating another substrate.

Many applications are anticipated for amphiphobic surfaces and coatings. For example, buildings (e.g., skyscrapers) with amphiphobic walls would require no or minimal cleaning. Ice would not likely form or build up on amphiphobic surfaces of power cables, which can minimize damage from freezing rain or ice storms. Amphiphobic coatings on metal surfaces can reduce metal rusting and corrosion. Amphiphobic coatings can be used to produce paper and paperboard for food-contact applications, such as pizza boxes and sandwich wraps. Amphiphobic coatings may be used to prepare glasses and ceramics that are self-cleaning, or to provide arc-resistant coatings on insulators used in electrical transmission systems where dirt or salt deposits, alone or in combination with water, can allow arcing with significant electrical energy losses. For cement and masonry products, amphiphobic coatings can provide products and surfaces resistant to damage in freezing weather from water that has penetrated the surfaces. As another example, amphiphobic coatings can be used to prepare paper products and fabrics which are resistant to water and moisture, including, but not limited to: paper and fabric moisture barriers used for insulation and under shingles or roofing; cardboard tubes or pipes, for example used to cast concrete pillars (water penetrating the seams of such tubes can leave seams and other defects in the pillars that need to be fixed by grinding operations); and water-resistant paper and cardboard packaging. Amphiphobic coatings can be used to prepare products which are salt-water-resistant, for example for underwater applications such as ship hulls, submarines, and other marine applications.

In some embodiments, amphiphobic coatings described herein can be used to prepare surfaces which are anti-wetting, anti-icing, anti-corrosion, anti-rust, anti-scratching, anti-staining, anti-bacterial, abrasion resistant, anti-fingerprint marking, anti-smudging, anti-graffiti, acid-resistant, base-resistant, resistant to chemicals, resistant to organic solvents, resistant to etching and/or self-cleaning. Surfaces coated with copolymers described herein may resist spills, resist stains, resist soiling, release stains, have improved cleanability, have improved alkaline resistance, have improved acid resistance, have improved resistance to organic solvents, have improved resistance to chemical penetration (e.g., improved resistance to organic chemicals), have improved resistance to corrosion, and/or have improved durability compared to uncoated surfaces.

To demonstrate anti-graffiti properties using oil-based paints and permanent black marker, FIGS. 24A-H contrast unmodified "regular" epoxy coatings with a representative example modified epoxy coating, specifically PEI-g-PDMS modified epoxy coatings having 4.0 wt % PDMS. FIG. 24A shows an unmodified coating on a vertically-positioned glass slide after an oil-based spray paint ("Paint A") has been sprayed on it. In regard to details regarding the paint, its label lists acetone, toluene, propane, butane, ethyl 3-ethoxypropionate, dimethyl carbonate as solvent mixture. Excellent anti-graffiti properties are demonstrated in FIG. 24B which shows the modified epoxy coating on a vertically-positioned glass slide after Paint A has been sprayed on it; notice how the paint has slid off to the bottom. FIG. 24C shows the unmodified coating on a vertically-positioned glass slide after oil based spray Paint B had been sprayed on it. FIG. 24D shows the modified epoxy coating on a vertically-positioned glass slide after Paint B had been sprayed on it; notice how the paint has slid off to the bottom. FIG. 24E shows a glass slide bearing unmodified coating after a permanent black marker has been used to draw a black mark on it. FIG. 24F shows a glass slide bearing modified coating after a permanent black marker has been used to draw a black mark on it, note that the ink does not stick and has formed little balls of ink on the surface. FIG. 24G shows the same slide as 24F when a portion of the marker mark has been wiped with a dry tissue. To demonstrate durability of the modified epoxy coating, FIG. 24H shows a glass slide bearing modified coating after a rubbing test was conducted for 18 hours (see Example 6 for details), following the rubbing, a black marker has been used to draw a black mark on it, note that the coating has exhibit good durability and the ink does not stick.

In some embodiments, amphiphobic coatings described herein can be used to prepare plastic or glass surfaces which are smudge-resistant, scratch resistant and/or stain resistant. Such plastic and glass surfaces may be found, for example, on electronic devices. Electronic devices can be portable (e.g., cellular phones; smartphones (e.g., iPhone™, Blackberry™); personal data assistants (PDAs); tablet devices (e.g., iPad™); game players (e.g., PlayStation Portable (PSP™), Nintendo™ DS); laptop computers; etc.), or not portable (e.g., computer monitors; television screens; kitchen appliances; etc.).

In some embodiments, amphiphobic coatings described herein provide surfaces which are highly water- and oil-repellant. Contact angle of water and/or oil on a coated surface or material may be about 90 degrees or greater, about 100 degrees or greater, about 110 degrees or greater, about 120 degrees or greater, about 130 degrees or greater, about 150 degrees or greater, about 90 degrees, about 110 degrees, about 120 degrees, about 150 degrees, about 160 degrees, or about 170 degrees. It should be understood that contact angles cannot be greater than 180 degrees, which is the theoretical maximum angle possible.

In further embodiments, amphiphobic coatings described herein provide surfaces which resist adhesion of biological materials. For example, anti-adherent surfaces comprising amphiphobic copolymers of the invention are provided which repel proteins, bacteria, dirt, grime, soil, fungi, viruses, microbes, yeast, fungal spores, bacterial spores, gram negative bacteria, gram positive bacteria, molds and/or algae. Such surfaces may also resist adherence of biological or bodily fluids such as blood, sputum, urine, feces, saliva, and/or perspiration/sweat. In a particular embodiment, amphiphobic coatings reduce or prevent microscopic animals such as dust mites and bedbugs from colonizing in mattresses, bedding, upholstery and/or carpeting.

Amphiphobic coatings, or particles coated with amphiphobic copolymers of the invention, can be applied to any surface to which an amphiphobic copolymer of the invention can adhere, either temporarily or permanently. The surfaces may be flexible or rigid. In some embodiments a surface can be made from a material which is fabric, glass, metal, metalloid, metal oxide, ceramic, wood, plastic, resin, rubber, stone, concrete, a semiconductor, a particle or a combination thereof. In some embodiments, surfaces may comprise metalloids (e.g., B, Si, Sb, Te and Ge).

Any glass can be employed as a substrate for amphiphobic coatings according to the invention, including, without limitation: soda lime glass, borosilicate glass, sodium borosilicate glass, aluminosilicate glass, aluminoborosilicate glass, optical glass, fiberglass, lead crystal glass, fused silica glass, germania glass, germanium selenide glass, and combinations thereof.

Any metal can be employed as a substrate for amphiphobic coatings according to the invention, including, without limitation: iron, nickel, chrome, copper, tin, zinc, lead, magnesium, manganese, aluminum, titanium silver, gold, platinum, and combinations thereof, or alloys comprising those metals. Metal oxides may also be present in the substrates. In one embodiment, a metal forming a surface comprises steel or stainless steel. In another embodiment, a metal used for a surface is chromium, is plated with chromium, or comprises chromium or a chromium coating.

Any ceramic can be employed as a substrate for amphiphobic coatings according to the invention, including, without limitation: earthenware (typically quartz and feldspar), porcelain (e.g., made from kaolin), bone china, alumina, zirconia, and terracotta. For the purpose of this disclosure, a glazing on a ceramic may be considered either as a ceramic or a glass.

Any wood can be employed as a substrate for amphiphobic coatings according to the invention, including, without limitation, hard and soft woods. In some embodiments, woods may be selected from alder, poplar, oak, maple, cherry, apple, walnut, holly, boxwood, mahogany, ebony, teak, luan, and elm. In other embodiments woods may be selected from ash, birch, pine, spruce, fir, cedar, and yew.

Any plastic or resin can be employed as a substrate for amphiphobic coatings according to the invention, including, without limitation, polyolefins (such as a polypropylene and polyethylene), polyvinylchloride plastics, polyamides, polyimides, polyamideimides, polyesters, aromatic polyesters, polycarbonates, polystyrenes, polysulfides, polysulfones, polyethersulfones, polyphenylenesulfides, phenolic resins, polyurethanes, epoxy resins, silicon resins, acrylonitrile butadiene styrene resins/plastics, methacrylic resins/plastics, acrylate resins, polyacetals, polyphenylene oxides, polymethylpentenes, melamines, alkyd resins, polyesters or unsaturated polyesters, polybutylene terephthlates, combinations thereof, and the like.

Any rubber can be employed as a substrate for amphiphobic coatings according to the invention, including, without limitation: natural rubber, styrene-butadiene rubber, butyl rubber, nitrile rubber, chloroprene rubber, polyurethane rubber, silicon rubber, and the like.

Any type of stone, concrete, or combination thereof can be employed as a substrate for amphiphobic coatings according to the invention, including, without limitation, igneous, sedimentary and metamorphic stone (rock). In one embodiment the stone is selected from granite, marble, limestone, hydroxylapatite, quartz, quartzite, obsidian and combinations thereof. Stone may also be used in the form of a conglomerate with other components such as concrete and/or epoxy to form an aggregate that may be used as a surface upon which an amphiphobic coating may be applied.

Non-limiting examples of types of coatings which may be prepared using amphiphobic coatings and methods described herein include: fabric coatings, textile coatings, decorative coatings, transportation coatings, wood finishes, powder coatings, coil coatings, packaging finishes, general industrial finishes, automotive paint (including refinishing paint), industrial maintenance and protective coatings, marine coatings, and other industrial coatings.

Non-limiting examples of applications of these types of coatings include: furniture (e.g., wood and metal furniture, outdoor furniture, office or commercial furniture, fixtures, casual furniture); motor vehicles; metal building components; industrial machinery and equipment; appliances (e.g., kitchen appliances, laundry appliances); aerospace equipment; packaging (e.g., interior and exterior of metal cans, flexible packaging, paper, paperboard, film and foil finishes); electrical insulation coatings; consumer electronic products (e.g., cell phones, tablet devices, MP3 players, cameras, computers, displays, monitors, televisions, hearing aids); coil coatings (e.g., coils, sheets, strips, and extrusion coatings); automotive refinishing (e.g., aftermarket repair and repainting); industrial settings (e.g., protective coatings for interior and exterior applications); routine maintenance to protect buildings (e.g., protection from corrosive chemicals, exposure to fumes, and temperature extremes) or solar panels; process industries (e.g., protection from corrosive or highly acidic chemicals); roads and bridges; shipping containers and railcars; and marine applications (e.g., boats, antifouling, ice resistance, equipment anticorrosion). It is apparent from these examples that coatings may be applied to articles pre-market, i.e., before, during or after manufacturing and before sale, or post-market, e.g., for maintenance and protective uses.

Coatings described herein can be applied to surfaces using any means known in the art, including but not limited to, brushing, painting, printing, stamping, rolling, dipping, wiping, sponging, spin-coating, spraying, or electrostatic spraying. Generally, surfaces are rigid or semi-rigid, but surfaces can also be flexible, for example in the instance of wire and tapes or ribbons.

Coatings described herein can be applied to virtually any substrate to provide amphiphobic properties. Choice of coating forms and processes for applying coatings are determined by a skilled artisan, based on factors such as chosen substrate, application, etc. Coatings may take any desired shape or form. In some embodiments, a coating completely covers a surface. In other embodiments, coatings cover only a portion of a surface, such as one or more of a top, side or bottom of an object. In one embodiment, a coating is applied as a line or strip on a substantially flat or planar surface. In such an embodiment, the line or strip may form a spill-resistant border.

Shape, dimensions and placement of coatings on surfaces can be controlled by a variety of means including the use of masks which can control not only portions of a surface that receive a coating, but also portions of a surface that may receive prior treatments such as application of a primer layer or cleaning by abrasion or solvents. For example, sand blasting or chemical treatment may be used to prepare a portion of a surface for coating, e.g., to generate desired surface roughness or to clean a surface. Where a portion of a surface is prepared in this way, a mask resistant to those treatments would be selected (e.g., a mask such as a rigid or flexible plastic, resin, or rubber/rubberized material). Masking may be attached to a surface through use of adhesives, which may be applied to a mask agent, a surface, or both.

In another embodiment a coating is applied to a ribbon, tape, or sheet that may then be applied to a substrate by any suitable means including adhesive applied to the substrate, the ribbon, tape, or sheet, or a combination thereof. Ribbons, tapes and sheets bearing an amphiphobic coating may be employed in a variety of applications, including forming spill-proof barriers on surfaces. Such ribbons, tapes, and sheets can be applied to any type of surface including metal, ceramic, glass, plastic, or wood surfaces, for a variety of purposes.

In some embodiments, coatings may be used to form a border on a surface. An amphiphobic "border" is a portion of a surface forming a perimeter around an area of the surface that has lower amphiphobicity than the border. Amphiphobic borders can prevent water and other liquids from spilling, spreading or flowing beyond the position of the border. A spill-resistant border could be prepared, for example, by applying an amphiphobic coating to a portion of a surface (with or without use of a mask), or by applying a tape or a ribbon to a surface, where one surface of the tape or ribbon is treated with an amphiphobic coating.

To improve adherence of coatings to a surface, a surface may be treated or primed, such as by abrasion, cleaning with solvents or application of one or more undercoatings or primers. In some embodiments where metals can be applied to surfaces (e.g., by electroplating, vapor deposition, or dipping) and it is deemed advantageous, surfaces may be coated with metals prior to application of a coating described herein.

As discussed above, a wide variety of articles may be coated with amphiphobic block copolymers of the invention. Non-limiting examples of such articles include metal plates, metal sheets, metal ribbons, wires, cables, boxes, insulators for electric equipment, roofing materials, shingles, insulation, pipes, cardboard, glass shelving, glass plates, printing paper, metal adhesive tapes, plastic adhesive tapes, paper adhesive tapes, fiber glass adhesive tapes, boats, ships, boat hulls, ship hulls, submarines, bridges, roads, buildings, motor vehicles, electronic devices, machinery, furniture, aerospace equipment, packaging, medical equipment, surgical gloves, shoe waxes, shoe polishes, floor waxes, furniture polishes, semiconductors, solar cells, solar panels, windmill blades, aircraft, helicopters, pumps, propellers, railings, and industrial equipment.

In some embodiments, a coated article's breathability, flexibility, softness, appearance, feel and/or hand is substantially the same as that of an uncoated article.

In some embodiments, a coated article has improved cleanability, durability, water-repellence, oil-repellence, soil-resistance, biological species-resistance, bodily fluid-resistance, ice-resistance, salt-resistance, salt-water-resistance, acid-resistance, base-resistance, stain-resistance, organic solvent-resistance, flame-resistance, anti-fouling properties, anti-bacteria adhesion properties, anti-virus-adhesion properties, anti-adhesion properties (e.g., anti-contaminant adhesion properties), anti-flow resistance (e.g., for underwater uses, swimming), anti-flame properties, self-cleaning properties, anti-rust properties, anti-corrosion properties, anti-etching properties, anti smudge properties, anti-fingerprint properties, and/or ability to control moisture content, compared to an uncoated article.

In some embodiments, highly water and oil repellent textiles can be obtained by depositing an amphiphobic coating on fibrous substrates or fabrics. It should be understood that any fibrous substrate or fabric which can bind amphiphobic block copolymers of the invention may be used. Fibrous substrates according to the present invention include fibers, woven and non-woven fabrics derived from natural or synthetic fibers and blends of such fibers, as well as cellulose-based papers, leather and the like. They can comprise fibers in the form of continuous or discontinuous monofilaments, multifilaments, staple fibers and/or yarns containing such filaments and/or fibers, and the like, which fibers can be of any desired composition. The fibers can be of natural, manmade or synthetic origin. Mixtures of natural fibers and synthetic fibers can also be used. Included with the fibers can be non-fibrous elements, such as particulate fillers, binders and the like. Fibrous substrates of the invention are intended to include fabrics and textiles, and may be a sheet-like structure comprising fibers and/or structural elements. A sheet-like structure may be woven (including, e.g., velvet or a jacquard woven for home furnishings fabrics) or non-woven, knitted (including weft inserted warp knits), tufted, or stitch-bonded.

Non-limiting examples of natural fibers include cotton, wool, silk, jute, linen, ramie, rayon and the like. Natural fibers may be cellulosic-based fabrics such as cotton, rayon, linen, ramie and jute, proteinaceous fabrics such as wool, silk, camel's hair, alpaca and other animal hairs and furs, or otherwise. Non-limiting examples of manmade fibers derived primarily from natural sources include regenerated cellulose rayon, cellulose acetate, cellulose triacetate, and regenerated proteins. Examples of synthetic fibers include polyesters (including poly(ethylene glycol terephthalate)), polyamides (including nylon, such as Nylon 6 and 6,6), acrylics, polypropylenes, olefins, aramids, azlons, modacrylics, novoloids, nytrils, spandex, vinyl polymers and copolymers, vinal, vinyon, and the like, and hybrids of such fibers and polymers. Leathers and suedes are also included.

Amphiphobic coated textiles may reject most pollutants (e.g., naturally-occurring pollutants, chemical pollutants, biological pollutants, etc.) and are not easily soiled. They may show improved properties such as water resistance, soil resistance, oil resistance, grease resistance, chemical resistance, abrasion resistance, increased strength, enhanced comfort, detergent free washing, permanent press properties such as smoothness or wrinkle resistance, durability to dry cleaning and laundering, minimal requirement for cleaning, and/or quickness of drying. Such textiles can be used to make, for example, contamination-free canvases, tents, parachutes, backpacks, flags, handkerchiefs, tablecloths, napkins, kitchen aprons, bibs, baby clothes, lab coats, uniforms, insignias, rugs, carpets, and ties.

In some embodiments, an advantage of amphiphobic coatings provided herein is that coatings may be thin and/or do not affect desirable properties of a fabric such as breathability, flexibility, softness, and/or the feel (hand) of the fabric. Amphiphobic fabrics can thus be used to make clothing and apparel. For example, socks, hosiery, underwear, garments such as jackets, coats, shirts, pants, uniforms, wet suits, diving suits and bathing suits, fabrics for footwear, and shoes can be coated. Home furnishing fabrics for upholstery and window treatments including curtains and draperies, bedding items, bedsheets, bedspreads, comforters, blankets, pillows or pillow coverings, fabrics for outdoor furniture and equipment, car upholstery, floor coverings such as carpets, area rugs, throw rugs and mats, and fabrics for industrial textile end uses may also be coated. Coating of materials such as cotton may, for example, alter properties of the cotton, such as water/soil repellence or permanent press properties. Cotton-containing materials may be coated after procedures such as dyeing of the cotton. Cotton materials may be provided as a blend with other natural and/or synthetic materials.

In further embodiments, amphiphobic coatings are used on leather products, such as leather jackets, leather shoes, leather boots, and leather handbags. Amphiphobic coatings may also be used on suede products.

Studies of the anti-smudge, and anti-graffiti properties of these coatings are presented in the figures and tables provided herein. The following working examples further illustrate the present invention and are not intended to be limiting in any respect. Those skilled in the art will gain a further and better understanding of the present invention and the new results and advantages thereof from the following illustrative examples of the practice of this invention as it has actually been carried out experimentally.

WORKING EXAMPLES

Materials

HEMA-TMS was prepared by a literature method (Hirao, A. et al., *Macromolecules* 1986, 19, 1294). Copper(I) bromide (CuBr), copper(II) bromide (CuBr$_2$), 2,2'-bipyridine, trifluorotoluene (TFT), and methyl nonafluorobutyl ether (MFBE), ethyl α-bromoisobutyrate (EBrIB), were purchased from Sigma-Aldrich (oakville, Ontario, Canada). EBrIB was distilled before use. CuCl and CuBr were sequentially washed with acetic acid and with anhydrous ethanol before they were dried in an oven under vacuum for 48 h at 30° C. Purified CuBr and CuCl were stored under nitrogen. Tetrahydrofuran (THF) was purchased from Caledon Laboratories Ltd. (Georgetown, Ontario, Canada) and used without further purification, but was dried using 3.0 Å molecular sieves. Monomer 2-(perfluorooctyl)ethyl methacrylate (FOEMA) was generously provided by Clariant GmbH (Burgkirchen, Germany) and was distilled under vacuum before use. Acetonitrile was passed through an alumina column before use. P1, and dimeric hexamethylene diisocyanate (HDID) were provided by Lorama Chemicals Inc. (Milton, Ontario, Canada). In initial studies, HDID was used. In subsequent studies HDIT, which is a trimer of HDI, was used as the source of —NCO. Specifically, a poly (hexamethylene diisocyanate) (predominantly trimer, 65 mg, 80 wt % in butyl acetate, such as those sold under the trademarks UH80—ULTRA SYSTEM® by SHERWIN-WILLIAMS Co.) was used.

The following chemicals were purchased from Sigma Aldrich and used as received: poly(dimethylsiloxane) (monoglycidyl ether terminated, Mn~5000 g/mol), Poly (styrene-alt-maleic anhydride) (P(S-alt-MA), average Mn~1,700 by GPC, maleic anhydride ~32 wt %), polyethylenimine (PEI branched, average Mw ~25,000 by LS, average Mn~10,000 by GPC), branched polyethylenimine (PEI branched, average Mw ~2000 by LS, average Mn~1800 by GPC), 50 wt. % in H2O), Polyethylene oxide methyl ether (Mn~750, 2000, and 5000), Poly(propylene glycol) bis(2-aminopropyl ether) (PPG, Mn~230), bisphenol A diglycidyl ether (Bis-A), trimethylamine (≥99%), triethanolamine (≥99.0%), piperazine (99%), chloroform (≥99.5%), DMF (≥99.8%), acetone (≥99.5%), ethanol (~99.8%), diiodomethane, hexadecane, dodecane, decane, octane, hexane, perfluoroocatanem, pyridine, azobisisobutyronitrile (AIBN). The following monomers were purchased from Sigma Aldrich and redistilled before using: 2-Hydroxyethyl methacrylate (HEMA), styrene (S), butyl methacrylate (BMA), methyl methacrylate (MMA), azobisisobutyronitrile (AIBN).

Example 1. Synthesis of Modified Polyols Under Approach a for Use as an Ingredient in Preparation of Amphiphobic Clear Coatings Example 1A. Synthesis of Example 1A Copolymers, a PFPE-Grafted P1 Product Using Approach A Scheme 2. Synthetic pathway for Example 1A copolymers.

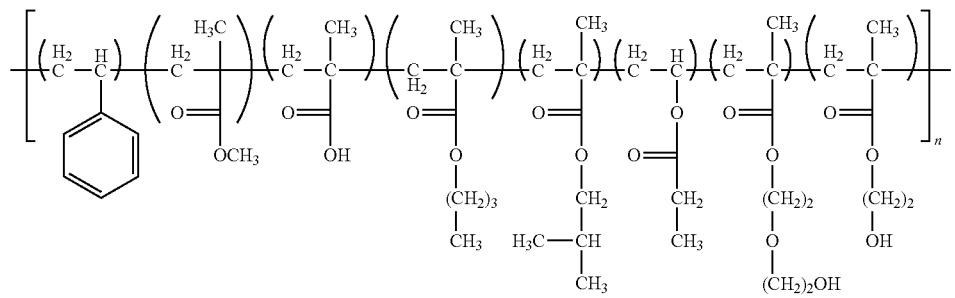

P(S-MMA-MAA-BMA-IBMA-VE-EGEMA-HEMA) or P1

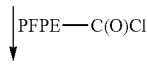

-continued

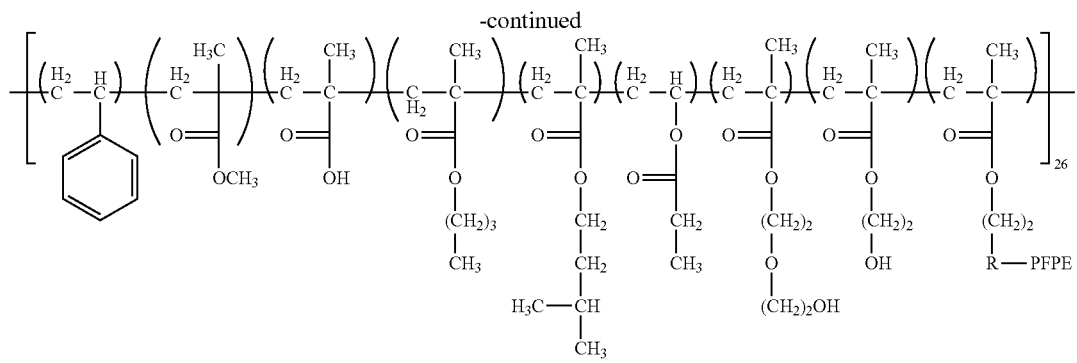

P[(S-MMA-MAA-BMA-iPMA-VP-HEGEMA-HEMA)-g-PFPE]$_{26}$

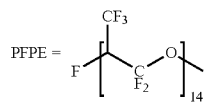

R = —O$_2$C  or  —OCH$_2$CH$_2$O$_2$C

Step 1
Obtaining Solid P1 (from Commercial P1 Solution)

Commercial solution of P1 (5.0 mL) was precipitated from hexane (45.0 mL) and centrifuged at 3900 rpm. The precipitate was dissolved in THF and precipitated from hexane:diethyl ether (1:0.1 v/v, 45.0 mL×2) and centrifuged at 3900 rpm. $^1$H NMR (in DMSO, at 400 MHz): $^1$H NMR (in DMSO-d$_6$, at 500 MHz): δ 12.0-12.6 (br, —COOH, 1H), 7.37.3-6.8 (br, styrene ring, 5H), 4.7 (br, —CH$_2$OH, 1H), 4.55 (br, —CH$_2$OH, 1H), 4.3 ((br, —CH, 1H), 3.9 (br, —OCH$_2$, 2H), 3.85 (—OCH$_2$, 2H), 3.6 (br, —CH$_2$OH, 2H), 3.5 (br, —CO$_2$CH$_3$, 3H), 3.5 (br, —CH$_2$—OH), 3.35 (—OCH$_2$CH$_2$OH), 2.4-2.8 (br, —CH, 1H), 2.3 (br, —C(O)CH$_2$, 2H), 2-1.5 (br, —CH$_2$), 1.3-0.6 (br, —CH$_3$) ppm.

Step 2
Synthesis of PFPE-C(O)Cl PFPE-COOH (5.0 g, 2.0×10$^{-4}$ mol) was added into a two neck flask and dried under vacuum for 5 h at 40° C. The reaction flask was re-filled with nitrogen gas before oxalyl chloride (COCl)$_2$ (2.0 mL, 2.3×10$^{-2}$ mol) added via an air-tight syringe. The temperature was increased to 70° C. and refluxed overnight at this temperature. The reaction mixture was cooled to 45° C., and placed under vacuum for at least 4 h at this temperature to remove the residual oxalyl chloride. The resultant PFPE-C(O)Cl was obtained as a clear viscous liquid, which was diluted with methyl nonafluorobutyl ether (MFBE) and subsequently stored under an inert atmosphere.

Step 3
Grafting of PFPE onto P1

First, P1 (0.20 g, 0.76 mmol of OH) was dissolved in anhydrous THF (2.0 mL). TFT (1 mL) was added at this stage. Subsequently, PFPE-C(O)Cl (0.48 g, 0.20 mmol) (26.3% of the total OH groups are used for grafting while 74% remain free) in nonafluoromethyl ether (0.545 mL) was added into this polymer solution drop-wise over a period of 5 min. The reaction mixture was allowed to stir for at least 16 h. The reaction mixture was then diluted with THF (2 mL) and added slowly into hexane:ether (1:0.2 v/v, 45.0 mL) and subsequently centrifuged at 3900 rpm. The resultant supernatant was removed and the precipitate was dissolved in THF (3.0 mL). A hexane: ether (1:0.2 v/v 45.0 mL) solvent mixture was added to this solution drop-wise with occasional stirring using a vortex mixer. This precipitation procedure was repeated two more times. $^1$H NMR (in DMSO:C$_5$F$_5$N (3:1, v/v) at 500 MHz): δ 7.3-6.8 (br, styrene ring, 5H), 4.5 (br, CH$_2$OH, 1H), 4.4 (br, PFPE-CO$_2$CH$_2$, 2H), 4.3 (br, —CH—O), 3.9 (br, —OCH$_2$CH$_2$, 2H), 3.6 (br, —CH$_2$OH, 2H), 3.4 (CO$_2$CH$_3$, 3H), 2.5 ((br, 1H styrene ring), (br, —OCH$_2$, 2H), 2-1.5 (br, —CH$_2$), 1.3-0.6 (br, —CH$_3$) ppm.

Table 1 presents data for five samples of Example 1A having different OH grouped end capped with PFPE, specifically, 13.6%, 16.5%, 23%, 27%, and 35% were prepared and characterized.

Example 1A(i) was a fluoro-grafted product, which was prepared using polyol P1, and which had a fluoro density of 13.6%.

Example 1A(ii) was a fluoro-grafted product, which was prepared using polyol P1, and which had a fluoro density of 16.5%.

Example 1A(iii) was a fluoro-grafted product, which was prepared using polyol P1 and which had a fluoro density of 23%.

Example 1A(iv) was a fluoro-grafted product, which was prepared using polyol P1, and which had a fluoro density of 27%.

Example 1A(v) was a fluoro-grafted product, which was prepared using polyol P1 and which had a fluoro density of 35%.

Example 1B. Preparation of a PFPE-Grafted Product Prepared by Grafting a PFPE Containing Species onto P(TFEMA-Co-HEMA)

Step 1
Synthesis of Non-Commercially Available Polyol, P(TFEMA-Co-HEMA), Via ATRP Scheme 3. Synthetic route for P(TFEMA-co-HEMA)-g-PFPE

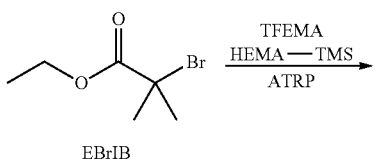

EBrIB

-continued

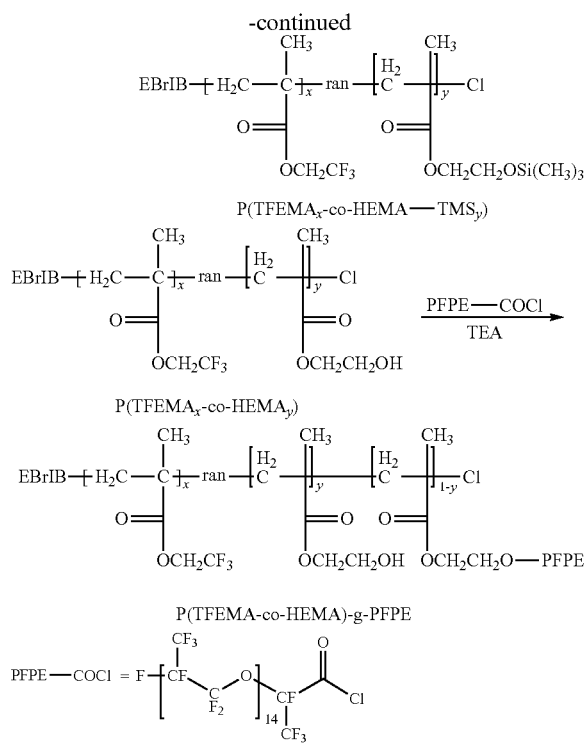

P(TFEMA-co-HEMA) was synthesized according to Scheme 3. A typical synthetic procedure is described here as an example. EBrIB (100.1 mg, 5.100×10$^{-1}$ mmol), TFEMA (1.96 mL, 1.35×10$^{+1}$ mmol, 27 equiv.), HEMA-TMS (3.0 mL, 1.35×10$^{+1}$ mmol, 27 equiv.), bipyridine (245 mg, 3.05 equiv.), CuCl (55.0 mg, 1.05 equiv.) and TFT (6.5 mL) were sequentially added into a two neck flask. The reaction mixture was subjected to four freeze-pump-thaw cycles before it was placed into a pre-heated oil bath at 88° C. The reaction was monitored by $^1$H NMR spectroscopy at various intervals. Once a 90% monomer conversion was reached (after 3 h), the polymerization was terminated by purging the flask with air. The crude polymer solution was diluted with TFT (5.0 mL), and passed over an alumina column. This was followed by the addition of aqueous HCl (1 N) to obtain a solution with a pH of 2 as monitored with pH paper. The crude polymer solution was stirred for 30 min at rt and subsequently concentrated via rotary evaporation. Meanwhile, the polymer precipitated from this primarily aqueous solution. Water was decanted off and the polymer was dissolved in THF (3.0 mL). The polymer solution was subsequently added into hexane (45 mL) dropwise and centrifuged at 3900 rpm for 5 min. The resultant precipitate was dissolved in THF (3 mL) and subsequently precipitated from hexane:ether (1:0.2 v/v, 45 mL). This precipitation procedure from hexane:ether was repeated two more times. The polymer was obtained as a white powder (2.6 g) in a yield of 52%. $^1$H NMR (in DMSO at 500 MHz): δ 4.6 (br, —OCH$_2$CF$_3$, 2H), 4.2 (br, —CH$_2$OH, 1H), 3.9 (br, —OCH$_2$CH$_2$, 2H), 3.6 (br, —CH$_2$OH, 2H), 2-1.7 (br, —CH$_2$, 2H), 1.1-0.7 (br, —CH$_3$, 3H) ppm.

Table 2 presents data for three different P(TFEMA-co-HEMA) prepared by ATRP.

Step 2

PFPE Grafting onto P(TFEMA-Co-HEMA) to Prepare Example 1B

A generalized approach for the synthesis of grafted P(TFEMA-co-HEMA) is described as follows. P(TFEMA-co-HEMA) (0.5 g) was dissolved in 3.0 mL of THF. This was followed by the addition of PFPE-C(O)Cl (per desired degree of grafting). The reaction mixture was stirred overnight at rt. The solution was then diluted with THF (5 mL) and poured into a water:methanol mixture (3:1 v/v, 45 mL) and centrifuged at 3900 rpm for 5 min. The precipitate was dissolved again in THF and subsequently added dropwise into a hexane: ether (2:1 v/v, 45 mL) mixture and centrifuged at 3900 rpm for 5 min. The above precipitation procedure was repeated two more times. The vol. % of ether in the hexane:ether mixture increased with increasing grafting density. $^1$H NMR (In DMSO:C$_5$F$_5$N (3:1 v/v) at 500 MHz): δ 4.6 (br, —OCH$_2$CF$_3$, 2H), 4.4 (br, PFPE-CO$_2$CH$_2$, 2H), 4.0 (br, —OCH$_2$CH$_2$, 2H), 3.65 (br, —CH$_2$OH, 2H), 3.2 (br, —CH$_2$OH and HOH peak, 1H), 2-1.7 (br, —CH$_2$, 2H), 1.1-0.7 (br, —CH$_3$, 3H) ppm.

Table 3 presents data for four samples of grafted P[(TFEMA-co-(HEMA-g-PFPE)] having different fluoro densities, specifically, fluoro densities of 10% (Example 1B(i)); 16% (Example 1B(ii); 24%, (Example 1B(iii), and 32% (Example 1B(iv), were prepared and characterized.

Example 1C. Preparation of a PDMS-Grafted Product Under Approach a, Specifically Synthesis of PDMS Grafted P1

Scheme 4. Grafting of PDMS onto P1 for the preparation of Example 1C.

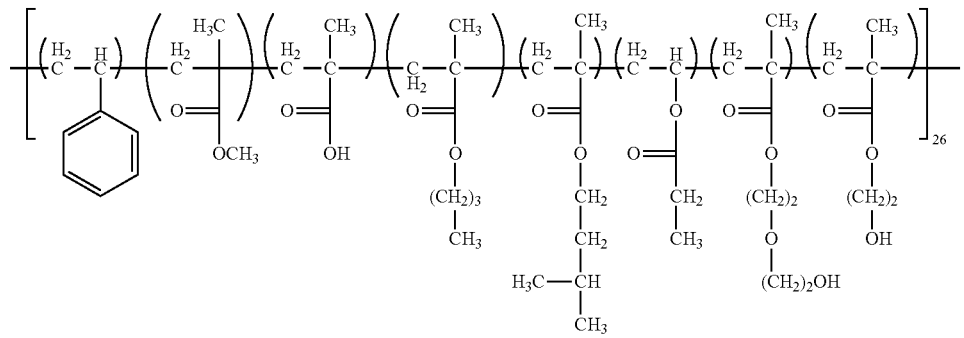

P(S-MMA-MAA-BMA-iPMA-VP-HEGEMA-HEMA)$_{26}$ or P1

| PDMS—O$_2$C$_2$(O)Cl
↓

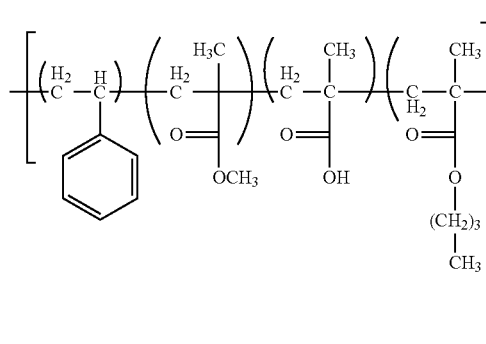
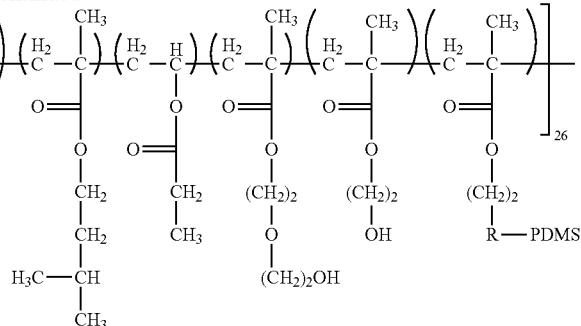

P[(S-MMA-MAA-BMA-iPMA-VP-HEGEMA-HEMA)-g-PDMS]$_{26}$

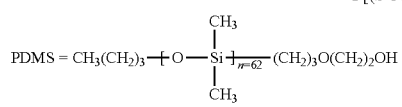

R = —O$_2$C   or   —OCH$_2$CH$_2$O$_2$C

Step 1

Synthesis of PDMS-O$_2$C$_2$(O)Cl

PDMS-OH (2.7 g, 0.58 mmol) was dried under vacuum for 2 h at 45° C. The flask was cooled to rt and oxalyl chloride (1.0 mL, 12 mmol) was added via an air-tight syringe into the reaction mixture. The reaction mixture was allowed to stir at rt for 12 h. Subsequently, the reaction mixture was dried under vacuum at 45° C. for 3 h, thus yielding the polymer as a clear liquid in ~100% yield.

Step 2

Synthesis of Example 1C

P1 (0.2 g, 0.76 mmol of OH) was dissolved in anhydrous THF (3.0 mL). To this solution, PDMS-O$_2$C$_2$(O)Cl (644 mg) was added dropwise (~6-7 drops per min) before the reaction mixture was stirred for 16 h. The polymer solution did not precipitate from hexane, methanol or any solvent mixture. Therefore, the residual THF solvent along with the by-product HCl was removed from the sample under vacuum at 30° C. overnight. $^1$H NMR (in CDCl$_3$, at 400 MHz): 7.37.3-6.8 (br, styrene ring, 5H), 4.3 (br, —CH—O, 1H), 4.1-4.2 (br, —OCH$_2$CH$_2$, 2H, and PDMS(CO)$_2$OCH$_2$), 3.6 (br, —CH$_2$OH, 2H), 3.5 (br, CO$_2$CH$_3$, 3H), 3.5 (br, —CH$_2$—OH), 3.35 (—OCH$_2$CH$_2$OH), 2.4-2.8 (br, —CH, 1H of styrene), 2.1-1.5 (br, —CH$_2$), 1.3-0.6 (br, —CH$_3$, 3H), 0.1 (br, —CH$_3$, 6H) ppm ppm.

PDMS densities of 11.3% (Example 1C(i)); 13.5% (Example 1C(ii)); and 15.6% (Example 1C(iii)), were prepared and characterized as shown in Table 4. Two other polymers at PDMS density were also prepared. Example 1C(iv) (of 3.1 wt %) and Example 1C(v) (6.1 wt %) were prepared by fractionation of Examples 1C(ii) and 1C(iii), respectively. Fractionation was performed, for example, by dispersing Example 1C(ii) (~550 mg) in 3.0 mL pentane. Nonaflurom-ethyl ether (2.0 mL) was added to this dispersion. The resultant mixture was centrifuged at 13000 rpm, a precipitate was obtained and was vacuum dried. The dry product (210 mg) had a PDMS grafting density of 3.1% and was referred to as Example 1C(iv).

Example 1D. Preparation of an Acetylated Grafted Copolymer Under Approach a, Note that this Product has No Reactive Hydroxyl Groups Synthesis of Acetylated Graft Copolymer Hydroxyl group-bearing graft copolymers Example 1A(iii) and Example 1C(ii) were reacted with acetic anhydride as described below. First the above two polymers were dissolved in pyridine in separate vials. Acetic anhydride (in excess) was then added to these polymer solutions and the reaction mixtures were stirred at room temperature for 16 h. A flow of N$_2$ gas was subsequently passed over the reaction mixture to remove the pyridine and unused acetic anhydride. The mixture was subsequently washed with methanol (20×4 mL). The samples were subsequently dried under vacuum at 40° C. overnight before further use.

$^1$H NMR Characterization of acetylated Example 1A(i): $^1$H NMR (In CDCl$_3$:C$_5$F$_5$N (3:1 v/v) at 500 MHz): δ 7.3-6.8 (br, -Styrene ring, 5H), 4.35 (br, PDMS-CO$_2$CH$_2$, 2H), 4.2 (br, —OCH$_2$CH$_2$O, 4H), 3.9 (br, —CO$_2$CH$_3$, 3H), 2.4-2.8 (br, —CH, 1H), 2.1 (br, —CH$_3$, 3H), 1.5 (br, —CH$_2$, 2H) 1.3-0.6 (br, —CH$_3$, 3H) ppm.

$^1$H NMR Characterization of acetylated Example 1C(ii) (in CDCl$_3$, at 500 MHz): 7.37.3-6.8 (br, styrene ring, 5H), 4.1-4.2 (br, —OCH$_2$CH$_2$, 2H, and PDMS(CO)$_2$OCH$_2$), 3.6 (br, —CH$_2$OH, 2H), 3.5 (br, CO$_2$CH$_3$, 3H), 3.5 (br, —CH$_2$—OH), 3.35 (—OCH$_2$CH$_2$OH), 2.4-2.8 (br, —CH, 1H of styrene), 2.1 (br, —CH$_3$, 3H), 2.1-1.5 (br, —CH$_2$), 1.3-0.6 (br, —CH$_3$, 3H), 0.1 (br, PDMS chains, —CH$_3$, 6H) ppm.

Table 5 shows the list of Example 1D polymers.

Example 2. Synthesis of Modified Polyols Under Approach B for Use as an Ingredient in Preparation of Amphiphobic Clear Coatings Block Random Copolymers This unique class of block-random copolymer is represented by the general formula:

FS-$b$-(R$y$Mi$_{100\%-y}$)$_n$ 

where FS represents a moiety as described above and "b" denotes block. R represents HEMA, in this example, Mi denotes styrene and MMA.

Studies were conducted using the following two different types of copolymers:
 i. PFPE-b-P(HEMA$_{43}$-S$_{43}$-MMA$_{14}$) (Example 2A).
 ii. PDMS-b-P(HEMA$_{53}$-S$_{33}$-MMA$_{13}$) (Example 2B).

Example 2A. Synthesis of PFPE-b-[S-HEMA-MMA], Under Approach B, which is a Fluoro-Block Polyol Product

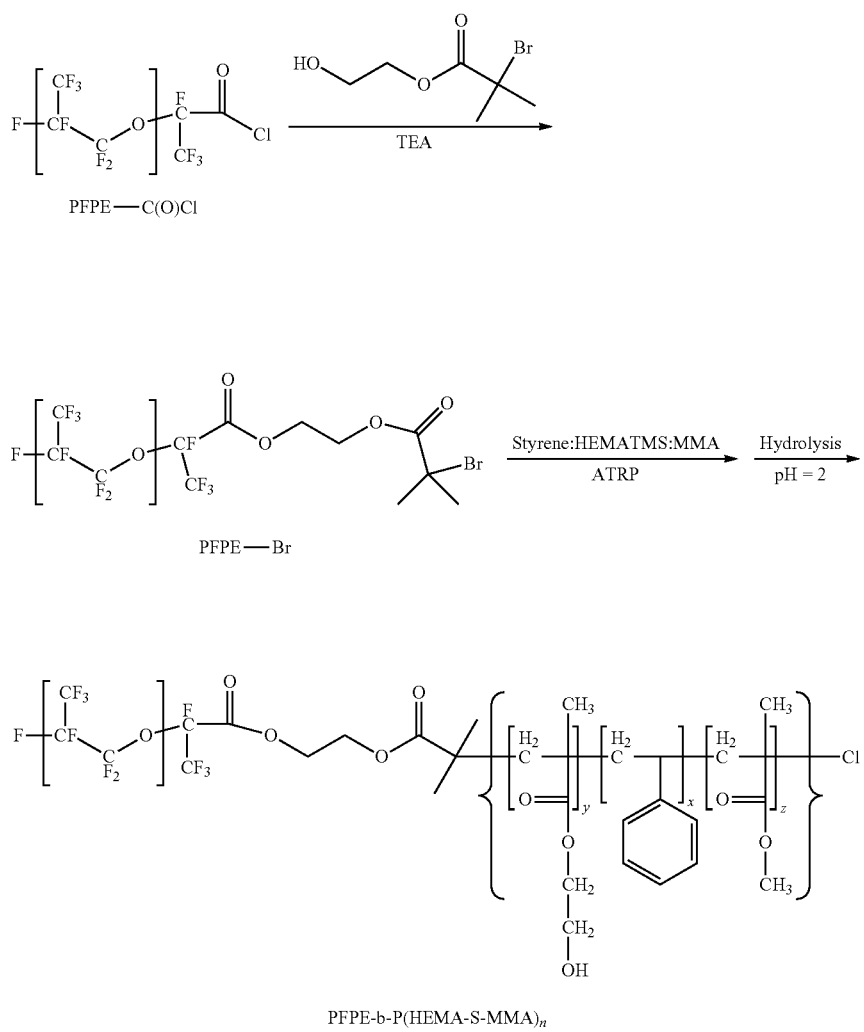

Scheme 5. Steps involved in the synthesis of PFPE-b-P(S-HEMA-MMA)$_n$.

Step 1

Synthesis of the PFPE-Br Macroinitiator. HO—(CH$_2$)$_2$OC(O)(CH$_3$)$_2$Br (0.8 g, 3.7 mmol) was added into THF (3.0 mL) and TEA (0.9 mL, 6.4 mmol) was added to this solution, Subsequently, PFPE-C(O)Cl (5.0 g, in 3 mL of MFBE, 2.08 mmol) and the reaction mixture was stirred overnight. This reaction mixture was subsequently washed with THF:water (1:1 v/v, 45.0 mL), and centrifuged at 3900 rpm. The resultant product was further washed with THF:methanol (1:2 v/v, 45.0 mL), and subsequently centrifuged at 3900 rpm. The product was allowed to dry under vacuum for 48 h prior to use. $^1$H NMR (In CDCl$_3$:C$_6$F$_6$ (1:3, v/v at 300 MHz): δ 4.82 (br, PFPE-CO$_2$CH$_2$, 2H), 4.63 (br, —CH$_2$, 2H), 2.0 (br, CH$_3$, 6H).

Step 2

Polymerization Using PFPE-Br as the Macroinitiator.

PFPE-Br (0.50 g, 1.9×10$^{-1}$ mmol), styrene (0.191 mL, 1.52 mmol, 8.0 equiv.), HEMA-TMS (0.54 mL, 2.28 mmol, 12.0 equiv.), MMA (0.053 mL, 0.47 mmol, 2.5 equiv.) were mixed together in 100 mL flask. Bipyridine (97 mg, 3.0 equiv.), CuCl (32.5 mg, 1.0 equiv.) and TFT (2.0 mL) were sequentially added to this mixture. The reaction mixture was subjected to four freeze-pump-thaw cycles before it was placed into a pre-heated oil bath at 85° C. After 24 h, a ~75% conversion was obtained and the reaction was stopped by introducing air into the reaction flask, and subsequently diluting the sample with TFT (10 mL). The solution was then passed over an alumina column, which was also washed with THF (10 mL). Subsequently, HCl (1 N, pH=2.5) was added into the polymer solution, which was subsequently stirred for 20 min at rt. The samples were subsequently diluted with THF (2 mL) and added slowly into a hexane:ether (1:0.2) solvent mixture. The turbid solution was centrifuged at 3900 rpm. This precipitation procedure was repeated two more times. The product was dried under vacuum at rt overnight. The polymer was obtained in a yield of 54%. $^1$H NMR (in DMSO:C$_5$F$_5$N (3:1 v/v at 500 MHz): δ 7.3-6.8 (br, styrene ring, 5H), 4.6 (br, CH$_2$OH, 1H), 4.5 (br, PFPE-CO$_2$CH$_2$, 2H), 4.0 (br, —OCH$_2$CH$_2$, 2H), 3.7 (br, —CH$_2$OH, 2H), 3.4 (CO$_2$CH$_3$, 3H), 2-1.5 (br, —CH$_2$, 2H), 1.3-0.6 (br, —CH$_3$, 3H) ppm.

Example 2B. Preparation of a PDMS-Block Polyol Product, Under Approach B

Step 1
Synthesis of PDMS-b-(HEMA-S-MMA)$_n$

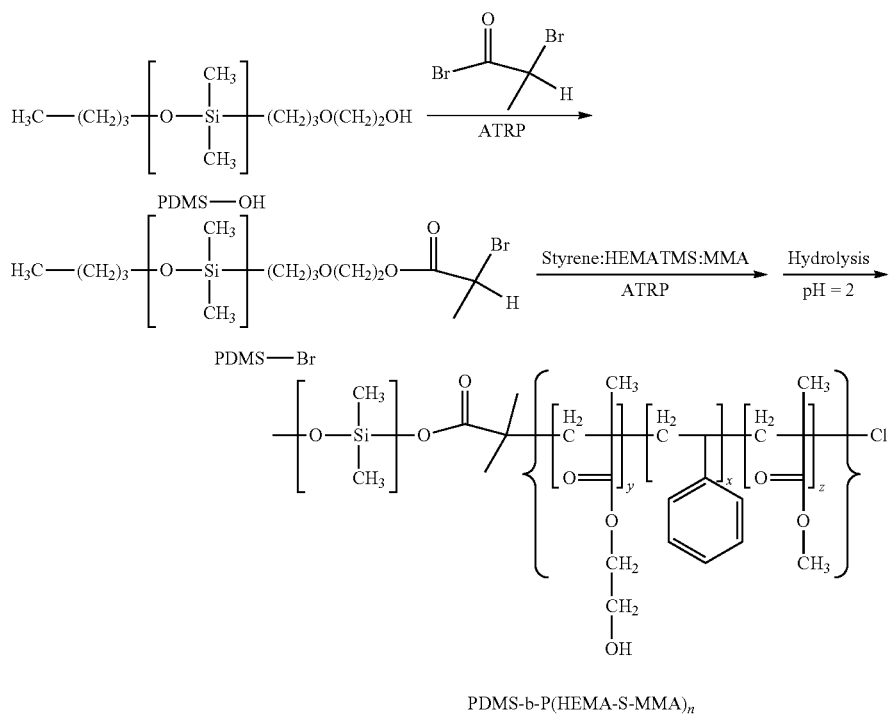

PDMS-b-P(HEMA-S-MMA)$_n$

Step 2
Synthesis of PDMS-Br

PDMS-OH (1.5 g, 3.2×10-4 moles) was dissolved in THF (2.0 mL). TEA (0.45 mL, 3.2×10$^{-3}$ mol) was added to this solution before the addition of 2-bromopropionyl bromide (0.24 mL, 2.22×10$^{-3}$ mol). This reaction was allowed to proceed for 20 h at rt. The resultant PDMS-Br was subsequently washed with acetonitrile (10 mL×3) and centrifuged at 3900 rpm after each washing treatment. The bottom layer was collected and dried under vacuum for 24 h at 30° C.

Step 3
Synthesis of PDMS-b-(HEMA-S-MMA)$_n$ Via the PDMS-Br Macroinitiator

PDMS-Br (0.80 g, 1.6×10$^{-1}$ mmol), styrene (0.2 mL, 1.28 mmol, 8.0 equiv.), HEMA-TMS (0.54 mL, 1.92 mmol, 12.0 equiv.), and MMA (0.052 mL, 0.4 mmol, 2.5 equiv.) were mixed together. Bipyridine (60 mg, 2.4 equiv.), CuCl (17.4 mg, 1.1 equiv.), and TFT (2.0 mL) were sequentially added to this mixture. The reaction mixture was subjected to four freeze-pump-thaw cycles before it was placed into a preheated oil bath at 88° C. After 48 h, a 75% conversion took place. The reaction was stopped by opening the stopper of the flask to introduce air, and diluting the reaction mixture with TFT (10 mL). The crude polymer solution was passed over an alumina column. To this mixture was added THF (10 mL), before HCl (1 N) was added dropwise until ~pH=2.5 was reached. The acidic mixture was stirred for 20 min at rt. The sample was dried under vacuum for 24 h at 30° C. $^1$H NMR (in CDCl$_3$) at 500 MHz): δ 7.3-6.8 (br, styrene ring, 5H), 4.1 (br, —OCH$_2$CH$_2$, 2H), 3.8 (br, —CH$_2$OH, 2H), 3.5 (CO$_2$CH$_3$, 3H), 2-1.5 (br, —CH$_2$, 2H), 1.3-0.6 (br, —CH$_3$, 3H), 0.1 (br, —CH$_3$(CH$_3$), 6H) ppm.

Example 3. Synthesis of Non-Amphiphobic Clear Coatings for Comparison Purposes

Example 3A. Preparation of Unmodified PU

P1 (30.0 mg, 0.029 mmol of —OH] and HDID (7.0 mg, 0.033 mmol of NCO functional groups) were mixed and THF was added until the total THF volume reached 1.3 mL. The mixture was homogenised under vortex for ~10 s. The polymer solution was then cast onto glass. The samples were air dried for 20 min, and subsequently annealed overnight at 120° C. prior to characterization. As shown in Table 6, the films did not exhibit any hexadecane-repellent properties. Also, the water sliding angles were very high. Table 6 presents data for characterization of the above clear coating (which has no modified polyol). In subsequent studies, HDIT, which is a trimer of HDI, was used as the source of —NCO.

Example 3B. Polyurethane (PU) Formulations

The synthesis of PU is shown in Scheme 7. During this preparation, urethane bonds were formed between OH and NCO groups under thermal curing.

Scheme 7. Chemical reaction involved in the synthesis of polyurethane.

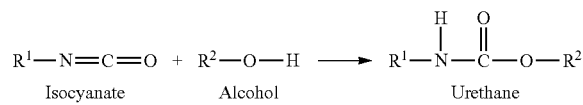

Isocyanate   Alcohol   Urethane

Example 4. Preparation of Durable, Amphiphobic Clear Coatings Using the Above-Described Modified Polyols of Approaches A and B An example FPU film preparation is described below. Example 1A(i) (6.0 mg, 0.0082 mmol of OH) was dissolved in 1.3 mL of THF. To this solution was added unmodified polyol (30 mg in 0.3 mL THF, 0.029 mmol of OH), diisocyante (10.4 mg in 0.28 mL THF, 0.048 mmol). The final concentration 25.0 mg/ml in THF and NCO/OH ratio was 1.27. These solutions were then drop casted on glass slides. For consistent conditions regarding humidity, the drop casted substrate was dried by placing it in a dessicator with $CaCl_2$. The dessicator had an inlet and an outlet and was purged under a gentle flow of $N_2$. After ~20 min, the samples were cured overnight at 120° C. for overnight (16 h). The drop casted coating did not appear clear at first, but become clear when the THF evaporated.

PFPE/PDMS PU Coating Formulations and Properties

PFPE/PDMS PU are divided into two main categories based on the type of polymers used for the preparation of polyurethane films. These categories include randomly grafted copolymer formulations and block copolymer formulations wherein one of the blocks is a random copolymer block. These categories will be described in further detail below.

Randomly Grafted Copolymer Coating Formulations

Randomly grafted copolymers were obtained by grafting random copolymers with PFPE or PDMS chains. This family of polymers can be further divided into sub-categories based on the composition of the grafted polymer chains or of the backbone chain of the random copolymer.

FPU Film Formation Example 1A(i), Example 1A(ii), Example 1A(iii), Example (iv)

These polymers are best described by the general formula:

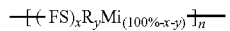

where FS denotes PFPE, while R represents —OH groups. Meanwhile, M1 denote styrene, and M2 denote all remaining components of P1. A broad range of FPU films were prepared under different conditions using Example 1A(i), Example 1A(ii), Example 1A(iii), Example 1A(iv), and Example 1A(v). The formulations and the performance of these films are summarised in Table 7.

Examples 1A(i), 1A(ii), 1A(iii), 1A(iv), and 1A(v) were used to generate durable amphiphobic films that were optically clear. The chemistry is shown in FIG. 7 and Scheme 7. Here, OH reacts with NCO groups to generate urethane bonds and eventually a random network is formed called polyurethane.

The preparation of the film involved a very simple procedure that was performed at room temperature. All reagents were mixed and subsequently dispensed onto glass slides. The samples were allowed to dry in the open air before thermal curing was performed at 120° C. For open air sample preparation, humidity played an important role. Therefore, samples prepared on highly humid days (>50%) were drop cast into an uncovered container, in order to minimize the accumulation of moisture.

PU Films Formation from P(TFEMA-HEMA)-g-PFPE 1B(i), 1B(ii), 1B(iii), and 1B(iv).

Examples 1B(i), 1B(ii), 1B(iii), and 1B(iv) are represented by the following general formula:

where FS represents PFPE, R denotes 2-hydroxyethyl methacrylate groups, and Mi represents trifluoroethylmethyl methacrylate. These polymers were prepared in various PFPE grafting density are described in Table 3. The synthesis was performed out according to the procedure described in Scheme 3. This involves the synthesis of P(TFEMA-co-(HEMA-TMS) via ATRP, and the removal of the TMS group. During the subsequent step, PFPE-C(O)Cl was reacted with OH groups to provide Example 1B(i-iv). P(TFEMA-co-HEMA)-g-PFPE)] Example 1B(i-iv) based films were prepared under different reaction conditions and their properties are summarized in Table 8.

The above study involving Example 1B(i), Example 1B(ii), Example 1B(iii), and Example 1B(iv) showed fascinating trends with respect to the film properties. These properties involved the amphiphobicity, the durability, and the optical properties of the films, and are described in Example 11.

Preparation of PDMSPU Films Using PDMS Graft Copolymers Example 1C

Polymers of this family are best described by general formula:

where FS represents PDMS, while R, M1 and M1 denote OH, Styrene, and MMA, respectively. These polymer were synthesized by the procedure described in Example synthesis 1C(i), 1C(ii), 1C(iii), that involves the reaction of PDMS—C(O)Cl with P1.

PDMSPU Rim Formation by Drop Cast.

A representative synthesis of PDMSPU from grafted copolymers is described here. HDID (11.9 mg, 0.055 mmol of NCO) and Example 1C(i) (5.0 mg, 0.0064 mmol) were mixed together in 1.0 mL of acetone, and stirred at 65° C. for 60 min. This step was followed by the addition of P1 solution (38.0 mg, 0.036 mmol) and allowed to react for another 150 min. The solution was cooled to RT and acetonitrile (1.6 mL) was added to the polymer solution. The acetone was evaporated from via rotary evaporator. The solution in acetonitrile was diluted to 25 mg/mL as pure acetonitrile solution. The sample solution was drop casted and allowed for 3-4 h at RT before thermal curing in a desiccator loaded with $N_2$ inlet and outlet. The samples were annealed overnight at 120° C. before any characterization was performed.

Films based on the PDMS-bearing copolymers were prepared using different amounts of the PDMS-bearing graft copolymers Examples 1C(i), 1C(ii), or 1C(iii).

PDMSPU film formation on glass was challenging in THF, acetone and other common solvent, which are good for both PDMS and unmodified polyol. Therefore films were prepared in acetonitrile. The slippage phenomena was due the hydrophibic PDMS and hydrophilic glass which does not like each other and thus, the coating solution always accumulated on lower side of glass slide (downhill), as a result the prepared films were neither uniform nor showing any good properties.

Acetonitrile was chosen for coating solutions drop casting because PDMS is insoluble in this solvent. Insoluble chain of PDMS forms core of the micelles having corona P1 chains outside. Thus upon drop casting the micelles solution of PDMS PU, PDMS does not come under immediate contact with the glass and the slip phenomena disappears. Upon drop casting from acetonitrile the films are initially not clear because of the micelles on the glass. But as the acetonitrile evaporates, PDMS chains started to relax in the absence of bad solvent (acetonitrile), and the films obtained clarity within 3-4 h at rt. Thermal curing of all samples were performed at 120° C. any PDMSPU film properties were examined.

Initially the optical clarity was poor because micellear solution. The evaporation of acetonitrile helped the PDMS chains to relax ($T_g$=−125° C.), and hence the PDMS equal distribution throughout the film was obtained. This helped not only to improve the optical clarity but also the amphiphobic properties of these films were enhanced by many tremendously.

PDMSPU Rim Formation by Spin Coating.

A typical synthesis of PDMSPU from grafted copolymers is described here. HDID (10 mg, 0.047 mmol of NCO) and Example 1C(i) (10 mg, 0.021 mmol) were mixed together in 0.4 mL of THF and stirred at 60° C. for 30 min. This step was followed by the addition of P1 solution (21.0 mg, 0.0203 mmol). The NCO/OH ratio employed for this synthesis was 1.27. The reaction mixture was stirred for an additional 15 min at 90° C. before the sample was cooled to rt. Acetonitrile (1.6 mL) was added to the polymer solution before spin coating treatment was performed. Drop cast samples were allowed to dry in the open air for ~40 min until the solvent had evaporated. The samples were annealed overnight at 120° C. before any characterization was performed. The formulations and conditions are shown in Table 9.

Film Formation from Example 1D (Acetylated-Grafted Polymer (without any OH Reactive Group)

These polymers can be represented by the following general formula:

where FS represents PFPE or PDMS. Meanwhile, R' denotes —OH grouped endcapped with C(O)CH$_3$, Mi represents S, MMA, MAA, BMA, IBMA, VE. Here, all of the OH groups were converted into C(O)CH$_3$. These polymers were tested for the performance of their resultant films after the end-capping of their reactive groups.

FPU Film from Example 1D(i)

Polymer example 1 D(i) (4.6 mg) was initially dissolved in THF (0.5 mL). To this solution was added P1 solution (10 mg, 0.0097 mmol) and NCO (2.20 mg, 0.0104 mmol). The final concentration of the copolymer solution was 27.5 mg/mL, while the NCO/OH ratio was 1.07. The solution was stirred at 60° C. for 1 h, and this solution was subsequently drop cast or spin-coated onto glass slides to prepare films. These films were subsequently annealed for 16 h at 120° C. The properties of the films are shown in Table 11.

PDMS Based PU Films (Example 1 D(ii))

Example 1D(ii) (2.9 mg) was initially dissolved in THF (0.5 mL). To this solution was added P1 (12 mg, 0.012 mmol), and NCO (3.0 mg, 0.014 mmol), yielding a NCO/OH ratio of 1.21. The solution was stirred at 60° C. for 1 h before it was cooled to room temperature and diluted with acetonitrile (2.0 mL). The final concentration of the copolymer solution was ~7.2 mg/mL. The films were subsequently prepared via drop casting or spin coating and then annealed for 16 h at 120° C.

Various properties including water and oil-repellency, optical clarity and mechanical strength were evaluated for these end-capped FPU- and PDMSPU-based films and is shown in Table 12. In general the performance is lower than the non-end capped FPU films/PDMSPU films. The most significant property lost is the poor resistance to rubbing for these films under 250 g weight rubbing for 800 cycles.

Film Formation from Example 2A and Example 2B

Preparation of FPU Films from Example 2A

In order to prepare the FPU films, Example 2A (2.1 mg, 3.4 mmol of OH) was initially dissolved in THF (0.6 mL). To this solution was added P1 solution (10 mg, 9.7 mol), and NCO (2.8 mg, 0.0132 mmol), providing a NCO/OH ratio of 1.3. The solution was stirred at 80° C. for 40 min. The films were subsequently applied dropwise onto glass slides and annealed for 16 h at 120° C. A list of mixing formulations is shown in Table 13.

The properties of the films obtained from PFPE-b-P (HEMA-S-MMA) are summarized in Table 14, which clearly suggest that these films were amphiphobic, as they could effectively repel both water and hexadecane. The durability of these films was lower than that of their random graft copolymer-based counterparts, and changes observed after the rubbing tests were more pronounced. This deterioration was especially apparent in the case of film 5-B, which was prepared at a low NCO/OH ratio (1.01:1.0). However, the films prepared at a higher NCO/OH ratio (1.3/1.0, such as 5-A), were more stable than 5-B. Another problem with these films was that they exhibited poor optical properties, with optical transmittance values in the range between 40% T and 46% T. In summary, these films exhibited poor performance than those prepared from random graft copolymers.

Preparation of PDMSPU Films from Example 2B

In order to prepare the PDMS-based films, PDMS-b-P (HEMA-S-MMA) was initially dissolved in THF. To this solution was added P1 solution and HDID in the ratios described in Table 15. The solution was subsequently stirred at 60° C. for 2 h. The samples were diluted so that the final solvent composition was THF:AcN at a volume ratio of 1:4. The films were subsequently prepared via drop casting or spin coating, and annealed for 16 h at 120° C.

Example 5. Optical Clarity of the Herein-Described Amphiphobic Clear Coatings Prepared from Ingredients Made Under Approaches A and B Optical Properties (% T).

Percent transmittance is a good measure of the optical clarity of films. In FIG. 5, the % T has been shown for various samples in the range of 450-700 nm. Ordinary glass was taken as a reference with an optical transmittance of 98.8% T, while the optical transmittance of unmodified PU films was 97.7% T. The % transmittance were very high for both drop casted and spin coated samples.

To study the influence of the fluorine content of the films on their optical properties, films were prepared from Example 1A(i). FIG. 2 shows the changes in the transmittance at various fluorine compositions. For this purpose, the films were prepared using Example 1A(i) at same total concentration, and at same NCO/OH ratios. The % T measurements for these samples were observed in the range of 80.5% to 96.9%. As shown in the FIG. 2, the % T values increased as the Fluorine content was decreased. This trend indicates that lower fluorine content is useful for producing films with high optical clarity. See Tables 7, 8, 10, 11, 12, 13, and 16 for results of optical clarity properties of the clear coatings described herein. FIG. 2 shows a plot of transmittance versus fluorine content. Notably, the optical clarity of certain clear coatings was very clear. In particular, percentage transmittance values of approximately 96%-97% were obtained for clear coats prepared using: Approach A of Example 1A(i); Approach A of Example 1A(ii); and Approach A of Example 1B(i) having a fluoro density of 13.6%.

The optical properties of the films prepared from the copolymers of Examples 10, 2A and 2B also showed good optical properties as shown in Table 10, Table 13, and Table 16, respectively.

Films having the lowest amount of grafted PFPE (Example 1B(i)) showed the transmittance, which reached 94% for thick films of ~400 nm. In contrast, the transmittance drastically decreased among the films with higher PFPE content, and films from Example 1B(iv) were almost opaque.

In general, the PDMSPU films exhibited good optical properties. The films formed from Example 2B, PDMS-b-P(S-HEMA-MMA) exhibited optical transmittance values of 85.5% T (drop casted films) and 99.7% (spin coated) at a 10.1% PDMS grafting density.

Example 6. Durability of the Above-Described Amphiphobic Clear Coatings (Prepared from Ingredients Made Under Approaches A and B, Above)

The durability of these films was evaluated using a home-made rubbing device. The rubbing test was performed under 400 g weights at 40 rpm for different intervals of time. The durability was examined based on the sliding angles properties before and after rubbing test. The results are shown in table 7, 8, 10, 11, 12, 13, and 16. In general films prepared from Example 1A(i) and Example 1A(i) were the most durable. The F or PDMS content affects the durability and films having more F % or PDMS % were found relatively less durable than having less F content as shown in table 7, 8, 10, 11, 12, 13, and 16.

To assess the effect of the NCO/OH ratio on the amphiphobic properties and the stability of the PFPE PU films, Example 1A(ii) based (16.5% PFPE) films were prepared at various NCO/OH ratios as shown in FIG. 3. All of the samples were prepared at rt via drop casting and thermal curing at 120° C. for 12 h at a constant final concentration of 13.2 mg/mL.

Sliding angle tests were performed to evaluate the influence of the NCO/OH ratio on the repellency against water and hexadecane. As the NCO/OH ratio was increased, the hexadecane slidng angles decreased gradually. Meanwhile, the water sliding angles increased gradually as the NCO/OH was elevated. At a NCO/OH ratio of 1.0, water had the lowest sliding angle while hexadecane has the highest sliding angle, of 26° and 40°, respectively. As the NCO/OH ratio was increased, the water sliding angles increased further, and reached a maximum value of 58° at a ratio of 1.8. Meanwhile, hexadecane sliding angles continuously decreased and reached a final value of 32°. Apparently, the water sliding angles increased in a linear manner with increasing NCO/OH ratio. This trend might be due to the presence of urethane groups formed after the reaction of OH and NCO.

All of these samples were subjected to a rubbing test for 40 min at 40 rpm at a pressure of $5.8\times10^3$ Pa. Hexadecane and water sliding angles were measured both before and after the rubbing tests were performed. As anticipated the water and hexadecane sliding angles decreased by little more for low NCO/OH ratio than for samples with higher NCO/OH content. For samples with NCO/OH ratios in the range of 1.1-1.4, the sliding angles remained almost unchanged after the rubbing tests.

Table 10 summarizes the durability of PDMS PU films. Drop casted films of several μm thickness were are were stable and showed little change in sliding angles after rubbing for 2400 cycles at 250 g weight. Meanwhile, for spin coated films rubbing tests were performed for 60 min at 40 rpm using a 100 g weight. One the other hand, the spin coated films showed significant decrease in their oil repellent changes after the durability test.

The durability of the films was evaluated by measuring changes in the sliding angles of the films, as well as by changes to the structure of the film. As shown in Table 7, the durability of the films was highly dependent on the grafting densities of the PFPE chains. Polymers with low grafting densities such as Example 1A(i) (13.6% PFPE), and Example 1A(ii) (16.5% PFPE) exhibited much greater durability compared to the films prepared from Example 1A(iii), 1A(iv), or 1A(v). For example, the films generated from 1A(v) were the least stable and did not retain their structural integrity after they had been rubbed for 1 h with a 400 g weight. Meanwhile, under the same rubbing test conditions, the films prepared from Example 1A(i) and Example 1A(ii) showed negligible changes in their hexadecane-repellent properties. Meanwhile, little change was observed in their water sliding angles.

The durability of the PDMSPU films prepared from copolymer of Example 2B was tested by via rubbing tests using a 250 g load at 40 rpm. These tests were conducted for 60 min. The films were durable and retained their amphiphobic performance. This durability was particularly noteworthy with respect to their hexadecane repellency.

Example 7. Anti-Fingerprint Properties of the Above-Described Amphiphobic Clear Coatings Prepared from Ingredients Made Under Approaches A and B The main purpose of this invention was to develop durable anti-finger print films. Human skin continuously secretes sweat, which is a complex mixture of many organic and inorganic materials. Deposition of sweat can cause screens to become fuzzy and unclear, which can interfere with the operation of touchscreen devices. Therefore, the development of a solution to this problem is of key interest.

Therefore, our coated samples were tested for their anti-fingerprint properties. For this purpose, an artificial finger print liquid was initially prepared by a standard method.[5] Subsequently, a modified rubber stamp bearing circular patterns was used to imprint the films. The images of these imprints are shown in FIGS. 4a-d.

As shown in FIG. 4a, an artificial fingerprint was stamped onto ordinary glass. The circular pattern left by the stamp was clearly visible on the glass, indicating that the test liquid could easily be transferred onto the glass. Meanwhile FIG. 4b-c show impressions of the stamps left on PFPE PU films. It is very obvious that the test liquid shrank into tiny droplets on the film surfaces, suggesting that these films exhibited strong anti-fingerprint properties. It was thus apparent that the films shown in FIG. 4b-c had greater fingerprint-resistance than the uncoated glass shown in FIG. 4a. Meanwhile, the film shown in FIG. 4d exhibited relatively poor fingerprint-resistance, which might be due to the fact that the test liquid for finger print incorporated low molecular weight PDMS chains. The results suggest that films prepared from Examples 1A(i) and Examples 1A(ii) exhibited better fingerprint-resistance.

Example 8. Anti-Ink Properties of the Above-Described Amphiphobic Clear Coatings Prepared from Ingredients Made Under Approaches A and B Another interesting property of these PFPE PU and PDMS PU films is their ink-resistance. To evaluate the anti-ink properties of our films, a permanent marker was chosen to write on these films and the results are shown in FIG. 6. The unmodified PU film did not show any ink-resistance, as shown in FIG. 6a. Meanwhile, the films prepared from Example 1A(i) and Example 1B(i) were resistant against ink as shown in FIGS. 6b and 6c, respectively. Also, the faint lines of ink immediately shrank, as shown in FIGS. 6b and 6c. More interestingly, the coated films were easily cleaned and the ink could readily be wiped away. In contrast, it was difficult to remove the ink from the ordinary glass or the unmodified PU films. Therefore, the PFPE PU films undoubtedly have great potential as anti-graffiti-resistant coatings.

Example 9. Ability of Clear Coatings to Allow Use of a Coated Touchscreen of an Electronic Device for the Above-Described Amphiphobic Clear Coatings Prepared from Ingredients Made Under Approaches A and B Determination if Touch Screen Capability is Retained after Coating is Applied to Cellular Telephone Example 1A(ii) (5.2 mg) was dissolved in 0.39 ml THF. To this solution HDID (11.4 mg in 0.21 ml THF), and P1 (25 mg in 0.25 ml THF) were mixed together in 0.4 mL of THF. The samples solution was diluted with THF till 18 mg/mL was obtained. The NCO/OH ratio employed for this synthesis was 1.25. The solution was drop cast onto one part of a BLACKBERRY® cell phone screen. The films were allowed to cure at 38-40° C. for 12 h.

The purpose of this experiment was to test the touch screen features to determine if a portion of the screen that was coated in an FPU coating was still able to be used to choose icon, and type on the screen-displayed keyboard. Another portion of the touch screen was not coated by FPU. For this purpose, modified PU films were produced at 5.3% fluorine content with ~10 μm thickness. The coated and uncoated portions of the touch screen were optically clear and indistinguishable from each other. That is, both portions displayed equal optical clarity. The entire touch screen, including the coated and uncoated portions, remained equally effective before and after coating. A keyboard was displayed on the screen and letters were selected by touching the screen. Letters were chosen from both the coated and uncoated portion. All of the touched letters were selected.

Anti-ink properties of the touch screen were tested with permanent ink marker. Coated samples showed faint line that shrink immediately. Furthermore, the permanent marker's ink was easily cleaned up on the coated portion. After wiping with a dry cloth it appeared completely removed from the screen. In contrast, the permanent marker marking on the uncoated portion of the screen remained the same after wiping with a dry cloth.

Anti-fingerprint properties of the touch screen were tested by applying greasy fingerprints. The coated portion of the touch screen, which initially showed greasy fingerprints, was easily cleaned by wiping with a dry cloth. After passing a dry cloth over it twice, there were no residual fingerprints or streaks at all. The fingerprints appeared completely removed from the screen. In contrast, there were residual marks on the uncoated portion of the screen after wiping with a dry cloth 3 times. These residual marks made the uncoated portion of the screen appear less optically clear (i.e., fuzzy).

These results suggest no disadvantages and significant advantages to coating touch screens with the modified PU films described herein.

Example 10. Oil- and Water-Repellency of the Above-Described Amphiphobic Clear Coatings (Prepared from Ingredients Made Under Approaches A and B, Above)

In general all of the films exhibited low water and hexadecane sliding angles. In addition, the test liquids left behind no residual marks or traces of the liquid, which is a clear indication that these films exhibited strong amphiphobic properties. In general, water sliding angles for the densely PFPE/F grafted polymer Example 1A(v), (32% of OH reacted) were very low when they were tested against both water and hexadecane. These sliding angles were especially low in the case of water. The water and oil repellent sliding angles are shown in table See Tables 7, 8, 10, 11, 12, 13, and 16.

The correlation between amphiphobicity vs. fluorine content was systematically investigated. For this purpose, Example 1A(i) was selected where the grafting density of PFPE was only 13.6%. Here, the NCO/OH ratio (1.25) and the final total concentration for all samples were kept at 20 mg/mL. The fluorine content was tuned by the addition of P1. The effects of the film composition on the water and hexadecane sliding angles are summarized in FIG. 1.

We began at a higher fluorine content of 17.8 wt %, where water exhibited lowest sliding angles (39.4°), while hexadecane showed 31.75. As the fluorine content was gradually decreased to 8.8 wt % the water sliding angles began to increase and reached 44.5° while hexadecane reached a very low sliding angle of 41.5°. A further decrease in the fluorine content from 8.8 to 3.8 wt % resulted in an increase in both the hexadecane and water sliding angles and showed 54.7 for water and 44.5 for hexadecane.

In general all of the films exhibited low water and hexadecane sliding angles. In addition, the test liquids left behind no residual marks or traces of the liquid, which is a clear indication that these films exhibited strong amphiphobic properties. In general, water sliding angles for the densely PFPE/F grafted polymer example 1A(v), (32% of OH reacted) were very low when they were tested against both water and hexadecane. These sliding angles were especially low in the case of water.

To examine the amphiphobic properties of the films prepared from single polymer of this class, Example 1B(i) was used to prepare the FPU films at constant NCO/OH ratio (1.25). The sliding angles for water, hexadecane and diiodomethane are plotted FIG. 7c at various fluorine content ranging from 17.6 to 3.8 wt. % F. For all three test liquids, an increase in F content decreased the sliding angles (enhancing the amphphiphobic properties). The lowest sliding angles were obtained at the maximum F content where water, hexadecane and diiodomethane slides at 39.4°, 31.7° and 27.5°, respectively.

The amphiphobicity of films prepared from copolymer of Example 2B were measured and are shown in Table 16. These films were prepared at different PDMS grafting densities of 10.1% and 15.2%. Both of these films exhibited low sliding angles when they were tested with water and hexadecane droplets. The hexadecane sliding angles were exceptionally low for example, with hexadecane sliding angles of 7° and 10° observed for films with PDMS grafting densities of 15.2% and 10.1%, respectively. Similarly, water sliding angles were very low as well for both spin coated and drop cast films. In general much better amphiphobic properties were observed for these films in comparison with those exhibited by the grafted PDMSPU-based films.

Example 11. Scale-Up of the Coating Process

Non-fluorinated Processing Solvents. Embodiments of the present invention are advantageous because amphiphobic coatings were achieved without using fluorinated or semi-fluorinated solvents for the preparation of the PFPE polyurethane films. That is, solvents such as THF or acetone can be used to readily prepare these amphiphobic films.

Simplicity of the Method. The coating process is also very simple and facile, as no stringent reaction conditions are required. The reagents are mixed at room temperature in the open atmosphere (at low humidity) without requiring any complex preparation conditions. Consequently, this method is very economical.

Curing conditions. Currently, we are using 120° C. for at least 12 h as the curing protocol. However, these conditions can be tuned to a lower temperature.

Example 12. Universal Coating Method

Example 1A(i) coating has been applied onto cotton, wooden piece and stainless steel disc by the following procedure.

Example 1A(i) (18.0 mg, 0.0310 mmol of OH) was dissolved in ≥2.0 mL of THF. To this solution was added $(S_x\text{-r-MMA}_y\text{-r-HEMA}_z)_n$ or P1 (90 mg, 0.088 mmol of OH), diisocyante (31.2 mg, 0.146 mmol). The final concentration was raised to 138/3.5 ml (40 mg/ml), while NCO/OH was 1.24.

Cotton coating. Cotton swatches (2 pieces) were dipped into 1.0 mL of the above solution for 20 min at RT. The soaked cotton samples were taken out and allow to air dry for 20 min before curing at 120° C. overnight.

Metal coating. 0.2 mL of the above solution was drop cast onto stainless steel disc (3.14 cm$^2$). The sample was allowed to dry in a desiccator for 25 min, before curing the sample in oven at 120° C. for overnight prior to any property test.

Wood-piece coating. 2.0 ml of the above coating solution was aero-sprayed on wooden strip (1.4"×1.2" inches$^2$) using as home-made aero-spraying instrument. The sample was cured overnight before any measurements properties were tested.

Water and diiodomethane slides on cotton, cotton, wooden piece and stainless steel disc. Meanwhile, wooden piece and stainless steel disc also repels hexadecane, as shown in FIG. 9. In another study, Example 1C(i) was used to coated cotton, wooden piece and stainless steel disc. All these samples after coating repel water, while stainless steel repel hexadecane as well.

All these indicates the current clear technology is applicable to many solid substrates and thus enhances many the scope of its applications.

Example 13. Effect NCO/OH Ratio on Durability of the Films

To assess the effect of the NCO/OH ratio on the amphiphobic properties and the stability of the PFPE PU films, Example 1A(ii) based (16.5% PFPE) films were prepared at various NCO/OH ratios as shown in FIG. 3. All of the samples were prepared at rt via drop casting and thermal curing at 120° C. for 12 h at a constant final concentration of 13.2 mg/mL.

Sliding angle tests were performed to evaluate the influence of the NCO/OH ratio on the repellency against water and hexadecane. As the NCO/OH ratio was increased, the hexadecane slidng angles decreased gradually. Meanwhile, the water sliding angles increased gradually as the NCO/OH was elevated. At a NCO/OH ratio of 1.0, water had the lowest sliding angle while hexadecane has the highest sliding angle, of 26° and 40°, respectively. As the NCO/OH ratio was increased, the water sliding angles increased further, and reached a maximum value of 58° at a ratio of 1.8. Meanwhile, hexadecane sliding angles continuously decreased and reached a final value of 32°. Apparently, the water sliding angles increased in a linear manner with increasing NCO/OH ratio. This trend might be due to the presence of urethane groups formed after the reaction of OH and NCO.

All of these samples were subjected to a rubbing test for 40 min at 40 rpm. Hexadecane and water sliding angles were measured both before and after the rubbing tests were performed. As anticipated the water and hexadecane sliding angles decreased by little more for low NCO/OH ratio than for samples with higher NCO/OH content. For samples with NCO/OH ratios in the range of 1.1-1.4, the sliding angles remained almost unchanged after the rubbing tests.

Example 14. Amphiphobicity

Polymers with lower PFPE grafting density are displayed lower amphiphobic properties than film with higher PFPE grafting. All polymers Example 1B(i), Example 1B(ii), Example 1B(iii), and Example 1B(iv) displayed low hexadecane (oil) sliding angles, while, water sliding angles for the highest grafted polymer Example 1B(iv), 32% of OH reacted, were best.

To examine the amphiphobic properties of the films prepared from single polymer of this class, Example 1B(i) was used to prepare the FPU films at constant NCO/OH ratio (1.15). The final concentration of the polymer solution was 20 mg/ml. The wt. % of PFPE or F % content was gradually varied. We began at highest Fluorine content of 17.6 wt %. At this composition, water has lowest sliding angles (34°), while hexadecane has 48° among the samples. By decreasing PFPE content, the water sliding angles started to increase, while for hexadecane it first decreased and then started to increase. Hexadecane sliding angles started again to increase once they reached their minimum 37.5° at 6.1 wt. % of PFPE. In terms of fluorine content, the best properties for hexadecane were obtained at 3.8 wt % of fluorine.

Amphiphobicity of Example 1C(i)-Based Films.

Figure 8:
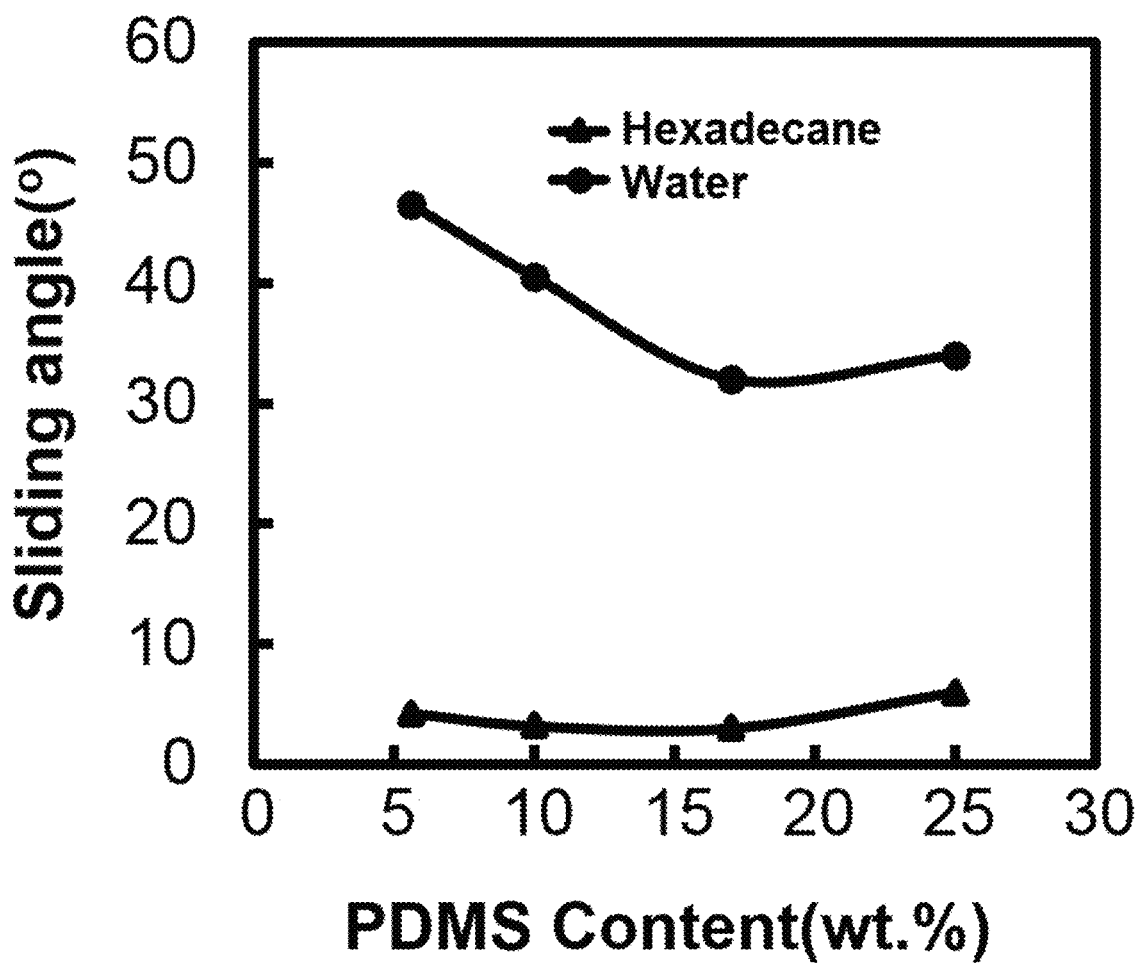
FIG. 8 shows sliding angles for water and hexadecane with varying PDMS content of PDMS PU prepared from Example 1C(i).

Films obtained by drop casting and spin coating from this family of polymers were evaluated via water and hexadecane sliding angle measurements. As shown in Table 10, all of the polymers provided films that exhibited low water sliding angles. Low hexadecane sliding angles were also observed for films prepared from Example 1C(i), where the PDMS grafting density was only 11.3%. As shown in FIG. 8, sliding angles for PDMSPU films prepared from Example 1C(i) by drop casting, where the hexadecance sliding angles are as low as 3° (5 μL) while water slides at 40° (15 μL).

Example 15. Embedding of Silica Particles in Durable Amphiphobic Clear Coating

Two types of silica particles were used to embed silica particles in amphiphobic clear coatings. One was an unmodified silica particle (size ~400 nm), and the other was a bifunctional silica particle (bearing amine and fluorine on the surface, size ~100 nm). These particles were incorporated into an FPU matrix consisting of NCO (5.0 mg), P1 (10 mg) and Example 1A (i) (5.0 mg) in the ratio shown in Table 17. First, the silica particles were partially dispersed into THF. This was followed by the addition of a THF solution of FPU into the partially dispersed silica particles. In the cases of samples 3 and 4, a TFT:THF (30:70, v/v) solvent mixture was used to disperse the coated silica particles into the matrix. The films were drop cast onto glass slides and the solvent was allowed to evaporate at room temperature. After 20 min, the samples were cured at 120° C. for 12 h before any performance tests were performed.

Silica particles (both coated and uncoated) were successfully incorporated into FPU films, as shown in Table 17. FPU films incorporating silica particles films retained their amphiphobic properties even at higher particle loadings reaching 1.5 times the original mass of the FPU matrices. However, at very high particle loadings (more than double the mass of the original FPU matrix), the water contact angles increased to 121°. However, the durability of the films decreased when greater amounts of silica particles were incorporated into the system.

Example 16. PFPE Grafted Polyol

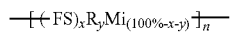

To prepare PFPE grafted polyol, either PFPE-bearing methacrylates or PFPE-bearing acrylates are mixed in the presence of one or a combination of monomers. Suitable monomers include acrylates, hydroxyl-bearing acrylates, styrenes, methacrylates, hydroxyl-bearing methacrylates, and/or vinyl esters. The acrylate and monomer(s) are mixed in a flask suitable for free radical polymerization either in bulk or in the presence of a solvent such as tetrahydrofuran or a mixture of tetrahydrofuran and trifluorotoluene to form a reaction mixture. This reaction mixture is stirred using either a mechanical or a magnetic stir bar. Optionally, a chain transfer catalyst or chain transfer agent is added to the reaction mixture to control molecular weight. At this stage, the flask is loaded with AIBN (or any similar initiator) and polymerization begins upon exposure to light and/or heat, depending on the type of initiator. Once the polymerization reaches a desired degree of monomer conversion, the reaction is stopped. The solid polymer product is collected by its precipitation in a poorly solvating solvent or by evaporation of a solvent.

Example 17. Polysiloxane Grafted Polyol

To prepare polysiloxane grafted polyol, either polysiloxane-bearing methacrylates or siloxane acrylates are mixed in the presence of one or a combination of monomers. Suitable monomers include acrylates, hydroxyl-bearing acrylates, styrenes, methacrylates, hydroxyl-bearing methacrylates, and/or vinyl ester. The siloxane methacrylates or siloxane acrylates (e.g., PDMS acrylate) and monomer(s) are mixed in a flask suitable for free radical polymerization either in bulk or in the presence of a solvent to form a reaction mixture. The reaction mixture is stirred using either a mechanical or a magnetic stir bar. Optionally, a chain transfer catalyst or reagent is added to the reaction mixture to control molecular weight. At this stage, the flask is loaded with AIBN (or any initiator) and polymerization will begins upon exposure to light and/or heat, depending on the type of initiator. Once the polymerization reaches to a desire degree of monomer conversion, the reaction is stopped. The solid polymer product is collected by its precipitation in a poorly solvating solvent or by evaporation of a solvent.

Example 18. Preparation of Water-Based PDMS PU Film

Individually, the following three ingredients were dissolved in a minimum amount of acetone, and then the three solutions were combined in any order. Unmodified polyol P1-0 Purchased from Sherwin-Williams) (72 mg, 0.08 mmol of OH) was dissolved in acetone (1 mL). PDMS-modified-polyol (see Example 1C(v)) (20 mg at 6.1% grafting density, 0.017 mmol of OH) was dissolved in acetone (1.0 mL). Desmodur BL 3272 MPA (available from Bayer, see structure below) (50 mg, 0.12 mmol of NCO) was dissolved in acetone (1.0 mL). Desmodur BL 3272 MPA is a blocked (meaning protecting groups are present) Aliphatic Polyisocyanate based on hexamethylene diisocyanate and dissolved in propylene glycol monomethyl ether acetate). Once mixed together, distilled water (5.0 mL) was added to the resultant mixture. The volume was then reduced in vacuo using a rotary evaporator (Büchi) so that the acetone was substantially removed and the water remained. The resultant white emulsion-like solution was termed "coating solution".

The coating solution was drop cast onto a glass slide using a pipette, and the slide was held flat and was placed in a desiccator. The dessicator had pressurized air flowing through it via an inlet and an outlet. The coated slide was allowed to evaporate in the dessicator with the air flow for 4 h at room temperature. At this point, the uncured coating's appearance was not transparent. The coated slides were then heated so that the coating could cure for 12 h at 150° C. After heating, the coating's appearance was transparent. In tests for amphiphobic properties of coatings prepared in this manner, cured coatings had droplets of both water and hexadecane slide off the coated surface. The slide angles for these coatings was approximately 5° for hexadecane, and approximately 45° for water. By comparison, uncoated slides appear wet and have no sliding droplets at any angle. Films prepared in this way showed optical transmittance of approximately 96%, which indicated high optical clarity.

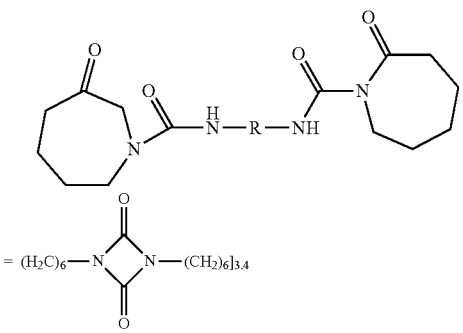

The Chemical Structure of Desmodur BL 3272, a Polyisocyanate that has ε-Caprolactam Protecting Groups

Example 19. Preparation of PDMS PU Film from Example 1C(iv) in Dimethyl Carbonate Example 10 (iv) (3.0 mg, 0.006 mmol) was dissolved in acetone (1.0 mL). HDID (8.8 mg, 0.053 mmol of NCO) was added to the above solution, and the combined mixture was heated and stirred at 65° C. for 60 min. P1-0 (19.0 mg, 0.0418 mmol) was added to the mixture and stirring and heating were continued at 65° C. for an additional 150 min. The mixture was cooled to room temperature and dimethyl carbonate was added (3.0 mL). The mixture's volume was reduced by removing acetone, dimethyl carbonate and other volatile solvents in vacuo via a rotary evaporator. The resultant concentrated solution was adjusted to 15 mg/mL in dimethyl carbonate (DMC). This coating solution was dispensed onto glass slides and the DMC was allowed to evaporate for ~2 h at room temperature in a desiccator under an active $N_2$ atmosphere. The coated glass slides were thermally cured in an oven at 120° C. overnight. The PDMS PU film obtained was optically clear (97.4±0.1), and oil- and water-repellent. Also the film possess anti-ink properties.

Example 20. Preparation of PDMS PU Film from Example 1C(iv) in Acetone

Example 10 (iv) (3.0 mg, 0.006 mmol) was dissolved in acetone (1.0 mL). HDID (8.8 mg, 0.053 mmol of NCO) was added to the above solution, and sample was heated and stirred at 65° C. for 60 min. P1-0 (19.0 mg, 0.0418 mmol) was added to the above reaction mixture and continued stirring at 65° C. for an additional 150 min. The solution was cooled to room temperature the final concentration was adjusted to 15 mg/mL in acetone. This coating solution was dispensed onto glass slides and allowed the acetone to evaporate for ~1 h in a desiccator with $N_2$ inlet and outlet. The coated glass slides were thermally cured at 120° C. overnight. The PDMS PU film obtained was optically clear (94.8±3.5) and oil- and water-repellent.

Example 21. Preparation of PDMS PU Films without Preheating Before Casting

Example 10 (iv) (6.25 mg, 0.012 mmol of OH in 0.5 mL acetone), HDID (4.4 mg, 0.026 mmol of NCO in 0.10 mL acetone), and P1-0 (4.75 mg, 0.010 mmol of OH in 0.1 mL of acetone) were mixed together in any order. To this solution, was added acetonitrile (1.0 mL). Notably, this mixture was not heated. All acetone and about half of acetonitrile were removed under vacuum using a rotary evaporator till the volume of solution was reduced to ~0.5 mL. Fresh acetonitrile (0.35 mL) was added to dilute the coating solution to 15 mg/mL. This coating solution was dispensed onto glass slides using a pipette. The slides were placed in a desiccator, having an $N_2$ atmosphere gently freshened through an inlet and out-let, for approximately 3 h. The acetonitrile evaporated. The coated slides were then thermally curried in an oven overnight in an oven at 120° C. The films obtained were optically clear (98.9±0.1), oil- and water-repellent, and ink-resistant.

Example 22: Preparation of P(S-alt-MA)-g-PDMS

Commercially available Poly(styrene-alt-maleic anhydride) (P(S-alt-MA), average Mn~1,700 by GPC, and maleic anhydride (~32 wt %) were placed under vacuum at 60° C. for 4 hours to remove any volatile residual. Poly (styrene-alt-maleic anhydride) (0.8 g), PDMS monohydroxy terminated (2.0 g), THF (~10.0 mL), and pyridine (~1.0 mL) were charged into a reactor. The resulting mixture was heated to and maintained at 60° C. for 48 hours. Solvents were then removed under vacuum at 60° C. for 4 hours, and viscous Poly(styrene-alt-maleic anhydride)-g-PDMS (P(S-alt-MA)-g-PDMS) was obtained.

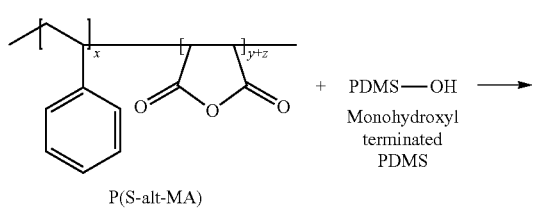

P(S-alt-MA) + PDMS—OH Monohydroxyl terminated PDMS →

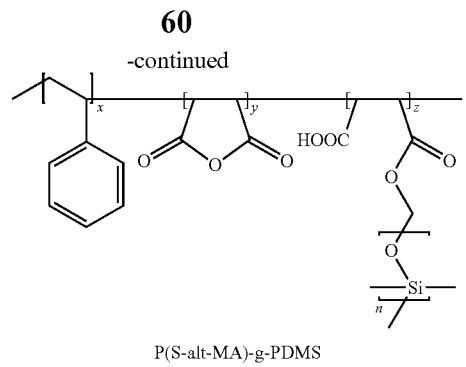

P(S-alt-MA)-g-PDMS

Example 23: Preparation of PDMS-b-PGMA

Bromide terminated PDMS was prepare through published method (*J. Mater. Chem. A*, (2014), 2:8094-8102). Bromide-terminated PDMS (2.0 g), copper(I) bromide (0.060 g), copper(II) bromide (0.010 g), acetone (5.0 mL), and N,N,N',N',N"-pentamethyldiethylenetriamine (70 µL) were charged into a nitrogen filled reactor, and the mixture was degassed through three freeze-pump-thaw cycles. Then degassed glycidyl methacrylate (1.8 mL) was added into the reactor. The reactor was heated to 55° C. for 3 hours. Then a crude product was poured into methanol (50 mL) and PDMS-b-PGMA precipitated. Crude PDMS-b-PGMA solid was re-dissolved in acetone (10 mL) and precipitated in methanol (50 mL) again. This precipitation process was repeated three times until a blue color was removed and purified PDMS-b-PGMA product was obtained. This product PDMS-b-PGMA was placed under vacuum for 4 hours to remove any residual solvents.

Example 24: Preparation of PEI-g-PDMS, where Mn of PEI ~10,000 ("P20-1")

Commercially available branched polyethylenimine (PEI branched, average Mw ~25,000 by LS, average Mn~10,000 by GPC) was placed under reduced pressure at 60° C. for 24 hours to remove any volatiles. PEI branched (2.0 g) and PDMS monoglycidyl ether (1.0 g), chloroform (~10.0 mL), triethylamine (~2.0 mL) were charged in a reactor. {In subsequent studies, a 1:1 mass ratio of PEI and PDMS monoglycidyl ether were used, and the synthesis was also successful.) PEI branched (2.0 g) and PDMS monoglycidyl ether (1.0 g), chloroform (~10.0 mL), triethylamine (~2.0 mL) were charged in a reactor. The resulting mixture was heated to 60° C. and maintained for 48 hours. After that, chloroform and triethylamine were removed under reduced pressure at 60° C. for 4 hours, and a waxy product ("P20-1") was obtained. See FIG. 11 for structural formulae of P20-1 and P20-2.

Example 25: Preparation of PEI-g-PDMS, where Mn of PEI Mn~1800 ("P20-2")

The commercially available branched polyethylenimine (PEI branched, average Mw ~2000 by LS(light scattering), average Mn~1800 by GPC, 50 wt. % in $H_2O$) placed under reduced pressure using vacuum at 60° C. for 24 hours to remove the volatile residual. If precipitate was observed, it was removed by centrifugation; if not, it was used as is. Dry branched PEI (1.0 g) and PDMS monoglycidyl ether (2.0 g), chloroform (~10.0 mL), triethylamine (~2.0 mL) were charged into a reactor which was under $N_2$. The mixture was heated to 60° C. and kept for 48 hours.

In initial syntheses, chloroform and triethylamine were removed in vacuum at 60° C. for 4 hours, and viscos P20-2 was left.

In further syntheses, the reaction mixture was condensed to half of its initial volume under vacuum, and its temperature was increased to 63° C. After another 24 hours, chloroform was removed under vacuum at 60° C. for 4 hours, and viscous PEI-g-PDMS was obtained.

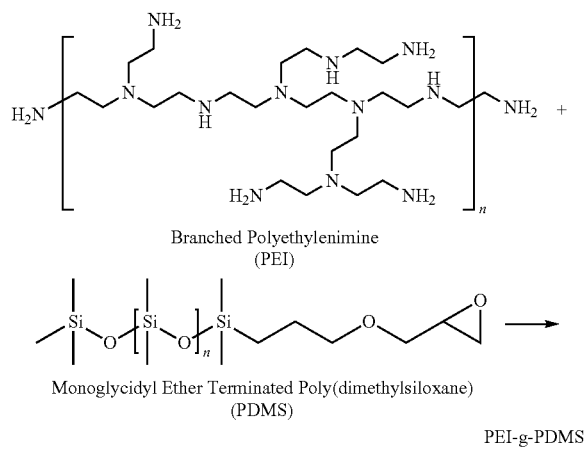

Example 26: Preparation of PDMS-b-Polyamine ("P20-3")

Poly(dimethylsiloxane)-block-poly(2-hydroxyethyl acrylate) (PDMS-b-PHEA) was prepared using a published method (Liu G., et al. *J. Mater. Chem. A*, 2014, 2, 8094). PDMS$_{60}$-b-HEA$_{20}$ (1.0 g), carbobenzyloxyglycine (0.300 g), 1-Ethyl-3-(3-dimethylaminopropyl)carbodiimide (0.400 g), THF (10 mL) and triethylamine (2.0 mL) were charged into a reactor. The mixture was heated to 60° C. and kept for 24 hours. After that, the crude reaction mixture was precipitated in water. The resultant waxy polymer was dissolved in ~5 mL trifluoroacetic acid and heated to 70° C. for 2 hours. Then trifluoroacetic acid was removed by vacuum and the waxy residue was dissolved in 5 mL of triethylamine and precipitated in excess amount of water. See FIG. 12 for structural formulae of P20-3.

Example 27: Preparation of Polyacrylic Acid-g-PDMS ("P20-4")

Acrylic acid (1.4 mL), methyl methacrylate (19.7 mL), azobisisobutyronitrile (AIBN, 2.5 g), acetone (300 mL) was charged into a reactor. The mixture was heated to 55° C. and kept for 24 hours. Then the reaction was condensed to ~100 mL by vacuum and precipitated in ~400 mL hexanes. The solid precipitate is poly(acrylic acid-co-methyl methacrylate) (P(AA-co-MMA)) and was dried by vacuum. To prepare P20-4, P(AA-co-MMA) (1.0 g), PDMS monoglycidyl ether (1.0 g), chloroform (~10.0 mL), pyridine (~0.5 mL) were charged into a reactor. The mixture was heated to 60° C. and kept for 48 hours. After that, solvents were removed under vacuum at 60° C. for 4 hours, and waxy P20-4 was left. See FIG. 13 for structural formulae of P20-4.

Example 28: Preparation of a (Polyanhydride and Polycarboxylic Acid)-g-PDMS ("P20-5")

A commercially available poly(styrene-co-maleic anhydride) (average Mn~1,700 by GPC, maleic anhydride ~32 wt %) was vacuumed at 60° C. for 4 hours to remove the volatile residual. Poly(styrene-co-maleic anhydride) (0.8 g), PDMS monohydroxy terminated (2.0 g), THF (~10.0 mL), pyridine (~1.0 mL) were charged into a reactor. The mixture was heated to 60° C. and maintained for 48 hours. After that, solvents were removed under vacuum at 60° C. for 4 hours, and viscous P20-5 was left. See FIG. 14 for structural formulae of P20-5.

Example 29: Preparation of Another (Polyanhydride and Polycarboxylic Acid)-g-PDMS ("P20-6")

The commercially available poly(styrene-co-maleic anhydride) (average Mn~1,700 by GPC, maleic anhydride ~32 wt %) was vacuumed at 60° C. for 4 hours to remove the volatile residual. Poly(styrene-co-maleic anhydride) (0.4 g), PDMS monoglycidyl ether (1.0 g), THF (~10.0 mL), pyridine (~1.0 mL) were charged into a reactor. The mixture was heated to 60° C. and maintained for 48 hours. After that, solvents were removed under vacuum at 60° C. for 4 hours, and viscous P20-6 was left. See FIG. 15 for structural formula of P20-6.

Example 30: Preparation of Polyol-g-PDMS ("P20-7"), Wherein the Polyol was Poly(HEMA-Co-St-Co-BMA-Co-MMA)

2-Hydroxyethyl methacrylate (HEMA, 6.0 mL), styrene (St, 5.0 mL), butyl methacrylate (BMA, 5.0 mL), methyl methacrylate (MMA, 5.0 mL), azobisisobutyronitrile (AIBN, 1.0 g), THF (100 mL) was charged into a reactor. The mixture was heated to 70° C. and maintained for 12 hours. Then the reaction was precipitated in ~400 mL hexanes. The solid precipitate is Poly(HEMA-co-St-co-BMA-co-MMA) and was dried by vacuum. PDMS monohydroxy terminated (2.0 g) and oxalyl dichloride (1.6 g) was charged into a reactor. After 12 hours of reaction at room temperature, excess oxalyl dichloride was removed by vacuum at 40° C. for 4 hours. The residue liquid was PDMS end functionized by acid chloride group (PDMS-COCl). The freshly prepared PDMS-COCl (0.3 g) was added dropwise into a mixture of poly(HEMA-co-St-co-BMA-co-MMA) (1.0 g), THF (10 mL) and triethylamine (1 mL) in a reactor and reacted for 24 hours. Then the crude reaction mixture was added into 100 mL water, and the polymer precipitate was collected was dried under vacuum. See FIG. 16 for structural formula of P20-7.

Example 31: Preparation of PEI-g-PFPO ("P20-8")

The commercially available branched polyethylenimine (PEI branched, average Mw ~25,000 by LS, average Mn~10,000 by GPC) was placed under reduced pressure at 60° C. for 24 hours to remove the volatile residual. PEI branched (4.0 g) and PFPO bearing one terminal carboxyl group (PFPO—COOH, with a trade name Krytox 157 FSL) monoglycidyl ether (2.0 g), chloroform (~10.0 mL), trifluorotoluene (~5.0 mL), and methoxyperfluorobutane (~3.0 mL) were charged into a reactor. The mixture was heated to 60° C., then 2-chloro-1-methylpyridinium (CMPI, 0.50 g) iodide was added, and the 60° C. temperature was maintained 24 hours. After that, the solution was separated from any insoluble material (e.g., reacted coupling agent), and the solvent were removed under vacuum at 60° C. for 4 hours. Waxy P20-8 product was obtained. See FIG. 17 for structural formula of P20-8.

Example 32: Preparation of P(S-alt-MA)-g-PEO$_{750}$

In preliminary studies, P(S-alt-MA)-g-PEO$_{750}$ was prepared using the following procedure. This synthesis has not been optimized. Commercially available Poly(styrene-alt-maleic anhydride) (P(Sty-alt-MA), average Mn~1,700 g/mol by GPC, maleic anhydride ~32 wt %) and Poly (ethylene glycol) methyl ether (PEO$_{750}$—OH, average Mn=750 g/mol) were placed under reduced pressure at 60° C. for 4 hours to remove any volatile residuals. Poly (styrene-alt-maleic anhydride) (2.0 g), PEO$_{750}$—OH (1.4 g), anhydrous THF (~20.0 mL), pyridine (~1.0 mL) were charged into a reactor to form a mixture. The mixture was heated to and maintained at 60° C. for 24 hours. Approximately half of the volume of the mixture was removed by vacuum, and the temperature was increased to 80° C. and maintained for another 24 hours. Solvents were then removed under vacuum at 60° C. for 4 hours. The remaining product was Poly(styrene-alt-maleic anhydride)-g-PEO$_{750}$ (P(S-alt-MA)-g-PEO$_{750}$).

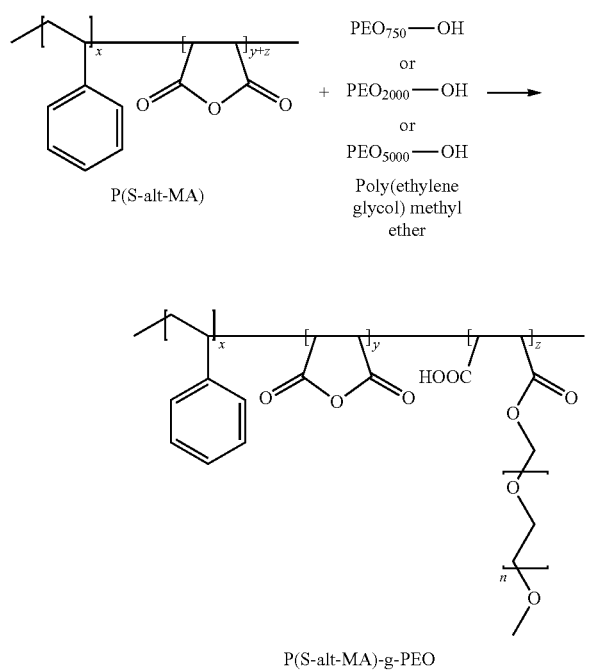

Example 33: Preparation of P(S-alt-MA)-g-PEO$_{2000}$

In preliminary studies, P(S-alt-MA)-g-PEO$_{2000}$ was prepared using the following procedure. This synthesis has not been optimized. Commercially available Poly(styrene-alt-maleic anhydride) ("P(S-alt-MA") was dried under vacuum at 60° C. for four hours prior to use. (This copolymer had a weight percentage of maleic anhydride of ~32 wt %.) Commercially available poly (ethylene glycol) methyl ether ("PEO$_{2000}$—OH") was also dried prior to use under vacuum at room temperature for 4 hours. (The average molecular weight of the poly (ethylene glycol) methyl ether was Mn=2000 g/mol).

Poly(styrene-alt-maleic anhydride) (2.0 g), PEO$_{2000}$—OH (2.0 g), anhydrous THF (~20.0 mL), pyridine (~1.0 mL) were charged into a reactor to form a mixture. The mixture was heated to 60° C. and kept for 24 hours. Then, around half of the volume was removed by vacuum, and the temperature was increased to 80° C. and kept for another 24 hours. After that, solvents were removed in vacuum at 60° C. for 4 hours, and the remaining product was Poly(styrene-alt-maleic anhydride)-g-PEO$_{2000}$ (P(S-alt-MA)-g-PEO$_{2000}$).

Example 34: Preparation of P(S-Alt-MA)-g-PEO$_{5000}$

In preliminary studies, P(S-alt-MA)-g-PEO$_{5000}$ was prepared using the following procedure. This synthesis has not been optimized. The average Mn of P(S-alt-MA was ~1,700 as determined by GPC.

Commercially available poly(styrene-alt-maleic anhydride) was dried under vacuum at 60° C. for four hours prior to use. (This copolymer had a weight percentage of maleic anhydride of ~32 wt %.) Commercially available poly (ethylene glycol) methyl ether was also dried prior to use under vacuum at room temperature for 4 hours. (The average molecular weight of the poly (ethylene glycol) methyl ether ("PEO$_{5000}$-OH") was Mn=5000 g/mol.)

The following components were charged into a reactor to form a mixture:
(i) Poly(styrene-alt-maleic anhydride) (0.8 g),
(ii) PEO$_{5000}$-OH (2.0 g),
(iii) anhydrous THF (~20.0 mL), and
(iv) pyridine (~1.0 mL).

The mixture was heated to and maintained at 60° C. for 24 hours. Then, around half of the volume was removed by vacuum, and the temperature was increased to 80° C. and maintained for another 24 hours. Solvents were then removed in vacuum at 60° C. for 4 hours, and the remaining product was Poly(styrene-alt-maleic anhydride)-g-PEO$_{2000}$ (P(S-alt-MA)-g-PEO$_{2000}$).

Example 35: Preparation of Polyol-g-PIB

In preliminary studies, Polyol-g-PIB was prepared using the following procedure. This preparation has not been optimized. Commercially available hydroxyl terminated polyisobutylene (PIB—OH, 0.20 g) was dissolved in ~5 mL anhydrous THF, and 1.0 mL oxalyl chloride was added into the solution all at once. After 12 hours of reaction at room temperature, PIB—OH had converted into acid chloride terminated polyisobutylene (P1B-COCl). Solvent and excess amount of oxalyl chloride were then removed by vacuum at 60° C. for 4 hours. PIB-COCl was re-dissolved in ~2 mL anhydrous THF, and the solution was added into polyol (0.10 g) in anhydrous THF (~3 mL) solution. After 24 hours of reaction at room temperature, solvent was removed in vacuum at 60° C. for 4 hours, and Polyol-g-Polyisobutylene (Polyol-alt-PIB) was left.

Example 36: Preparation of Polyol-g-PB

Polybutadiene-g-polyol was prepared by reacting dicarboxyl-terminated polybutadiene ("CTPB") with oxalyl chloride, followed by esterification with methanol and polyol in sequence.
Specifically, dicarboxyl-terminated PB (0.30 g), oxalyl chloride (70 µL) and dichloromethane (3.0 mL) were mixed in a glass flask under N$_2$ atmosphere at room temperature. The reaction of aforementioned mixture was allowed to vigorously stir for 12 h.
The mole ratio of the (COCl)$_2$ to CTPB was approximately 10~13. The mixture's volume was reduced to remove the residual oxalyl chloride, and acid chloride-terminated PB was obtained as a yellow liquid. Methanol (4.5 µL) was added to the flask and the contents was stirred under N$_2$ atmosphere at room temperature for 12 h. After reaction, one end of a PB chain was terminated by ester and the other end was acid chloride. The mole ratio of the MeOH to acid chloride-terminated polybutadiene was approximately 1.1~1.3.
Subsequently, the obtained PB with one end terminated with acid chloride was added into a CH$_2$Cl$_2$ (6 mL) solution of polyol (0.15 g) dropwise. This mixture was stirred under $N_2$ atmosphere at room temperature for 24 h. The mole ratio of the ester-terminated polybutadiene to polyol was approximately 1.1~1.3. The resulting polybutadiene-g-polyol product was a yellow viscous liquid. Coatings of polybutadiene-g-polyol modified polyurethane are described in Example 43.

Example 37: Preparation of Polyepoxide-g-PDMS ("P30-1")

A resin that had more than one glycidyl group, eg. Bis-A (0.10 mL, containing 0.68 mmol glycidyl groups) was mixed with an amount of a particular P20 (types of P20 and amounts are listed in Table 19) in chloroform (0.50 mL). The mixture was heated to 60° C. and the temperature was maintained for 1 hour. These samples were used in the next step (Step 3 of FIG. 10) without any further purification.

Example 38: Preparation of PFPO Containing Glycidyl Anchor, Also Known as Polyepoxide-g-PFPO ("P30-2")

A resin contains more than one glycidyl groups, eg. Bis-A (0.10 mL, containing 0.68 mmol glycidyl groups) was mixed with P20-8 in chloroform/trifluorotoluene/methoxyperfluorobutane (0.50 mL, 10/5/3 v/v/v). The mixture was heated to 40° C. and kept for 1 hour. These samples were used in the next step (Step 3 of FIG. 10) without any further purification.

Example 39A: Preparation of PDMS Micellar Solutions (Step 3 of FIG. 10) Wherein Hardener was Mixed with P30

Activator (0.10 mL, contains nonylphenol/triethanolamine/piperazine polyoxypropylenediamine=1/0.0621/0.0200/0.583=m/m/m/m) was mixed into any of the P30 polymer mixture samples. After that, dimethyl carbonate (DMC, ~2 mL) and dimethylformamide (DMF, ~0.1 mL) were added into the mixture. A clear solution with slightly bluish tint formed, which was the uncured epoxy resin solution ready for coating in the Example 40.

Example 39B: Preparation of PDMS Micellar Solutions (Step 3 of FIG. 10) Wherein Bis-A was Mixed with P20 and Hardener Two procedures were used to cure epoxy coatings. In the first procedure, only PEI-g-PDMS (or another P20) was used to cure epoxy coatings. That is, no other hardener was added. In the second procedure, PEI-g-PDMS (or another P20) and an additional hardener were used to cure epoxy coatings. Hardener includes nonylphenol/triethanolamine/piperazine polyoxypropylenediamine=1/0.0621/0.0200/0.583=m/m/m/m.

Using the first procedure, Bis-A (0.10 mL) and PEI-g-PDMS (20 mg) were dissolved in butanone (2.0 mL) to form a mixture. DMF (0.2 mL) was added into the mixture. Using the second procedure, Bis-A (0.10 mL), PEI-g-PDMS (20 mg) and a hardener (30 mg) were dissolved in butanone (2.0 mL) to form a mixture. DMF (0.2 mL) was added into the mixture. Uncured epoxy-based resin solutions were ready for coating.

Example 40: Epoxy Coating Procedure and Curing

Different thickness of coat could be achieved by casting different amount of solution from Step 3. For example, 0.20 mL of solution from Example 39A was cast on ⅔ area of a 1'×3' glass plate, and that gave a ~7 um thick coating. The glass plate was put on a horizontal bench, and the solution was evenly casted on the glass plate. Around 20 min were allowed to pass for most of the solvent to evaporate. To fully evaporate the solvent(s), the coated glass plate was then placed into a drying cabinet with a dust-removed air purging system for more than 1 hour.

The coated epoxy resin films were cured at room temperature or under heating. At room temperature in the drying cabinet, the films were solidified after 8 hours, and were fully cured after ~72 hours. At 120° C. in a heating oven, films were fully cured in 1 hour. After fully curing, the PDMS modified epoxy resin coating on the substrate was glossy and clear. When tilting the coated glass plate, hexadecane (~0.02 mL) and water (~0.05 mL) droplets rolled off the coated area. The coating was strong enough to resist scratches by fingernails.

Example 41: Preparation of PEO Modified Polyurethane Coating Using P(S-Alt-MA)-g-PEO$_{750/2000/5000}$ In preliminary studies, PEO Modified Polyurethane Coating Using P(S-alt-MA)-g-PEO$_{750/2000/5000}$ were prepared using the following procedure. This preparation has not been optimized. To obtain PEO-modified polyurethane coatings the following three components (i, ii and iii) were dissolved in butanone (2.0 mL) and DMF (0.5 mL):

(i) P(S-alt-MA)-g-PEO (20 mg) having three different PEO (differing by molecular weight) as described in the previous Examples;

(ii) a poly(hexamethylene diisocyanate) (predominantly trimer, 65 mg, 80 wt % in butyl acetate, such as those sold under the trademarks UH80—ULTRA SYSTEM® by SHERWIN-WILLIAMS Co.); and (iii) polyol (100 mg, containing 32 wt % HEMA).

Different thicknesses of coatings could be achieved by casting different amounts of this solution. For example, 0.20 mL of this solution when cast on a 1'×1' glass plate, gave a ~24 μm thick coating. The glass plate was placed on a horizontal support surface, and the solution was evenly casted on the glass plate. Around 10 min were allowed to pass to allow most of the solvent to evaporate. To more fully evaporate the solvent(s) and cure the film, the coated glass plate was put into a drying cabinet and heated to 150° C. for 24 hours.

After curing was complete, the PEO modified polyurethane coatings on the substrate appeared glossy and totally transparent. When tilting the coated glass plate, oil (hexadecane, ~0.02 mL) and water (~0.05 mL) droplets slid off the coated area. Qualitatively, we observed the following liquid could slide off the coatings without leaving any trace: ethanol, methanol, dodecane, DMF, diiodomethane. The coatings were strong enough to resist scratching by a fingernail. After storage at room temperature for approximately two days, the performance of anti-smudge properties of PEO$_{2000}$ and PEO$_{5000}$ modified coatings degraded. However, the anti-smudge performance was regenerated when the samples were slightly heated (~50° C.) for 20 seconds,

Example 42: Preparation of PDMS Modified Polyurethane Coating Using Polyol-Alt-PIB In preliminary studies, PDMS Modified Polyurethane Coating Using Polyol-alt-PIB was prepared using the following procedure. This preparation has not been optimized. To obtain PIB modified polyurethane coatings, the following three ingredients were combined and dissolved in toluene (2.0 mL):

(i) Polyol-alt-PIB (10 mg, see previous Example);
(ii) a poly(hexamethylene diisocyanate) (predominantly trimer, 65 mg, 80 wt % in butyl acetate, such as those sold under the trademarks UH80—ULTRA SYSTEM® by SHERWIN-WILLIAMS Co.); and
(iii) polyol (100 mg, containing 32 wt % HEMA).

Different thickness of coating could be achieved by casting different amount of this solution. For example, 0.20 mL of this solution when cast on a 1'×1' glass plate, gave a ~29 μm thick coating. The glass plate was put on a horizontal support surface, and the solution was evenly casted on the glass plate. Around 10 min were allowed to pass to allow most of the solvent to evaporate. To more fully evaporate the solvent(s) and cure the film, the coated glass plate was put into a drying cabinet and heated to 160° C. for 48 hours.

After curing was complete, the PIB modified polyurethane coating on the substrate appeared glossy and generally clear. When tilting the coated glass plate, oil (hexadecane, ~0.02 mL) and water (~0.05 mL) droplets slid off the coated area. The following liquids could slide off the coatings without leaving any trace: ethanol, methanol, dodecane, DMF, and diiodomethane. The coatings were strong enough to resist scratching by a fingernail.

Example 43: Preparation of PDMS Modified Polyurethane Coating Using PEI-g-PDMS or P(S-Alt-MA)-g-PDMS or PDMS-b-PGMA In previous example, PDMS was reacted with polyol, and then the product of that reaction was reacted with polyisocyanate. In this example, PDMS was reacted with polymers bearing functional groups, and that product was then added to polyol and polyisocyanate either all at once or in any order. Because of the ease of synthesis this alternative "additive" method is described herein. Conveniently, such an additive can be used with a variety of polyols and polyisocyanates formulations.

To obtain a polyurethane coating with ~4 wt % of PDMS, the following components were dissolved in chloroform or butanone (2.0 mL) to form a reaction mixture: PEI-g-PDMS (or alternatively another such additive, for example, P(S-alt-MA)-g-PDMS or PDMS-b-PGMA) (45 mg) and a poly (hexamethylene diisocyanate) (320 mg, 80 wt % in butyl acetate). The reaction mixture was heated to 60° C. for 1 h. [Poly(hexamethylene diisocyanate (predominantly trimer) is sold under the trademarks UH80—ULTRA SYSTEM® by SHERWIN-WILLIAMS Co.] Although not wishing to be bound by theory, it is believed that in this reaction amine/imine moieties on PEI-g-PDMS (or carboxyl/anhydride moieties on P(S-alt-MA) or epoxide on PDMS-b-PGMA) reacted with poly(hexamethylene diisocyanate), and formed chains that have poly(hexamethylene diisocyanate) side chains. Following the 1 h of heating to 60° C., polyol (450 mg, containing 32 wt % HEMA) and DMF (0.4 mL) were added into the reaction mixture. Coatings were then obtained by casting this mixture. Coatings of different thicknesses could be achieved by casting different amounts of this solution. For example, 0.10 mL of this solution was cast on a 1'×1' glass plate resulting in a coating that was approximately 37 um thick. The 1'×1' glass plate was placed on a horizontal surface, and the solution was evenly casted on the glass plate. Around 10 min was allowed to pass so that most of the solvent could evaporate. To fully evaporate the solvent(s) and cure the film, the coated glass plate was then placed into a drying cabinet and heated to 120° C. for 12 hours.

After the coating was fully cured, the PDMS modified-polyurethane coating on the glass substrate was glossy and transparent. A ~37 um thick coating with ~4 wt % of PDMS exhibited a transmittance of 99.1%. When tilting the coated glass plate, both hexadecane (~0.02 mL) droplets and water (~0.05 mL) droplets rolled off the coated area easily. The coating was strong enough to resist a fingernail scratch. See Table 20 for contact angle and sliding angle information.

Example 44: Preparation of Polybutadiene Modified Polyurethane Coating Using Polyol-g-Polybutadiene Polybutadiene-g-polyol (5 mg), polyol (17 mg), and HDID (12 mg) were placed into a glass vial and THF (2.2 mL) was added. After dissolution, the resultant solution was drop cast onto a clean glass surface. After 30 min of drying at room temperature, the coated glass was placed in an oven at 180° C. for 12 h to fully cure. A clear coating was obtained. Anti-smudge marker test and amphiphobic droplet sliding tests were conducted and showed that this coating was amphiphobic and smudge proof.

Example 45. Rust Proof Test of PDMS Modified Epoxy Coating on Metal

PDMS modified Epoxy was prepared as mentioned in Example 40. It was selectively coated on regions on a 10 cm×15 cm cast iron plate using the same method as Example 40. The coated iron plate was cured in an oven at 120° C. for 12 h. Then it was placed into a fresh water lake for one week. After this immersion week, uncoated regions appeared rusted while coated regions did not show any rust.

Example 46. Anti-Graffiti Test

FIGS. 24A-D show anti-graffiti properties of PEI-g-PDMS modified epoxy coatings containing 4.0 wt % PDMS comparing with unmodified epoxy coatings. Paints used included two commercially available oil-based paints that listed acetone, toluene, propane, butane, ethyl 3-ethoxypropionate, dimethyl carbonate as their solvent, according to their manual. All the modified and unmodified coated glass slides for use in the test were placed vertically and were sprayed with a similar amount of the paints. On modified coatings, the spray paints could not stick well and shrank into small patches or were dragged to the bottom by gravity. In contrast, the spray paints fully covered the unmodified coatings. The results show the potential of the modified coatings described herein for anti-graffiti applications.

FIGS. 24E-G show that PEI-g-PDMS modification introduces ink repellency. When a black permanent marker was dragged across the coatings, a uniform dark pattern was left on the unmodified sample (FIG. 24E). In the contrast, the ink on the modified coating contracted into a faint patchy trace (FIG. 24F). Moreover, the patchy trace was readily removed by one wipe with a tissue after the ink dried (FIG. 24G). The black ink on the unmodified sample could not be wiped off in this way. PEI-g-PDMS modified coating inhibited ink deposition and facilitated ink removal. The results show the potential of the modified coatings described herein for anti-graffiti applications.

A coating sample containing 7.4 wt % PDMS was prepared (using the first procedure wherein there was no additional hardener used) and applied to glass plates and was cured. The coated surface was then rubbed with a cotton-fabric-wrapped probe under the pressure of $5.8 \times 10^3$ Pa for 18.0 hours at 40 rpm for a total $4.32 \times 10^4$ cycles. After rubbing, the static contact angles of water and hexadecane droplets (5 μL) decreased from ($101\pm1°$) and ($35\pm2°$) to ($100\pm1°$) and ($33\pm3°$). After the rubbing test, the coating still exhibited good ink repellency (FIG. 24H).

All publications listed and cited herein are incorporated herein by reference in their entirety. It will be understood by those skilled in the art that this description is made with reference to certain preferred embodiments and that it is possible to make other embodiments employing the principles of the invention which fall within its spirit and scope as defined by the claims.

TABLE 1

List of the Example 1A copolymers

| Polymer | P1 | PFPE-C(O)Cl | Grafting density (% OH capped by PFPE) |
|---|---|---|---|
| Example 1A(i) | 0.20 g (0.72 mmol - OH groups) | 0.23 g (0.12 mmol) | 13.6% |
| Example 1A(ii) | 0.20 g (0.72 mmol) | 0.35 g (0.14 mmol) | 16.5% |
| Example 1A(iii) | 0.60 g (2.2 mmol) | 1.5 g (0.61 mmol) | 23.0% |
| Example 1A(iv) | 0.60 g (2.2 mmol) | 1.7 g (0.72 mmol) | 27.0% |
| Example 1A(v) | 0.60 g (2.2 mmol) | 2.2 g (0.93 mmol) | 35.0% |

TABLE 2

List of P(TFEMA$_x$-co-HEMA$_y$) copolymers

| Polymer | Molar feed ratio (TFEMA:HEMA) | PTFEMA$_x$:PHEMA$_y$ (purified block ratios) | EBrIB/FTEMA/HEMA-TMS/Bipyridine/CuCl (mmol) |
|---|---|---|---|
| P(TFEMA-co-HEMA) (1) | 1.0:1.0 | 0.98:1.0 | 0.510/13.5/13.5/1.56/0.550 |
| P(TFEMA-co-HEMA) (2) | 0.4:0.6 | 0.4:0.6 | 0.110/3.06/4.60/1.56/0.550 |
| P(TFEMA-co-HEMA) (3) | 0.3:0.7 | 0.30:0.73 | 0.101/1.95/4.60/0.300/0.100 |

TABLE 3

List of P(TFEMA-co-HEMA)-g-PFPE (Example 1B) copolymers

| Polymer | P(TFEMA-co-HEMA) (1) | PFPE-C(O)Cl | Grafting density (theoretical) |
|---|---|---|---|
| Example 1B(i) | 300 mg (1.00 mmol of OH) | 0.24 g (0.10 mmol) | 10% |
| Example 1B(ii) | 500 mg (1.68 mmol of OH) | 0.65 g (0.27 mmol) | 16% |
| Example 1B(iii) | 500 mg (1.68 mmol of OH) | 0.97 g (0.39 mmol) | 24% |
| Example 1B(iv) | 500 mg (1.7 mmol of OH) | 1.3 g (0.52 mmol) | 32% |

TABLE 4

List of the Example 1C copolymers

| Polymer | P1 | PDMS-O$_2$C$_2$(O)Cl | PDMS Grafting density (% of OH capped with PDMS) |
|---|---|---|---|
| Example 1C(i) | 0.42 g (1.5 mmol) | 0.77 g (0.168 mmol) | 11.2% |
| Example 1C(ii) | 0.28 g (1.0 mmol) | 0.64 g (0.14 mmol) | 14.0% |
| Example 1C(iii) | 0.20 g (0.72 mmol) | 0.64 g (0.14 mmol) | 19.4% |

TABLE 5

Preparation of Example 1D(i) and Example 1D(ii)

| Polymer | Precursor Polymer | Acetic anhydride |
|---|---|---|
| Example 1D (i) | 80 mg Example 1A(iii) | 0.3 mL (2.3 mmol) |
| Example 1D(ii) | 36 mg Example 1C(ii) | 0.3 mL (2.3 mmol) |

TABLE 6

Formulation and properties of unmodified PU coating

| Sample | NCO (moles) | P1 | Solvent | NCO/OH | Water (SA) | Hexadecane (SA, °) | % T Conc. |
|---|---|---|---|---|---|---|---|
| Unmodified PU | 7.0 mg (0.033 mmol of NCO) | 30.0 mg, (0.029 mmol of OH) | 1.3 mL THF | .033/.029 = 1.13 | 60 (25 µL) | Wet | 98.5% (28.0 mg/mL) |

SA—sliding angles.

TABLE 7

List of the coating formulations, and their respective properties of the Example 1A PU-based films

| Polymer | NCO | P1 | Example 1A | NCO/OH | Water (SA) | Hexadecane (SA, 5 µL) | % T and (Conc). |
|---|---|---|---|---|---|---|---|
| Example 1A(i) | 3.0 mg (0.014 mmol) | 6.0 mg (0.0058 mmol) | 5.0 mg (0.0058 mmol) | 0.014/0.011 = 1.27 | 56°, 25 µL (65°, 25 µL) | 47° (47°) | 85% (13.4 mg/mL) |
|  | *3.7 mg* *(0.017)* | *4.5* *(0.0042)* | *9.0 mg* *(0.010 mmol)* | *0.017/0.015 = 1.2* | *30° (25 µL)* *(44°, 25 µL)* | *52°* *(54°)* | *96%* *(17 mg/mL)* |
| Example 1A(ii) | 2.5 mg (0.012 mmol) | 3.0 mg (0.0029 mmol) | 6.0 mg (0.0060 mmol) | 0.012/0.0090 = 1.33 | 49°, 20 µL (75°, 20 µL) | 42° (42°) | 85% (11.5 mg/mL) |
|  | *4.6 mg* *(0.022 mmol)* | *5.5 mg* *(0.0053 mmol)* | *11.7 mg* *(0.015 mmol)* | *0.022/0.017 = 1.2* | *59° (15 µL),* *44° (20 µL)* | *58°* *(62°)* | *92%* *(21.7 mg/mL)* |
| Example 1A(iii) | 5.0 mg (0.024 mmol) | 7.3 mg (0.0071 mmol) | 10 mg (0.0094 mmol) | 0.023/0.016 = 1.43 | 69°, 20 µL (84°, 20 µL) | 26° (27°) | 46% (33 mg/mL) |
|  | 6.0 mg (0.028 mmol) | 14.6 mg (0.014 mmol) | 10 mg (0.0094 mmol) | 0.028/0.022 = 1.27 | 85°, 20 µL (52°, 25 µL) | 38° (42°) | 72% (33 mg/mL) |
| Example 1A(iv) | 3.5 mg (0.016 mmol) | 7.3 mg (0.0070 mmol) | 10 mg (0.0074 mmol) | 0.0164/0.014 = 1.17 | 62°, 20 µL, (NA°) | 25° (NA°) | 32% (19 mg/mL) |
|  | 5.00 mg (0.0235 mmol) | 14.6 mg (0.0142 mmol) | 10 mg (0.0074 mmol) | .0235/0.0217 = 1.08 | 52°, 20 µL (NA° for 25 µL) | 33° (39°) | 46% (24 mg/mL) |
| Example 1A(v) | 3.3 mg (0.015 mmol) | 7.3 mg (.0070 mmol) | 10 mg (0.0060 mmol) | .0154/0.013 = 1.18 | 68° (15 µL) (NA°) | 35° (NA°) | 8% (31 mg/mL) |
|  | 4.9 mg (0.023 mmol) | 14.6 mg (.0142 mmol) | 10 mg (0.0060 mmol) | .023/.022 = 1.04 | 78° (15 µL) (NA°) | 38° (NA°) | 18% (39.3 mg/mL) |

Values shown in bold represent samples heated at 40° C. for 25 min before they were cast.
Rubbing tests were performed for 60 min at 40 rpm, under a 400 g weight.
(Note: The samples shown in italics were rubbed for 120 at 40 rpm, under a 400 g weight.
SA denotes sliding angles.
Sliding angles before rubbing test are shown in (°) in regular font, while those recorded after the rubbing test are shown in bold (°).
NA- surface wet by the liquid and no sliding angles could be measured.

TABLE 8

List of coating formulations and resultant properties of the FPU films prepared from P(TFEMA-co-HEMA)-g-PFPE see Example 1B(i), Example 1B(ii), Example 1B(iii), Example 1B(iv)

| Polymer | NCO (moles) | P1 | P(TFEMA-co-HEMA)-g-PFPE | NCO/OH | Water (SA, °) | Hexadecane (SA, °, 5 µL) | % T(Conc.) |
|---|---|---|---|---|---|---|---|
| Example 1B(i) | 2.75 mg (0.0129 mmol) | 5.0 mg (0.0049 mmol) | 5.5 mg (0.0070 mmol) | 0.013/ 0.012 = 1.09 | 48, 20 µL (61, 25 µL) | 48 (49°) | 85% (11.75 mg/mL) |
|  | 2.4 mg (0.011 mmol) | 3.0 mg (0.003 mmol) | 5.5 mg (0.0070 mmol) | 0.013/ 0.01 = 1.34 | 54 (20 µL), (59, 25 µL) | 47 (47°) | 87% (10.25 mg/mL) |
|  | *4.0 mg* *(0.019 mmol)* | *4.3 mg* *(0.0041 mmol)* | *8.5 mg* *(0.0085 mmol)* | *0.019/ 0.012 = 1.49* | *80 (20 µL),* *(55, 25 µL)* | *52* *(53°)* | *94% (17 mg/mL)* |
| Example 1B(ii) | 5.4 mg (0.025 mmol) | 7.4 mg (0.0071 mmol) | 16 mg (0.012 mmol) | 0.025/ 0.019 = 1.26 | 60, 20 µL (62, 25 µL) | 45 (49) | 55% (46 mg/mL) |
|  | 6.9 mg (0.032 mmol) | 14.6 mg (0.0140 mmol) | 16 mg (0.012 mmol) | 0.032/0.026 = 1.23 | 72, 20 µL, (85, 20 µL) | 49 (56) | 62% (57 mg/mL) |
|  | 9.2 mg (0.043 mmol) | 14.6 (0.0143 mmol) | 24 mg (0.029 mmol) | 0.043/ 0.043 = 1.0 | 62, 20 µL (68, 25 µL) | 46 (49) | 46% (35.8 mg/mL) |
|  | 11 mg (0.052 mmol) | 14.6 mg (0.0143 mmol) | 24 mg (0.029 mmol) | 0.052/ 0.043 = 1.2 | 78, 20 µL (57, 25 µL) | 46 (47) | 48% (37 mg/mL) |

TABLE 8-continued

List of coating formulations and resultant properties of the FPU films prepared from P(TFEMA-co-HEMA)-g-PFPE see Example 1B(i), Example 1B(ii), Example 1B(iii), Example 1B(iv)

| Polymer | NCO (moles) | P1 | P(TFEMA-co-HEMA)-g-PFPE | NCO/OH | Water (SA, °) | Hexadecane (SA, °, 5 μL) | % T(Conc.) |
|---|---|---|---|---|---|---|---|
|  | 11.0 mg (0.0517 mmol) | 22.6 mg (0.0213 mmol) | 24 mg (0.029 mmol) | 0.0517/ 0.0503 = 1.03 | 76, 20 μL (72, 25 μL) | 49 (55) | 61% (39.7) |
| Example 1B(iii) | 9.2 mg (0.043) | 14.6 mg (0.0143 mmol) | 24 mg (0.021 mmol) | 0.0432/ 0.035 = 1.22 | 70, 20 μL (NA) | 44 (NA) | 31% (35.5 mg/mL) |
|  | 11 mg (0.052 mmol) | 14.6 mg (0.0143 mmol) | 24 mg (0.021 mmol) | 0.0517/ 0.035 = 1.46 | 88, 20 μL (57 25 μL) | 51 (70) | 32% (36.5 mg/mL) |
|  | 11 mg (0.052 mmol) | 22.6 mg (0.0213 mmol) | 24 mg (0.021 mmol) | 0.052/ 0.042 = 1.22 | 81, 20 μL (69, 25 μL) | 47 (67) | 44% (38 mg/mL) |
| Example 1B(iv) | 6.2 mg (0.029 mmol) | 14.6 mg (0.0147 mmol) | 24 mg (0.015 mmol) | 0.029/ 0.029 = 1.0 | 40°, 15 μL (NA) | 32° (NA) | 12% (34.7 mg/mL) |
|  | 8.0 mg (0.037 mmol) | 14.5 mg (0.0140) | 24 mg (0.015 mmol) | 0.0376/ 0.029 = 1.29 | 55°, 20 μL (NA) | 33° (NA) | 14% (35.8 mg/mL) |
|  | 8.0 mg (0.037 mmol) | 22.5 mg (0.0218 mmol) | 24 mg (0.015 mmol) | 0.038/ 0.037 = 1.02 | 45°, 20 μL (NA) | 32° (NA) | 19% (39 mg/mL) |

Reagents shown in bold represent samples heated at 40° C. for 25 min before casting.
Rubbing tests were performed for 60 min at 40 rpm, using a 400 g weight.
(Note: Samples shown in italics were rubbed for 120 min at 40 rpm, using a 400 g weight).
Sliding angles (SAs) observed before the rubbing tests are shown in (°) while those observed after the rubbing tests are shown in bold (°).
NA indicates that the surface had become wet by the liquid and no sliding angles could be measured.

TABLE 9

Formulations of the Example 1C copolymers

| Polymer | NCO | P1 | Example 1C | NCO/OH | THF:AcN (v/v) | Conc. |
|---|---|---|---|---|---|---|
| Example 1C(i) |  |  |  |  |  |  |
| A | 14.5 mg (0.0680 mmol) | 26.2 mg (0.0254 mmol) | 17.5 mg (0.0220 mmol) | 0.068/ 0.0474 = 1.44 | 1:4 | ~23.2 mg/mL |
| Example 1C(ii) |  |  |  |  |  |  |
| A | 10 mg (0.047) | 21 mg (0.0204 mmol) | 14 mg (0.015 mmol) | 0.047/ 0.0364 = 1.3 | 1:4 | 22.5 mg/mL |
| B | 5.6 mg (0.026 mmol) | 20 mg (0.019 mmol) | 5.5 mg (0.0057 mmol) | .026/ .025 = 1.05 | 1:1 | 34.5 mg/mL |
| Example 1C(iii) |  |  |  |  |  |  |
| A | 10 mg (0.047 mmol) | 21 mg (0.020 mmol) | 16 mg (0.013 mmol) | 0.047/ 0.033 = 1.42 | 1:4 | 23.5 mg/mL |
| B | 10 mg (0.047 mmol) | 40 mg (0.039 mmol) | 8.25 mg (0.00640 mmol) | 0.047/ 0.045 = 1.04 | 1.1:1 | 52.9 mg/mL |

TABLE 10

Properties of Example 1C Copolymer-Based PU films

| Properties | Drop casting (A) | Spin coating (A) | Drop casting (B) | Spin coating (B) |
|---|---|---|---|---|
| Example 1C(i) | — | — | — | — |
| Water (SA) | 40° (15 μL), (60°, 15 μL) | 78° (20 μL), (56, 25 μL) | — | — |
| Hexadecane (SA, 5 μL) | 3-5° (6-8°) | 18° (elongated drop) (21° tailing) | — | — |
| % Transmittance | 92-96% | 98% | — | — |
| Anti-Ink | Good | Good | — | — |
| Example 1C(ii) | — | — | — | — |
| Water (SA) | — | 80° (20 μL) (54°, 25 μL) | 81° (20 μL) (60, 25 μL) | 85° (20 μL) (NA) |
| Hexadecane (SA) | — | ~35° (63° elongated droplets) | Wet | 55° (elongated droplets) (NA) |
| Optical (% T) | — | 95% | 4% | 98% |
| Anti-ink | — | Average | Average | Average |
| Example 1C(iii) | — | — | — | — |
| Water (SA) | — | 40° (20 μL), (68°, 20 μL) | 80° (20 μL) (46°, 25 μL) | 75° (15 μL); (NA) |
| Hexadecane(SA, 5 μL) | — | 42°, (NA) | NA | 44° (elongated droplets) (NA) |
| Optical Properties (% T) | — | 98 | 8 | 98 |
| Anti-Ink | — | Average | Average | Average |

NA: indicates that the solvent spread on the film, so that was impossible to measure the SA.
AcN denotes Acetonitrile Spin coating was performed at 2000 rpm, time 30 s, acceleration 500 rpm.
Rubbing tests were performed for 60 min at 40 rpm using a 100 g weight.
% T at a wavelength of 500 nm.
The sliding angle (SA) values in regular font represent the SAs (in °) measured before the rubbing tests, while the values in bold font represent the SA measured (in °) after the rubbing test.

TABLE 11

Properties of the Example 1D(i) Based Films

| Properties | Drop casting | Spin Coating (single layer) | Spin Coating (two layers) |
|---|---|---|---|
| Water (SA) | 75° (20 μL), (NA) | 67° (20 μL), (NA) | 65° (20 μL), (NA) |
| Hexadecane | 70° (5 μL), (NA) | 40° (5 μL), (NA) | 38° (5 μL), (NA) |
| Optical Clarity (% T) | 15 | 87 | 85 |
| Mechanical Durability | Film completely destroyed | Film destroyed | Film destroyed |

*Spin coating conditions: 2000 rpm, 30 s duration, acceleration of 500 rpm.
% T at a wavelength of 500 nm.
Rubbing test: 20 min at 40 rpm using 250 g weight.
NA indicates that the droplet either wet the surface or did not slide.
Sliding angles reported in bold represent values observed after the rubbing test.

TABLE 12

Properties of the Example 1D(ii) Based PU Films

| Properties | Drop casting | Spin coating* | Spin coating** |
|---|---|---|---|
| Water (SA, °) | 45° (15 μL) (NA) | 35° (15 μL) (NA) | 35° (15 μL) (NA) |
| Hexadecane (SA, °) | Wet the film | 45° (small droplets left behind-Tailing) | 41° (small droplets left behind-Tailing) |
| Optical Properties (% T) | 5.0 | 95 | 93 |
| Mechanical Properties$^a$ | Film destroyed after rubbing | Film destroyed after rubbing | Film destroyed after rubbing |

Spin coating conditions: 2000 rpm, 30 s duration, acceleration of 500 rpm.
*represents a single layer prepared via spin coating.
**Represents two layers prepared via spin coating.
% T observed at a wavelength of 500 nm.
$^a$Films were lost after they were subjected to rubbing for 20 min at 40 rpm using a 250 g weight.

TABLE 13

Preparation of FPU films from Example 2A

| Sample | NCO | P1 | Example 2A | NCO/OH | PFPE (wt %) | Conc./solvent |
|---|---|---|---|---|---|---|
| 5A | 2.0 mg (0.0094 mmol of NCO) | 5.0 mg (0.0049 mmol of OH) | 2.1 mg (0.0034) | 0.0094/ 0.0083 = 1.3 | 1.09 mg/ 9.1 mg = 11.9% | 7.9 mg/mL in THF |
| 5B | 2.8 mg (0.013 mmol of NCO) | 10 mg (0.0097 mmol of OH) | 2.1 mg (0.0034) | 0.013/ 0.013 = 1.01 | 1.09/ 14.9 mg = 7.3% | 12.4 mg/mL in THF |

TABLE 14

Properties of FPU films based on Example 2A

| Properties | 5-A | 5-B |
|---|---|---|
| Water (SA) | 70°, 15 μL, (55°, 20 μL) | 75° 15 μL, (73°, 20 μL) |
| Hexadecane (SA, 5 μL) | 45° (52) | 45° (62) |
| Optical Clarity | 40% | 46% |
| Mechanical Durability[a] | Stable | Stable |

SA (sliding angles),
[a]20 min at 250 g at 40 rpm.
Values in the bold parenthesis denote sliding angles measured after the rubbing test.

TABLE 15

Formulations Employed for the Preparation of the Example 2B Based PU Films

| Sample | NCO | P1 | Example 2B | NCO/OH | PDMS (wt. %) | Conc. (mg/mL) |
|---|---|---|---|---|---|---|
| 6-A | 44 mg (0.21 mmol) | 114 mg (0.110 mmol) | 28 mg (0.037 mmol) | 0.21/0.12 = 1.4 | 18.9/186 = 10.1 | 12.4 |
| 6-B | 11.5 mg (0.0540 mmol) | 32 mg (0.031 mmol) | 12.2 mg (0.0170 mmol) | 0.054/0.048 = 1.13 | 8.54/55.7 = 15.2 | 13.9 |

TABLE 16

Properties of the Example 2B Based PU Films

| Properties | 6-A-Drop casting | 6-A-Spin coating | 6-B-Drop casting | 6-B-Spin Coating |
|---|---|---|---|---|
| Water (20 μL) SA | 24° (31°)[a] | 28° (46°)[a] | 23° (45°)[a] | 25° (67°)[a] |
| Hexadecane (5 μL) SA | 10° (12°)[a] | 10° (15°)[a] | 7° (23°)[a] | 7° (31°)[a] |
| Optical Clarity (% T)[b] | 85.5 | 99.7 | 68.0 | 99.0 |
| Ink-Resistance | Good* | Good* | Good* | Good* |

Spin coating: 2000 rpm, time 30 s, acceleration 500, SA (Sliding angle, °).
[a]Rubbing tests were performed under a 250 g load at 40 rpm, for 60 min.
[b]% Transmittance recorded at 500 nm.
*Good-resistance to permanent ink marker.

TABLE 17

Formulations for Silica Particle-Embedded Example 1A(i) PU Films

| Sample | Mass of the silica particles (mg) | Mass of FPU (mg) at 9.2 wt. of F % | Hexadecane (static contact angle) | Hexadecane (sliding angle) | Water (static contact angle) | Water (sliding angle) |
|---|---|---|---|---|---|---|
| 1 | 20 (uncoated) | 20 | 65° | 88°* | 102° | 70° |
| 2 | 40 (coated) | 20 | 68° | 44° | 106° | 33° |
| 3 | 30 (coated) | 20 | 71° | 55° | 113° | 45° |
| 4 | 46 (coated) | 20 | 65° | 60° (for 10 μL) | 121° | 78° |

Note.
The volumes of the water and hexadecane droplets were 20 and 5 μL, respectively, except where mentioned.
*Represents sample have some weak spots where hexadecane pinned to the surface.
Note
example 1A(i) was used for PU modification.

TABLE 18

Properties of Example PEI-g-PDMS modified PU Films (Example 43)

| PDMS wt % | Water Contact Angle (5 μL) | Hexadecane Contact Angle (5 μL) | Water Sliding Angle (15 μL) | Hexadecane Sliding Angle (5 μL) |
|---|---|---|---|---|
| 4% | 102.3° | 33.4° | 38° | 5° |
| 8% | 102.5° | 33.7° | 34° | 4.5° |

TABLE 19

Types of P20 and amounts that were mixed with Bis-A (0.10 mL, containing 0.68 mmol glycidyl groups) in chloroform (0.50 mL) (see Example 39A)

| P20 | Amount (in mg) | Ideal Epoxide Consuming (in mmol) |
|---|---|---|
| P20-1 | 15.0 | 0.085~0.232 |
| P20-2 | 15.0 | 0.042~0.116 |
| P20-3 | 15.0 | 0.016~0.032 |
| P20-4 | 15.0 | 0.010 |
| P20-5 | 15.0 | 0.018~0.036 |
| P20-6 | 15.0 | 0.018~0.036 |
| P20-7 | 15.0 | 0.035 |
| P20-8 | 15.0 | 0.085~0.232 |

TABLE 20

Liquid static contact angle and sliding
angle of PDMS modified epoxy films

| Liquid | Miscible with PDMS? | Surface tension @ 20° C. in mN/m * | Contact Angle (5 μL) | Sliding Angle (5 μL) |
|---|---|---|---|---|
| Diiodomethane | Yes | 50.80 | 67 ± 1° | 9° |
| Hexadecane | Yes | 27.47 | 35 ± 2° | 5° |
| THF | Yes | 26.40 | 26 ± 2° | 5° |
| Dodecane | Yes | 25.35 | 26 ± 2° | 5° |
| Decane | Yes | 23.83 | 18 ± 1° | 5° |
| Octane | Yes | 21.62 | | |
| Polydimethyl siloxane | Yes | 19.00 | The liquid spread on the surface, and did not slide. | |
| Hexane | Yes | 18.43 | | |
| Water | No | 72.80 | 101 ± 1° | 60° (15 μL) |
| DMF | No | 37.10 | 50 ± 4° | 41° |
| Methanol | No | 22.70 | 29 ± 2° | 11° |
| Ethanol | No | 22.10 | 28 ± 1° | 10° |
| Perfluorooctane | No | 14.00 | 2 ± 1° | 1° |

*Surface tension data obtained from http://www.surface-tension.de/.
Note:
surface tension unit of millinewtons per meter (mN · m−1) is equivalent to dynes per centimetre.

We claim:

1. An epoxy-based coating composition comprising:
a major component that is an epoxy resin;
a minor component that is a block or graft copolymer having a first end that comprises at least one functional moiety that is capable of binding to the major component, and having a second end having at least one anti-smudge moiety comprising perfluoropolyether (PFPE), polysiloxane, poly(ethylene glycol) methyl ether (PEO), polyisobutylene (PIB), polybutadiene (PB), a polymer that has a glass transition temperature (Tg) in the range of about −160° C. to about 25° C., or any combination thereof;
optionally a hardener; and
optionally a solvent,
wherein the coating composition comprises about 0.1 wt % to about 40 wt % anti-smudge moiety, wherein the composition is adapted to be applied to a substrate and dried and/or cured to form a coating on the substrate, whereby the second end of at least a portion of the minor component is located at a surface of the coating and the coating is amphiphobic.

2. The composition of claim 1, wherein the anti-smudge moiety comprises polysiloxane, perfluoropolyether (PFPE), poly(ethylene glycol) methyl ether (PEO), polyisobutylene (PIB), or polybutadiene (PB).

3. The composition of claim 1, wherein the coating is substantially transparent.

4. The composition of claim 1, wherein the minor component has a Tg of about 25° C. or less and is selected from:
perfluoropolyether (PFPE), polysiloxane, poly (ethylene glycol) methyl ether (PEO), polyisobutylene (PIB), polybutadiene (PB), or a polymeric form of: ethylene (atactic), 1-butene, ethylene, cis-isoprene, trans-isoprene, 1-octene, propylene, vinyl propionate, vinylidene chloride, vinylidene fluoride, cis-chlorobutadiene, trans-chlorobutadiene, benzyl acrylate, butyl acrylate, sec-butyl acrylate, 2-cyanoethyl acrylate, cyclohexyl acrylate, dodecyl acrylate, ethyl acrylate, 2-ethylhexyl acrylate, isobutyl acrylate, 2,2,2-trifluoroethyl acrylate, 2-ethoxyethyl acrylate, isopropyl acrylate (isotactic), benzyl methacrylate, diethylaminoethyl methacrylate, dodecyl methacrylate, 2-ethylhexyl methacrylate, hexadecyl methacrylate, hexyl methacrylate, octadecyl methacrylate, octyl methacrylate, propyl vinyl ether, methyl vinyl ether, methyl glycidyl ether, isobutyl vinyl ether, ethyl vinyl ether, 2-ethylhexyl vinyl ether, dodecyl vinyl ether, butyl vinyl ether, butyl glydicyl ether, allyl glycidyl ether, ethylene oxide, propylene oxide, tetrahydrofuran, 1,2-epoxybutane, 1,2-epoxydecane, 1,2-epoxyoctane, epibromohydrin, epichlorohydrin, trimethylene oxide, epibromohydrin, epichlorohydrin, tetramethylene terephthalate, tetramethylene adipate, ethylene malonate, ethylene adipate, ε-caprolactone, dimethylsiloxane, methylphenylsiloxane, formaldehyde, ethylene-trans-1,4-cyclohexyldicarboxylate, acetaldehyde, or poly(1-glycidyl-3-butylimidazolium bis(trifluoromethanesulfonyl)imide) ("polyGBIMTFSI"); or a phosphazene polymer

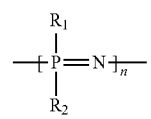

where $R_1$ and $R_2$ are $CH_3$, $C_6H_5$, $OCH_3$, $OC_6H_5$, $NR_2$, Cl, Br, F, $OCH_2CF_3$, or $OCH_2C_6H_5$;
or any combination thereof.

5. The composition of 1, further comprising biocide, embedded particles selected from silica, titanium dioxide, diatomaceous earth, alumina, $TiO_2$, a pigment or any combination thereof.

6. The composition of claim 1, wherein the minor component is a graft copolymer of formula (1) or a block copolymer of formula (2):

(1)

(2)

where FS is a moiety comprising PFPE, polysiloxane, PEO, PIB, PB, a polymer whose Tg is 25° C. or less as claimed in claim 4, or any combination thereof;
R is a moiety that comprises a hydroxyl, amine ($NH_2$), imine (NH), carboxyl, glycidyl, or an anhydride functional group that is protected or unprotected;
Mi is a monomer selected from styrene, acrylate, methacrylate, vinyl esters, acrylic acids, methacrylic acids, amine-bearing monomers, anhydride-bearing monomers, polyimine/polyamine, or polycarboxylic acid/polyanhydride;
x is percentage of FS moieties and is from about 0.1% to about 40%;
y is percentage of R moieties and is from about 1% to about 90%;
n is number of repeat units.

7. The composition of claim 6, wherein FS further comprises at least one moiety that links FS to R or Mi of the copolymer.

8. The composition of claim 6, wherein the minor component comprises: PFPE-b-P(HEMA-S-MMA); PDMS-b-[HEMA-S-MMA]; PDMS-b-PGMA; Polyol-g-PI B; Polyol-g-PB; P(S-MMA-MAA-BMA-IBMA-VP-EGEMA-HEMA)-g-PFPE; P(TFEMA-co-HEMA)-g-PFPE; P(S-MMA-MAA-BMA-IBMA-VE-EGEMA-HEMA)-g-PDMS; P(S-alt-MA)-g-$PEO_{750}$; P(S-alt-MA)-g-$PEO_{2000}$; P(S-alt-MA)-g-$PEO_{5000}$; PFPE-b-P(HEMA-S-MMA); PDMS-b-[HEMA-S-MMA]; PDMS-b-PGMA; Polyol-g-PIB; Polyol-g-PB; or any combination thereof.

9. The coating composition of claim 6, wherein FS comprises polydimethylsiloxane.

10. The composition of claim 7, wherein FS comprises: $CH_2$=CH—$CO_2$-polysiloxane; $CH_2$=CH—$CO_2$-PDMS; $CH_2$=C($CH_3$)—$CO_2$-polysiloxane; $CH_2$=C($CH_3$)—$CO_2$-PDMS; $CH_2$=CH—$CO_2$-PFPE; $CH_2$=CH—$CO_2$-Krytox; $CH_2$=C($CH_3$)—$CO_2$-PFPE; $CH_2$=C($CH_3$)—$CO_2$-Krytox; or $CH_2$=C($CH_3$)COO$CH_2$$CH_2$OOCCF($CF_3$)[$CF_2$—CF($CF_3$)O]$_t$$CF_3$.

11. The composition of claim 6, wherein FS comprises a PFPE moiety that comprises a $C_{10}$ to $C_{2000}$ perfluoro polyether moiety.

12. The composition of claim 1, wherein the at least one functional moiety is selected from polyacrylate, polymethacrylate, polyacrylic acid, polymethacrylic acid, polystyrene, polyvinyl ester, polyimine/polyamine, polycarboxylic acid/polyanhydride, or any combination thereof.

13. The composition of claim 6, wherein the FS moiety comprises: polyacrylate-g-polysiloxane; polymethacrylate-g-polysiloxane; poly(acrylic acid)-g-polysiloxane; poly(methacrylic acid)-g-polysiloxane; polystyrene-g-polysiloxane; poly(vinyl ester)-g-polysiloxane; polyacrylate-g-PFPE; polymethacrylate-g-PFPE; poly(acrylic acid)-g-PFPE; poly(methacrylic acid)-g-PFPE; polystyrene-g-PFPE; polyvinyl ester-g-PFPE; PEI-g-PDMS; P(S-alt-MA)-g-PDMS; polyacrylate-b-polysiloxane; polymethacrylate-b-polysiloxane; polyacrylic acid-b-polysiloxane; polymethacrylic acid-b-polysiloxane; polystyrene-b-polysiloxane; polyvinyl ester-b-polysiloxane; polyacrylate-b-PFPE; polymethacrylate-b-PFPE; poly(acrylic acid)-b-PFPE; poly(methacrylic acid)-b-PFPE; polystyrene-b-PFPE; poly(vinyl ester)-b-PFPE; or PDMS-b-PGMA.

14. An epoxy-based coating composition prepared by combining:
an epoxy resin;
a block or graft copolymer comprising: at least one functional moiety capable of binding to the epoxy resin; and at least one of a polysiloxane, perfluoropolyether (PFPE), poly(ethylene glycol) methyl ether (PEO), polyisobutylene (PIB), polybutadiene (PB), and a moiety that has a glass transition temperature (Tg) in the range of about −160° C. to 25° C.;
optionally a hardener; and
optionally a solvent.

15. The epoxy-based coating composition of claim 14, wherein the epoxy resin comprises polyglycidyl bisphenol A diglycidyl ether, bisphenol F, bisphenol S, novolac epoxy resin, aliphatic epoxy resin, glycidylamine epoxy resin, or any combination thereof.

16. The epoxy-based coating composition of claim 14, wherein the block or graft copolymer is:

P20-1, P20-2

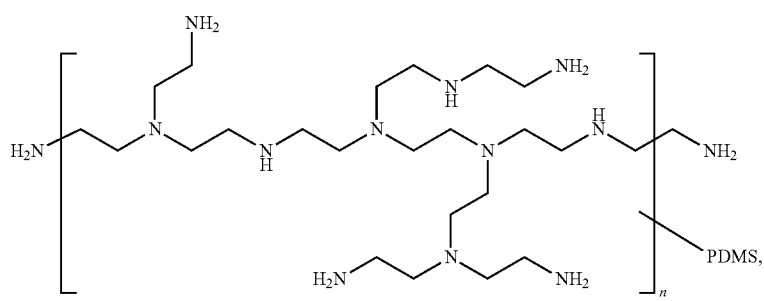

P20-3

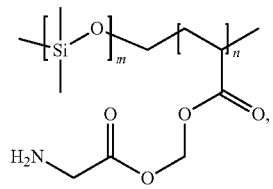

P20-4

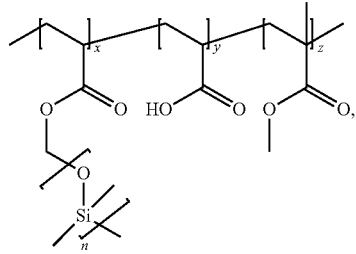

P20-5

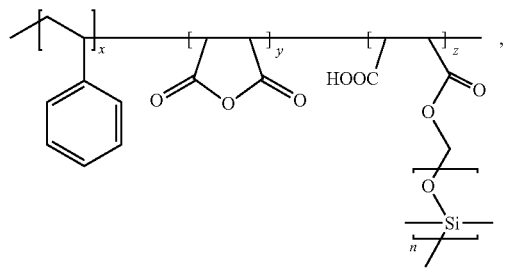

P20-6

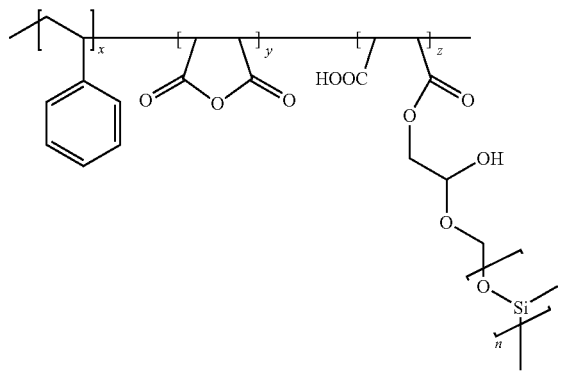

-continued

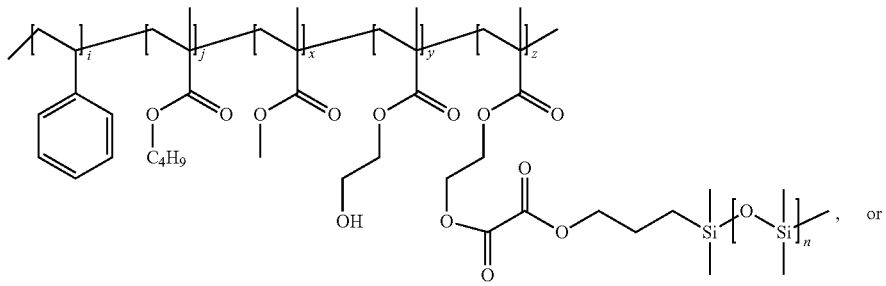

P20-7

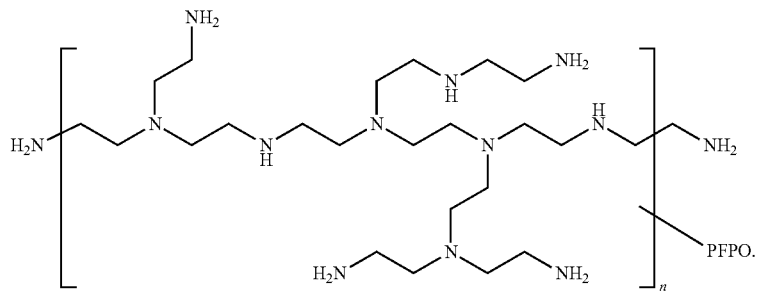

P20-8

17. A method comprising:
applying the epoxy-based coating composition of claim 1 to a substrate;
wherein the composition forms a coating on the substrate; and
wherein the coating is amphiphobic.

18. The method of claim 17, further comprising drying and/or curing the composition to form the coating.

19. A method comprising:
applying the epoxy-based coating composition of claim 14 to a substrate;
wherein the composition forms a coating on the substrate; and
wherein the coating is amphiphobic.

* * * * *